(12) United States Patent
Sugio et al.

(10) Patent No.: US 12,348,766 B2
(45) Date of Patent: *Jul. 1, 2025

(54) MOVING PICTURE CODING METHOD, MOVING PICTURE DECODING METHOD, MOVING PICTURE CODING APPARATUS, MOVING PICTURE DECODING APPARATUS, AND MOVING PICTURE CODING AND DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,780

(22) Filed: Feb. 28, 2024

(65) Prior Publication Data
US 2024/0205450 A1 Jun. 20, 2024

Related U.S. Application Data

(63) Continuation of application No. 18/089,761, filed on Dec. 28, 2022, now Pat. No. 11,949,907, which is a
(Continued)

(51) Int. Cl.
*H04N 19/13* (2014.01)
*H04N 19/105* (2014.01)
(Continued)

(52) U.S. Cl.
CPC ............ *H04N 19/52* (2014.11); *H04N 19/105* (2014.11); *H04N 19/159* (2014.11); *H04N 19/46* (2014.11);
(Continued)

(58) Field of Classification Search
CPC .... H04N 19/52; H04N 19/105; H04N 19/159; H04N 19/46; H04N 19/503; H04N 19/172; H04N 19/176
See application file for complete search history.

(56) References Cited

U.S. PATENT DOCUMENTS 7,643,559 B2 1/2010 Kato et al.
8,374,245 B2 2/2013 Tourapis et al.
(Continued)

FOREIGN PATENT DOCUMENTS

CN 1917647 2/2007
CN 101156451 4/2008
(Continued)

OTHER PUBLICATIONS

"Advanced Video Coding for Generic Audiovisual Services", ITU-T Recommendation H. 264, Mar. 2010.
(Continued)

*Primary Examiner* — Howard D Brown, Jr.
(74) *Attorney, Agent, or Firm* — Wenderoth, Lind & Ponack, L.L.P.

(57) ABSTRACT

A moving picture coding includes: coding a first flag indicating whether or not temporal motion vector prediction is used; when the first flag indicates that the temporal motion vector prediction is used: coding a first parameter for calculating the temporal predictive motion vector; wherein when the first flag indicates that the temporal motion vector prediction is not used, the first parameter is not coded.

3 Claims, 45 Drawing Sheets

Related U.S. Application Data continuation of application No. 17/102,608, filed on Nov. 24, 2020, now Pat. No. 11,595,682, which is a continuation of application No. 16/708,833, filed on Dec. 10, 2019, now Pat. No. 10,880,572, which is a continuation of application No. 16/233,470, filed on Dec. 27, 2018, now Pat. No. 10,560,716, which is a continuation of application No. 15/260,529, filed on Sep. 9, 2016, now Pat. No. 10,212,447, which is a continuation of application No. 13/783,435, filed on Mar. 4, 2013, now Pat. No. 9,479,777.

(60) Provisional application No. 61/607,028, filed on Mar. 6, 2012.

(51) Int. Cl.
*H04N 19/159* (2014.01)
*H04N 19/46* (2014.01)
*H04N 19/503* (2014.01)
*H04N 19/52* (2014.01)
*H04N 19/172* (2014.01)
*H04N 19/176* (2014.01)

(52) U.S. Cl.
CPC ......... *H04N 19/503* (2014.11); *H04N 19/172* (2014.11); *H04N 19/176* (2014.11)

(56) References Cited

U.S. PATENT DOCUMENTS

| | | |
|---|---|---|
| 8,494,046 B2 | 7/2013 | Yang |
| RE44,680 E | 12/2013 | Yang |
| 9,210,440 B2 | 12/2015 | Sugio et al. |
| 2002/0181591 A1 | 12/2002 | Francois et al. |
| 2004/0001546 A1 | 1/2004 | Tourapis et al. |
| 2004/0013308 A1 | 1/2004 | Jeon et al. |
| 2004/0052507 A1 | 3/2004 | Kondo et al. |
| 2004/0136461 A1 | 7/2004 | Kondo et al. |
| 2004/0190614 A1 | 9/2004 | Schlockermann et al. |
| 2004/0190615 A1 | 9/2004 | Abe et al. |
| 2005/0141612 A1 | 6/2005 | Abe et al. |
| 2006/0126952 A1 | 6/2006 | Suzuki et al. |
| 2006/0233254 A1 | 10/2006 | Lee et al. |
| 2006/0262981 A1 | 11/2006 | Jeon et al. |
| 2007/0177671 A1 | 8/2007 | Yang |
| 2007/0177672 A1 | 8/2007 | Yang |
| 2007/0177673 A1 | 8/2007 | Yang |
| 2007/0177674 A1 | 8/2007 | Yang |
| 2007/0177810 A1 | 8/2007 | Yang |
| 2007/0177811 A1 | 8/2007 | Yang |
| 2007/0177812 A1 | 8/2007 | Yang |
| 2007/0177813 A1 | 8/2007 | Yang |
| 2007/0268971 A1 | 11/2007 | Kato |
| 2007/0286281 A1 | 12/2007 | Tsuchiya et al. |
| 2008/0037636 A1 | 2/2008 | Jeon et al. |
| 2008/0037645 A1 | 2/2008 | Jeon et al. |
| 2008/0037646 A1 | 2/2008 | Jeon et al. |
| 2008/0037885 A1 | 2/2008 | Jeon et al. |
| 2008/0037886 A1 | 2/2008 | Jeon et al. |
| 2008/0043849 A1 | 2/2008 | Jeon et al. |
| 2008/0044093 A1 | 2/2008 | Jeon et al. |
| 2008/0044094 A1 | 2/2008 | Jeon et al. |
| 2008/0063075 A1 | 3/2008 | Kondo et al. |
| 2008/0069235 A1 | 3/2008 | Abe et al. |
| 2008/0123947 A1 | 5/2008 | Moriya et al. |
| 2008/0123977 A1 | 5/2008 | Moriya et al. |
| 2008/0130747 A1 | 6/2008 | Moriya et al. |
| 2008/0130988 A1 | 6/2008 | Moriya et al. |
| 2008/0130989 A1 | 6/2008 | Moriya et al. |
| 2008/0130990 A1 | 6/2008 | Moriya et al. |
| 2008/0137744 A1 | 6/2008 | Moriya et al. |
| 2008/0137748 A1 | 6/2008 | Kondo et al. |
| 2008/0159641 A1 | 7/2008 | Moriya et al. |
| 2008/0165849 A1 | 7/2008 | Moriya et al. |
| 2008/0192827 A1 | 8/2008 | Beric et al. |
| 2008/0267287 A1 | 10/2008 | Hannuksela |
| 2009/0010323 A1* | 1/2009 | Su .......................... H04N 19/58 375/E7.199 |
| 2009/0016439 A1 | 1/2009 | Thoreau et al. |
| 2009/0028249 A1 | 1/2009 | Gomila et al. |
| 2009/0034856 A1 | 2/2009 | Moriya et al. |
| 2009/0034857 A1 | 2/2009 | Moriya et al. |
| 2009/0052529 A1 | 2/2009 | Kim et al. |
| 2009/0123066 A1 | 5/2009 | Moriya et al. |
| 2009/0141814 A1 | 6/2009 | Yin et al. |
| 2009/0168874 A1 | 7/2009 | Su et al. |
| 2009/0310676 A1 | 12/2009 | Yang |
| 2010/0098157 A1 | 4/2010 | Yang |
| 2010/0189173 A1 | 7/2010 | Chen et al. |
| 2010/0202539 A1 | 8/2010 | Kondo et al. |
| 2010/0215093 A1 | 8/2010 | Schlockermann et al. |
| 2010/0278267 A1 | 11/2010 | Lai et al. |
| 2011/0038419 A1 | 2/2011 | Han et al. |
| 2011/0096835 A1 | 4/2011 | Lim et al. |
| 2011/0170602 A1 | 7/2011 | Lee et al. |
| 2011/0176611 A1 | 7/2011 | Huang et al. |
| 2011/0255598 A1 | 10/2011 | Lin et al. |
| 2011/0255600 A1 | 10/2011 | Lin et al. |
| 2012/0008688 A1* | 1/2012 | Tsai ..................... H04N 19/176 375/E7.125 |
| 2012/0027097 A1 | 2/2012 | Lin et al. |
| 2012/0063514 A1 | 3/2012 | Lin et al. |
| 2012/0121015 A1 | 5/2012 | Yang |
| 2012/0128060 A1 | 5/2012 | Lin et al. |
| 2012/0147964 A1 | 6/2012 | Schlockermann et al. |
| 2012/0207220 A1 | 8/2012 | Kim et al. |
| 2012/0207221 A1 | 8/2012 | Aono et al. |
| 2012/0219063 A1* | 8/2012 | Kim ..................... H04N 19/463 375/E7.243 |
| 2012/0224643 A1 | 9/2012 | Wang et al. |
| 2012/0257674 A1 | 10/2012 | Macq |
| 2012/0269265 A1 | 10/2012 | Macq |
| 2012/0287999 A1 | 11/2012 | Li et al. |
| 2012/0328024 A1 | 12/2012 | Kondo et al. |
| 2013/0016788 A1 | 1/2013 | Oh |
| 2013/0107958 A1 | 5/2013 | Shimada et al. |
| 2013/0114722 A1 | 5/2013 | Koyama et al. |
| 2013/0156108 A1 | 6/2013 | Jeon et al. |
| 2013/0163672 A1 | 6/2013 | Jeon et al. |
| 2013/0177076 A1 | 7/2013 | Itani et al. |
| 2013/0188721 A1 | 7/2013 | Jeong et al. |
| 2013/0188722 A1 | 7/2013 | Jeon et al. |
| 2013/0195192 A1 | 8/2013 | Jeon et al. |
| 2013/0202045 A1 | 8/2013 | Jeon et al. |
| 2013/0202046 A1 | 8/2013 | Jeon et al. |
| 2013/0208800 A1 | 8/2013 | Jeon et al. |
| 2013/0208993 A1 | 8/2013 | Jeon et al. |
| 2013/0242048 A1 | 9/2013 | Yin et al. |
| 2013/0251034 A1 | 9/2013 | Kim et al. |
| 2013/0259125 A1 | 10/2013 | Kim et al. |
| 2013/0272375 A1 | 10/2013 | Yu et al. |
| 2014/0064375 A1 | 3/2014 | Kondo et al. |
| 2014/0064376 A1 | 3/2014 | Kondo et al. |
| 2014/0072046 A1 | 3/2014 | Kondo et al. |
| 2014/0072047 A1 | 3/2014 | Kondo et al. |
| 2014/0105297 A1 | 4/2014 | Jeon et al. |
| 2015/0030077 A1 | 1/2015 | Jeon et al. |
| 2015/0030078 A1 | 1/2015 | Jeon et al. |
| 2015/0030079 A1 | 1/2015 | Jeon et al. |
| 2015/0030080 A1 | 1/2015 | Jeon et al. |
| 2015/0131724 A1 | 5/2015 | Lin et al. |
| 2015/0131736 A1 | 5/2015 | Kondo et al. |
| 2015/0172701 A1 | 6/2015 | Kondo et al. |
| 2015/0245032 A1 | 8/2015 | Itani et al. |
| 2015/0245035 A1 | 8/2015 | Itani et al. |
| 2015/0245057 A1 | 8/2015 | Itani et al. |
| 2015/0281725 A1 | 10/2015 | Itani et al. |
| 2016/0100185 A1 | 4/2016 | Kondo et al. |
| 2016/0112716 A1 | 4/2016 | Kondo et al. |
| 2016/0330440 A1 | 11/2016 | Abe et al. |
| 2016/0330441 A1 | 11/2016 | Abe et al. |
| 2017/0048544 A1 | 2/2017 | Kondo et al. |

(56) References Cited

U.S. PATENT DOCUMENTS

| | | | |
|---|---|---|---|
| 2017/0048545 | A1 | 2/2017 | Kondo et al. |
| 2017/0048546 | A1 | 2/2017 | Kondo et al. |
| 2017/0048547 | A1 | 2/2017 | Kondo et al. |
| 2017/0085907 | A1 | 3/2017 | Kondo et al. |
| 2017/0180749 | A1 | 6/2017 | Sugio et al. |
| 2017/0264894 | A1 | 9/2017 | Abe et al. |
| 2017/0302955 | A1 | 10/2017 | Kondo et al. |
| 2017/0302956 | A1 | 10/2017 | Kondo et al. |
| 2017/0302957 | A1 | 10/2017 | Kondo et al. |
| 2017/0324976 | A1 | 11/2017 | Kondo et al. |
| 2018/0124393 | A1 | 5/2018 | Abe et al. |
| 2018/0376136 | A1 | 12/2018 | Abe et al. |

FOREIGN PATENT DOCUMENTS

| | | |
|---|---|---|
| CN | 101557461 | 10/2009 |
| CN | 101641954 | 2/2010 |
| CN | 102223542 | 10/2011 |
| EP | 0 817 491 | 3/2002 |
| EP | 2 009 923 | 12/2008 |
| EP | 2 117 234 | 11/2009 |
| EP | 2 309 750 | 4/2011 |
| JP | 2009-522986 | 6/2009 |
| JP | 2009-536793 | 10/2009 |
| JP | 2009-296605 | 12/2009 |
| JP | 2011-10197 | 1/2011 |
| JP | 2011-509053 | 3/2011 |
| JP | 2011-193352 | 9/2011 |
| JP | 2013-059024 | 3/2013 |
| JP | 2013-098745 | 5/2013 |
| JP | 2013-102273 | 5/2013 |
| KR | 10-2008-0031519 | 4/2008 |
| RU | 2 360 375 | 6/2009 |
| RU | 2 368 095 | 9/2009 |
| TW | 201125369 | 7/2011 |
| TW | 201216717 | 4/2012 |
| WO | 2004/040915 | 5/2004 |
| WO | 2004/071099 | 8/2004 |
| WO | 2005/081541 | 9/2005 |
| WO | 2006/000504 | 1/2006 |
| WO | 2007/081926 | 7/2007 |
| WO | 2010/109904 | 9/2010 |
| WO | 2011/046008 | 4/2011 |
| WO | 2013/154673 | 10/2013 |

OTHER PUBLICATIONS

Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003, Ver.20, 7th Meeting: Geneva, CH, Nov. 21-30, 2011.

International Search Report issued May 14, 2013 in corresponding PCT Application No. PCT/JP2013/001198.

Viktor Wahadaniah, "AHG14/AHG15/non-CE9:Loss robustness issue in TMVP disabling", Joint Collaborative Team on Video Coding (JCT-VC) of ITU-T SG16 WP3 and ISO-IEC JTC1/SC29/WG11 JCTVC-H0570_r2,ITU-T, Feb. 8, 2012, p. 1-4.

ISO/IEC 14496-10 (MPEG-4 Part 10: Advanced Video Coding), Oct. 1, 2004.

Bin Li et al., "High-level Syntax: Temporal Information Decoding Refresh", Joint Collaborative Team on Video Coding (JCT-VC) of ITU-T SG16 WP3 and ISO/IEC JTC1/SC29/WG11, JCTVC-F201, 6th Meeting: Torino, IT, Jul. 14-22, 2011.

Chong Soon Lim et al., "High-level Syntax: Proposed fix on signaling of TMVP disabling flag", Joint Collaborative Team on Video Coding (JCT-VC) of ITU-T SG16 WP3 and ISO/IEC JTC1/SC29/WG11, JCTVC-I0420, 9th Meeting: Geneva, CH, Apr. 27-May 7, 2012.

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d9, Ver. 10, 7th Meeting: Geneva, CH, Nov. 21-30, 2011.

Richardson, H.264 and MPEG-4 Video Compression, 2003, John Wiley & Sons, Chapter 6, pp. 1-66.

Bin Li et al., "Constrained temporal motion vector prediction for error resilience", Joint Collaborative Team on Video Coding (JCT-VC) of ITU-T SG16 WP3 and ISO/IEC JTC1/SC29/WG11, JCTVC-D139, Ver. 2, 4th Meeting: Daegu, KR, Jan. 20-28, 2011.

Jian-Liang Lin et al., "Syntax for AMVP Parsing Error Control", Joint Collaborative Team on Video Coding (JCT-VC) of ITU-T SG16 WP3 and ISO/IEC JTC1/SC29/WG11, JCTVC-D126, Ver. 2, 4th Meeting: Daegu, KR, Jan. 20-28, 2011.

Bin Li et al., "High-level Syntax: Marking process for non-TMVP pictures", Joint Collaborative Team on Video Coding (JCT-VC) of ITU-T SG16 WP3 and ISO/IEC JTC1/SC29/WG11, JCTVC-G398_r1, Ver. 2, 7th Meeting: Geneva, CH, Nov. 21-30, 2011, XP030050525.

Bin Li et al., "An investigation on robust parsing", Joint Collaborative Team on Video Coding (JCT-VC) of ITU-T SG16 WP3 and ISO/IEC JTC1/SC29/WG11, JCTVC-E148, Ver. 1, 5th Meeting: Geneva, CH, Mar. 16-23, 2011, XP030008654.

International Search Report issued Apr. 9, 2013 in International (PCT) Application No. PCT/JP2013/000150.

International Search Report issued Apr. 9, 2013 in International (PCT) Application No. PCT/JP2013/000465.

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d6, Ver. 9, 7th Meeting: Geneva, CH, Nov. 21-30, 2011.

Extended European Search Report issued May 4, 2015 in European Application No. 13738409.5.

Alexis Michael Tourapis et al., "Direct Mode Coding for Bipredictive Slices in the H.264 Standard", IEEE Transactions on Circuits and Systems for Video Technology, vol. 15, No. 1, Jan. 2005, pp. 119-126, XP011124673.

Bin Li et al., "Constrained temporal motion vector prediction error for resilience", Joint Collaborative Team on Video Coding (JCT-VC) of ITU-T SG16 WP3 and ISO/IEC JTC1/SC29/WG11, JCTVC-D139, Ver. 1, 4th Meeting: Daegu, KR, Jan. 20-28, 2011, XP030008179.

Jian-Liang et al., "Parsing Error Control for Advanced Motion Vector Prediction", Joint Collaborative Team on Video Coding (JCT-VC) of ITU-T SG16 WP3 and ISO/IEC JTC1/SC29/WG11, JCTVC-D126, Ver. 1, 4th Meeting: Daegu, KR, Jan. 20-28, 2011, XP030008166.

Benjamin Bross et al., "WD5: Working Draft 5 of High-Efficiency Video Coding", Joint Collaborative Team on Video Coding (JCT-VC) of IUT-T SG16 WP3 and ISO/IEC JTC1/SC29/WG11, JCTVC-G1103_d0, Ver. 1, 7th Meeting: Geneva, CH, Nov. 21-30, 2011, XP030111032.

Extended European Search Report issued Jan. 18, 2016 in European Application No. 13757485.1.

Sang-Heon Lee et al., "Disparity vector prediction methods in MVC", Joint Video Team (JVT) of ISO/IEC MPEG & ITU-T VCEG (ISO/IEC JTC1/SC29/WG11 and ITU-T SG16 Q.6), JVT-U040r1, 21st Meeting: Hangzhou, China, Oct. 20-27, 2006, XP07913064.

Tammy Lee et al., "Syntax cleanup", Joint Collaborative Team on Video Coding (JCT-VC) of ITU-T SG16 WP3 and ISO/IEC JTC1/SC29/WG11, JCTVC-I0127, 9th Meeting: Geneva, CH, April 27-May 7, 2012, XP030111890.

Yue Yu et al., "Modifications on signaling collocated picture", Joint Collaborative Team on Video Coding (JCT-VC) of ITU-T SG16 WP3 and ISO/IEC JTC1/SC29/WG11, JCTVC-I0266, 9th Meeting: Geneva, CH, Apr. 27-May 7, 2012, XP030112029.

Bin Li et al., "High-level Syntax: Marking process for non-TMVP pictures", Joint Collaborative Team on Video Coding (JCT-VC) of ITU-T SG16 WP3 and ISO/IEC JTC1/SC29/WG11, JCTVC-G398, 7th Meeting: Geneva, CH, Nov. 21-30, 2011, XP030110382.

A. Tamhankar et al., "An Overview of H.264/MPEG-4 Part 10", 2003, EV-VIP-MC 2003, 4th EURASIP Conference focused on Video/Image Processing and Multimedia Communications, Jul. 2-5, 2003 Zagreb, Croatia, pp. 1-51.

(56) References Cited

OTHER PUBLICATIONS

H.264/AVC Textbook, Impress standard textbook series, First Edition, First Issue, Aug. 11, 2004, pp. 124-127, with partial English language translation.
Extended European Search Report dated May 4, 2016 in European Application No. 13743026.0.
Office Action dated May 5, 2016 in United States U.S. Appl. No. 14/372,377.
Viktor Wahadaniah et al., "AHG14/AHG15/non-CE9: Loss robustness issue in TMVP disabling", Joint Collaborative Team on Video Coding (JCT-VC) of Itu-T SG16 WP3 and ISO/IEC JTC1/SC29/WG11, 8th Meeting: San José, CA, USA, Jan. 27, 2012, [JCTVC-H0570], URL:http://phenix.int-evry.fr/jct/.
Notice of Allowance dated Nov. 14, 2016 in U.S. Appl. No. 13/924,965.
Office Action issued Feb. 15, 2018 in U.S. Appl. No. 15/373,856.
Office Action issued Mar. 14, 2019 in European Patent Application No. 13757485.1.
Office Action issued Mar. 29, 2019 in Indian Patent Application No. 6462/CHENP/2013.
Office Action issued for European Patent Application No. 13 743 026.0 dated Nov. 11, 2019.
Office Action issued for Indian Patent Application No. 6547/CHENP/2014 dated Aug. 4, 2020.
Office Action issued for European Patent Application No. 13 743 026.0 dated Feb. 3, 2020.
Jian-Liang Lin et al., "AhG Parsing Robustness: Constrained Usage of Temporal MV and MVP Candidates", Joint Collaborative Team on Video Coding (JCT-VC) of ITU-T SG16 WP3 and ISO/IEC JTC1/SC29/WG11, 5th Meeting: Geneva, CH, Mar. 16-23, 2011, [JCTVC-E050], ITU-T, pp. 1-6.
Benjamin Bross et al., "High efficiency video coding (HEVC) text specification draft 8", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, [JCTVC-J1003_d7], JCTVC-J1003 (version 8), pp. 29-30, 36-38, 64, 74-75.
Office Action issued for European Patent Application No. 13 743 026.0 dated May 7, 2020.
Summons to attend oral proceedings issued Dec. 16, 2020 in European Patent Application No. 13757485.1.
Bross et al., "High efficiency video coding (HEVC) text specification draft 8", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, [JCTVC-J1003_d7], JCTVC-J1003 (version 8), pp. 29-30, 36-38, 60-65, 72-77,121-123.
Extended European Search Report issued May 6, 2021 in European Patent Application No. 21151386.6.
Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F803_d5, Oct. 28, 2011, XP030229353.
Decision to refuse issued May 25, 2021 in European Patent Application No. 13757485.1.
Benjamin Bross et al., High efficiency video coding (HEVC) text specification draft 8, Joint Collaborative Team on Video Coding (JCT-VC) of ITU-T SG16 WP3 and ISO/IEC JTC1/SC29/WG11, 10th Meeting: Stockholm, SE, Jul. 11-20, 2012, [JCTVC-J1003_d7], JCTVC-J1003 (version 8), pp. 29-30, 36-38, 46, 60-65, 72-77, 121-123.
Benjamin Bross et al., High efficiency video coding (HEVC) text specification draft 6, Joint Collaborative Team on Video Coding (JCT-VC) of ITU-T SG16 WP3 and ISO/IEC JTC1/SC29/WG11 7th Meeting: Genova, CH, Nov. 21-30, 2011, [JCTVC-H1003], JCTVC-H1003 (version 20) pp. 27, 34-36, 47-48, 113-114, 119-120, 123-124.
Benjamin Bross et al., High efficiency video coding (HEVC) text specification draft 8, Joint Collaborative Team on Video Coding (JCT-VC) of ITU-T SG16 WP3 and ISO/IEC JTC1/SC29/WG11 10th Meeting: Stockholm, SE, Jul. 11-20, 2012, [JCTVC-J1003_d7], JCTVC-J1003 (version 8), pp. 29-30, 36-38, 112-114, 117-118, 121-123.
Extended European Search Report issued Jan. 17, 2025 in European Patent Application No. 24205807.1.
Benjamin Bross et al., "High efficiency video coding (HEVC) text specification draft 6," Joint Collaborative Team on Video Coding (JCT-VC), 7th Meeting: Geneva, CH, Nov. 21-30, 2011, Document: JCTVC-H1003_dI, Feb. 17, 2012, XP055068694, 267 pages.

\* cited by examiner

FIG. 5

| Motion vector predictor index | Assigned bit sequence |
|---|---|
| 0 | 0 |
| 1 | 10 |
| 2 | 110 |
| 3 | 1110 |
| 4 | 1111 |

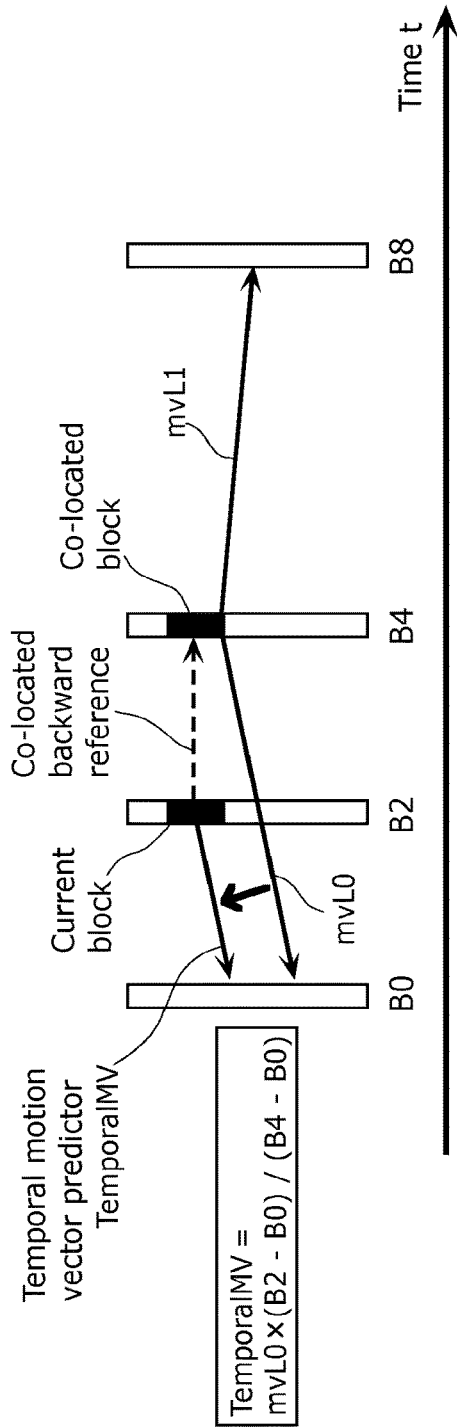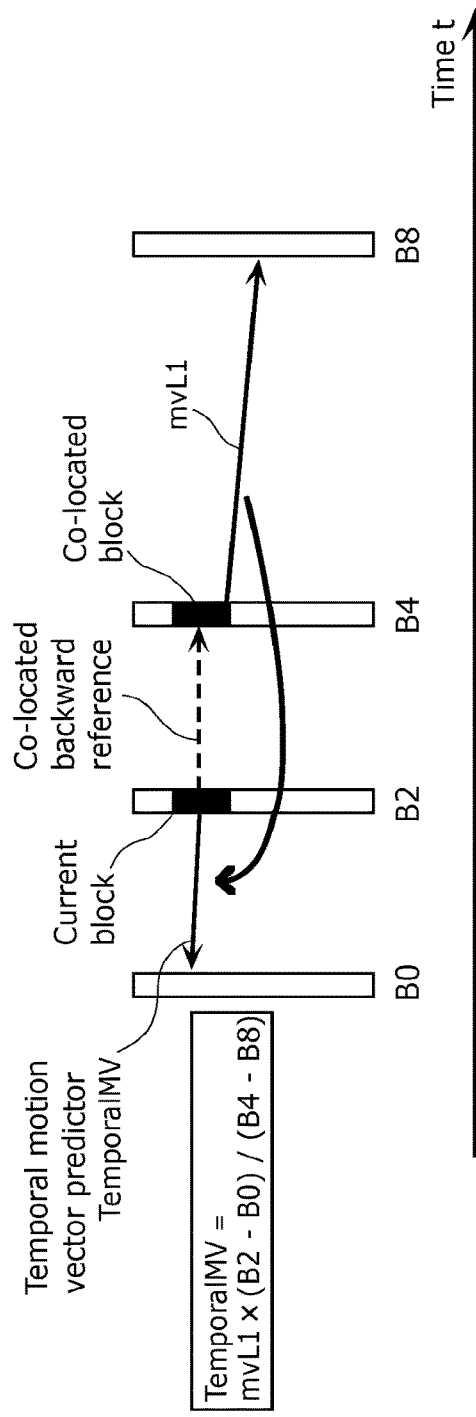

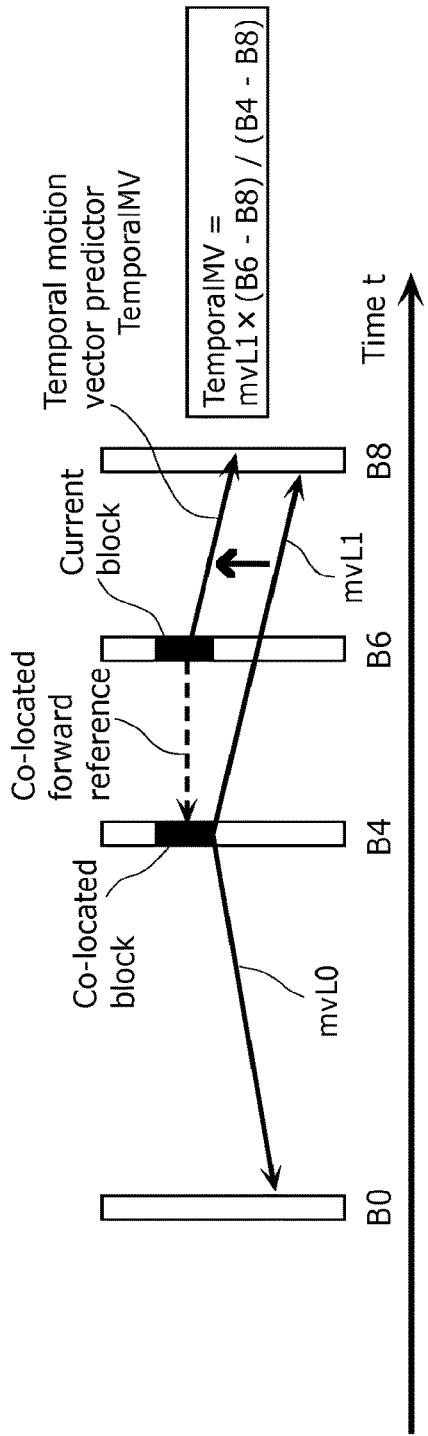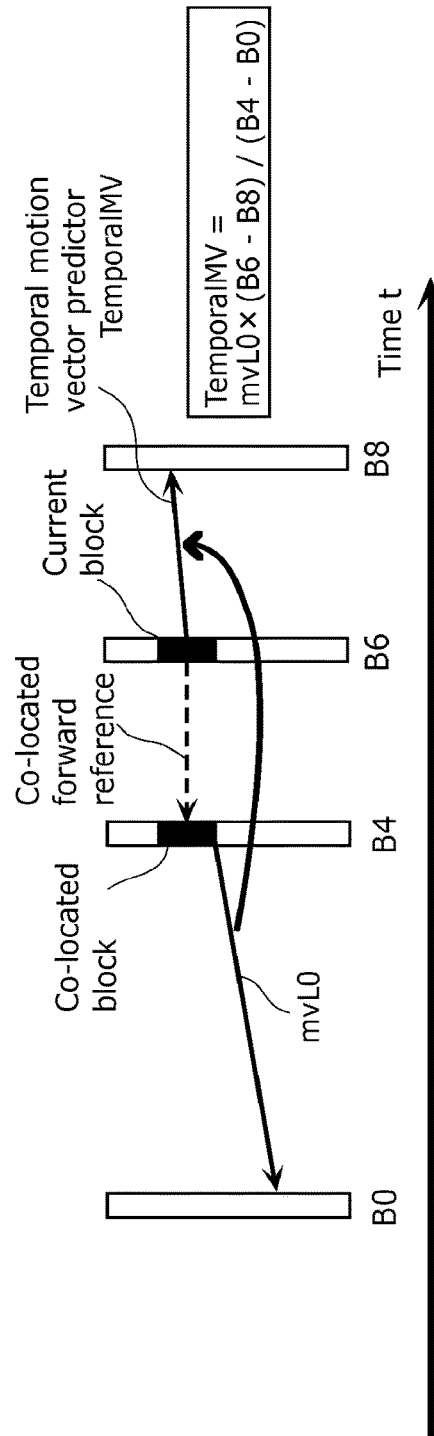

FIG. 19A pic_parameter_set_rbsp() {
pic_parameter_set_id — ue(v)
...
enable_temporal_mvp_flag — u(1) — Co-located use prohibition flag
...
}

FIG. 19B

Prohibit use of co-located information
Collocated_from_l0_flag and collocated_ref_idx are not added to bitstream when (enable_temporal_mvp_flag is 0)

slice_header() {
first_slice_in_pic_flag — u(1)
...
if( enable_temporal_mvp_flag ) {
  if( slice_type == B )
    collocated_from_l0_flag — u(1) — Co-located reference direction flag
  if( slice_type != I &&
    ((collocated_from_l0_flag &&
    num_ref_idx_l0_active_minus1 > 0) ||
    (!collocated_from_l0_flag &&
    num_ref_idx_l1_active_minus1 > 0)))
    collocated_ref_idx — ue(v) — Co-located reference picture index
}
...
}

FIG. 32

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 43

| Corresponding standard | Driving frequency |
|---|---|
| MPEG-4 AVC | 500 MHz |
| MPEG-2 | 350 MHz |
| ⋮ | ⋮ |

MOVING PICTURE CODING METHOD, MOVING PICTURE DECODING METHOD, MOVING PICTURE CODING APPARATUS, MOVING PICTURE DECODING APPARATUS, AND MOVING PICTURE CODING AND DECODING APPARATUS

CROSS REFERENCE TO RELATED APPLICATIONS

This application is a continuation of U.S. application Ser. No. 18/089,761 filed on Dec. 28, 2022, which is a continuation of U.S. application Ser. No. 17/102,608, now U.S. Pat. No. 11,595,682, filed on Nov. 24, 2020, which is a continuation of U.S. application Ser. No. 16/708,833, now U.S. Pat. No. 10,880,572, filed on Dec. 10, 2019, which is a continuation of U.S. application Ser. No. 16/233,470, now U.S. Pat. No. 10,560,716, filed on Dec. 27, 2018, which is a continuation of U.S. application Ser. No. 15/260,529, now U.S. Pat. No. 10,212,447, filed on Sep. 9, 2016, which is a continuation of U.S. application Ser. No. 13/783,435, now U.S. Pat. No. 9,479,777, filed on Mar. 4, 2013, claiming the benefit of priority of U.S. Provisional Application No. 61/607,028 filed on Mar. 6, 2012. The entire disclosures of the above-identified applications, including the specifications, drawings, and claims are incorporated herein by reference in their entirety.

FIELD

The present disclosure relates to a moving picture coding method and a moving picture decoding method.

BACKGROUND

In the moving picture coding process, the amount of data is compressed using redundancy of a moving picture in a spatial direction and a temporal direction in general. A transformation into a frequency domain is generally used as a method for using the redundancy in the spatial direction. In addition, as a way to use the redundancy in the temporal direction, an inter-picture prediction (hereafter referred to as an inter prediction) coding is used (for example, see the Non-Patent Literature 1).

CITATION LIST

Non Patent Literature

[Non-Patent Literature 1] ITU-T Recommendation H. 264 "Advanced Video Coding for Generic Audiovisual Services" March, 2010

SUMMARY

Technical Problem

In the moving picture coding method and the moving picture decoding method, improvement on coding efficiency is desired.

One non-limiting and exemplary embodiment provides a moving picture coding method and a moving picture decoding method capable of improving the coding efficiency.

Solution to Problem

One non-limiting and exemplary embodiment provides a moving picture coding method includes coding a first flag indicating whether or not temporal motion vector prediction using a temporal motion vector predictor which is a motion vector of a block included in a coded picture different from the current picture is used; when the first flag indicates that the temporal motion vector prediction is used: coding a first parameter for calculating the temporal motion vector predictor; deriving, using the first parameter, a plurality of first motion vector predictor candidates including the temporal motion vector predictor; coding a motion vector used for performing inter predictive coding on the current block, using one of the first motion vector predictor candidates; when the first flag indicates that the temporal motion vector prediction is not used: deriving a plurality of second motion vector predictor candidates that do not include the temporal motion vector predictor; and coding a motion vector used for performing inter predictive coding on the current block, using one of the second motion vector predictor candidates, wherein when the first flag indicates that the temporal motion vector prediction is not used, the first parameter is not coded.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

The present disclosure provides a moving picture coding method and a moving picture decoding method capable of improving the coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

These and other objects, advantages and features of the disclosure will become apparent from the following description thereof taken in conjunction with the accompanying drawings that illustrate a specific embodiment of the present disclosure.

FIG. 5 illustrates an example of list of codes when performing variable length coding on a motion vector predictor index according to the embodiment 1.

FIG. 11A illustrates an example of method for deriving a motion vector predictor candidate using a forward reference motion vector according to the embodiment 1.

FIG. 11B illustrates an example of method for deriving a motion vector predictor candidate using a backward reference motion vector according to the embodiment 1.

FIG. 12A illustrates an example of method for deriving a motion vector predictor candidate using a backward reference motion vector according to the embodiment 1.

FIG. 12B illustrates an example of method for deriving a motion vector predictor candidate using a forward reference motion vector according to the embodiment 1.

FIG. 19A is a diagram illustrating an example of syntax according to the embodiment 2.

FIG. 19B is a diagram illustrating an example of syntax according to the embodiment 2.

FIG. 32 illustrates a structure of multiplexed data.

FIG. 43 shows an example of a look-up table in which video data standards are associated with the driving frequencies.

DESCRIPTION OF EMBODIMENT(S)

(Underlying Knowledge of the Present Disclosure)

The inventors found out the following problem concerning the conventional technology.

When performing inter predictive coding on a picture, the moving picture coding apparatus uses a coded picture preceding or following the current picture in display order (display time order) as a reference picture. Subsequently, the moving picture coding apparatus derives a motion vector by motion estimation of the current picture with respect to the reference picture, and calculates a difference between the predictive image data obtained by performing motion compensation based on the motion vector and the image data of the current picture. This eliminates redundancy in temporal direction. When estimating motion, the moving image coding apparatus calculates a difference value between the current block in the current picture and a block in the reference picture, and selects a block in a reference picture having a smallest difference value as the reference block. Subsequently, the moving image coding apparatus estimates the motion vector using the current block and the reference block.

In a standardized moving picture coding method referred to as H.264, three types of pictures, that is, I picture, P picture, and B picture are used for compressing the amount of data. I picture is a picture on which no inter predictive coding is performed; that is, only intra picture prediction (hereinafter referred to as intra prediction) is performed. P picture is a picture on which the inter predictive coding is performed by referring only one coded picture preceding or following the current picture in display order. B picture is a picture on which the inter predictive coding is performed by referring two coded pictures preceding or following the current picture in display order.

In the moving picture coding method referred to as H.264, a motion vector estimation mode for coding a motion vector used for generating a difference value between the predictive image data and the current block and a motion vector used for generating the predictive image data is used as a mode for inter predictive coding on the current block for B pictures. In the motion vector estimation mode, the moving image coding apparatus can select, as the prediction direction, either a bi-prediction for generating a predictive image by referring to two coded pictures preceding or following the current picture or a uni-prediction for generating a predictive image by referring to one coded picture preceding or following the current picture.

Furthermore, in the moving picture coding method referred to as H.264, the moving picture coding apparatus can select a coding mode referred to as temporal motion vector prediction (temporal motion vector predictor mode or temporal direct mode) when deriving a motion vector for coding a B picture. A motion vector predictor generated by temporal motion vector prediction (motion vector predictor candidate) is referred to as a temporal motion vector predictor.

Figure 1:
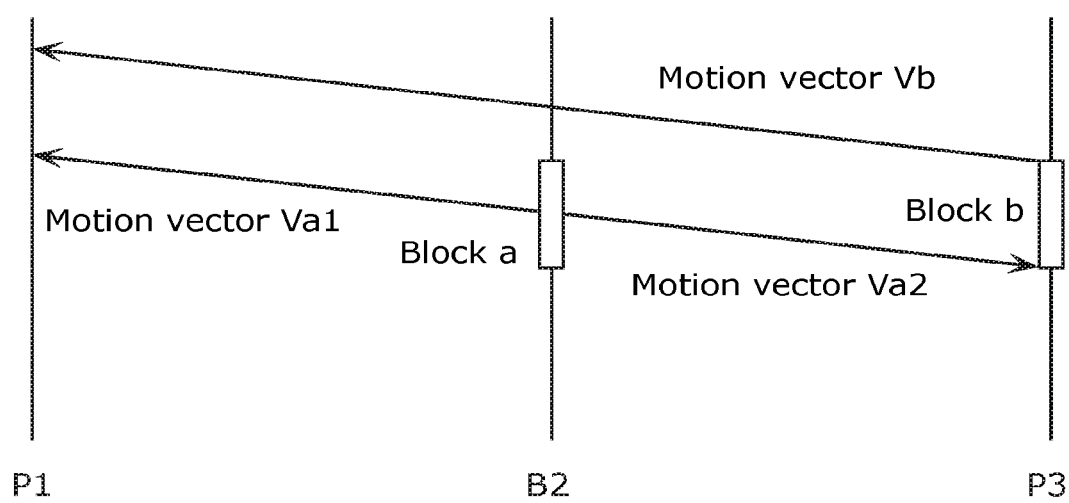
FIG. 1 is a diagram for describing a motion vector in a temporal motion vector prediction.

The inter predictive coding method in temporal motion vector prediction shall be described with reference to FIG. 1. FIG. 1 is an explanatory diagram illustrating motion vectors in temporal motion vector prediction, and illustrates a case where a block a in the picture B2 is coded by temporal motion vector prediction.

In this case, a motion vector vb in the picture P3 which is a reference picture subsequent to the picture B2 in the same location as the block a is used. The motion vector vb is a motion vector used for coding the block b, and refers to the picture P1. Subsequently, the moving picture coding apparatus obtains a reference block from a picture P1, a forward reference picture, and from a picture P3, a backward reference picture, and codes the block a by bi-prediction. To put it differently, the motion vector used for coding the block a is a motion vector va1 with regard to the picture P1, and is a motion vector va2 with regard to the picture P3.

However, in the temporal motion vector prediction, the information on a reference picture having information on motion vector and others used for calculating the temporal motion vector predictor is lost due to packet loss in streaming distribution, for example, a decoded image is degraded since the correct temporal motion vector predictor cannot be calculated. Furthermore, an error is propagated to a picture which refers to the decoded image, and the decoding process may stop as a result. For example, when the information on the reference picture P3 in FIG. 1 is lost, the temporal motion vector predictor for the picture B2 cannot be calculated. As a result, there is a case in which the picture B2 is not correctly decoded and the decoding process stops.

In response to this problem, the moving picture coding method and the moving picture decoding method capable of preventing the propagation of error in decoding shall be described in this embodiment.

In the moving picture coding method and the moving picture decoding method, improvement on coding efficiency is desired. Accordingly, in this embodiment, a moving picture coding method and a motion picture decoding method capable of improving the coding efficiency shall be described.

In the moving picture coding method according to an aspect of the present disclosure, moving picture coding method for coding a current block to be coded included in a current picture to be coded by inter predictive coding using a motion vector, the moving picture coding method includes: coding a first flag indicating whether or not temporal motion vector prediction using a temporal motion vector predictor which is a motion vector of a block included in a coded picture different from the current picture is used; when the first flag indicates that the temporal motion vector prediction is used: coding a first parameter for calculating the temporal motion vector predictor; deriving, using the first parameter, a plurality of first motion vector predictor candidates including the temporal motion vector predictor; coding a motion vector used for performing inter predictive coding on the current block, using one of the first motion vector predictor candidates; when the first flag indicates that the temporal motion vector prediction is not used: deriving a plurality of second motion vector predictor candidates that do not include the temporal motion vector predictor; and coding a motion vector used for performing inter predictive coding on the current block, using one of the second motion vector predictor candidates, wherein when the first flag indicates that the temporal motion vector prediction is not used, the first parameter is not coded.

With this, in the moving picture coding method, the first parameter which is not necessary is not coded when the temporal motion vector prediction is not used. With this, the moving picture coding method can improve the coding efficiency.

For example, the first parameter may include a parameter for specifying the coded picture.

For example, the first parameter may include a reference picture index for specifying the coded picture among a plurality of pictures indicated by a reference picture list used for coding the current picture.

For example, the first parameter may include a flag indicating a reference picture list to be used for specifying the coded picture among a plurality of reference picture lists used for coding the current picture.

For example, when deriving the first or second candidate, a replacement vector replacing the temporal motion vector predictor may be included in the first motion vector predictors or the second motion vector predictors.

With this, the moving picture coding method can suppress the reduction in coding efficiency.

For example, the moving picture coding method being for coding pictures belonging to a base view and a dependent view in a multi-view video, the moving picture coding method may further include generating a disparity vector corresponding to a disparity between the base view and the dependent view, in which in deriving the first candidate, the disparity vector is included in the first motion vector predictors as the replacement vector, when the current picture belongs to the dependent view and is at the beginning of a group of pictures (GOP).

With this, the moving picture coding method can suppress the reduction in coding efficiency.

For example, the moving picture coding method being for coding pictures belonging to a base view and a dependent view in a multi-view video, the moving picture coding method may further include generating a disparity vector corresponding to a disparity between the base view and the dependent view, in which in deriving the second candidate, the disparity vector is included in the second motion vector predictors as the replacement vector.

With this, the moving picture coding method can suppress the reduction in coding efficiency.

A moving picture decoding method according to an aspect of the present disclosure is a moving picture decoding method for decoding a current block to be decoded included in a current picture to be decoded by inter predictive decoding using a motion vector, the moving picture decoding method includes: decoding a first flag indicating whether or not temporal motion vector prediction using a temporal motion vector predictor which is a motion vector of a block included in a decoded picture different from the current picture is used; when the first flag indicates that the temporal motion vector prediction is used: decoding a first parameter for calculating the temporal motion vector predictor; deriving, using the first parameter, a plurality of first motion vector predictor candidates including the temporal motion vector predictor; decoding a motion vector used for performing inter predictive decoding on the current block using one of the first motion vector predictor candidates; when the first flag indicates that the temporal motion vector prediction is not used: deriving a plurality of second motion vector predictor candidates that do not include the temporal motion vector predictor; and decoding a motion vector used for performing inter predictive decoding on the current block, using one of the second motion vector predictor candidates, wherein when the first flag indicates that the temporal motion vector prediction is not used, the first parameter is not decoded.

With this, in the moving picture decoding method, the first parameter which is not necessary is not decoded when the temporal motion vector prediction is not used. With this, the moving picture decoding method can improve the coding efficiency.

For example, the first parameter may include a parameter for specifying the decoded picture.

For example, the first parameter may include a reference picture index for specifying the decoded picture among a plurality of pictures indicated by a reference picture list used for decoding the current picture.

For example, the first parameter may include a flag indicating a reference picture list to be used for specifying the coded picture among a plurality of reference picture lists used for decoding the current picture.

For example, when deriving the first or second candidate, a replacement vector replacing the temporal motion vector predictor may be included in the first motion vector predictors or the second motion vector predictors.

With this, the moving picture decoding method can suppress the reduction in coding efficiency.

For example, the moving picture decoding method being for decoding pictures belonging to a base view and a dependent view in a multi-view video, the moving picture decoding method may further include generating a disparity vector corresponding to disparity between the base view and the dependent view, in which in deriving the first candidate, the disparity vector may be included in the first motion vector predictor candidates as the replacement vector, when the current picture belongs to the dependent view and is at the beginning of a group of pictures (GOP).

With this, the moving picture decoding method can suppress the reduction in coding efficiency.

For example, the moving picture decoding method being for decoding pictures belonging to a base view and a dependent view in a multi-view video, the moving picture decoding method may further include generating a disparity vector corresponding to disparity between the base view and the dependent view, in which in deriving the second candidate, the disparity vector is included in the second motion vector predictors as the replacement vector.

With this, the moving picture decoding method can suppress the reduction in coding efficiency.

A moving picture coding apparatus according to an aspect of the present disclosure is a moving picture coding apparatus includes: a control circuitry; and a storage accessible to the control circuitry, in which the control circuitry executes coding a first flag indicating whether or not temporal motion vector prediction using a temporal motion vector predictor which is a motion vector of a block included in a coded picture different from the current picture is used; when the first flag indicates that the temporal motion vector prediction is used: coding a first parameter for calculating the temporal motion vector predictor; deriving, using the first parameter, a plurality of first motion vector predictor candidates including the temporal motion vector predictor; coding a motion vector used for performing inter predictive coding on the current block, using one of the first motion vector predictor candidates; when the first flag indicates that the temporal motion vector prediction is not used: deriving a plurality of second motion vector predictor candidates that do not include the temporal motion vector predictor; and coding a motion vector used for performing inter predictive coding on the current block, using one of the second motion vector predictor candidates, wherein when the first flag indicates that the temporal motion vector prediction is not used, the first parameter is not coded.

With this, in the moving picture coding apparatus, the first parameter which is not necessary is not decoded when the temporal motion vector prediction is not used. With this, the moving picture coding apparatus can improve the coding efficiency.

A moving picture decoding apparatus according to an aspect of the present disclosure is a moving picture coding and decoding apparatus comprising: a control circuitry; and a storage accessible to the control circuitry, the control circuitry performs: decoding a current picture to be decoded by inter predictive decoding using the motion vector; decoding a first flag indicating whether or not temporal motion vector prediction using a temporal motion vector predictor which is a motion vector of a block included in a decoded picture different from the current picture is used; when the first flag indicates that the temporal motion vector prediction is used: decoding a first parameter for calculating the temporal motion vector predictor; deriving, using the first parameter, a plurality of first motion vector predictor candidates including the temporal motion vector predictor; decoding a motion vector used for performing inter predictive decoding on the current block, using one of the first motion vector predictor candidates; when the first flag indicates that the temporal motion vector prediction is not used: deriving a plurality of second motion vector predictor candidates that do not include the temporal motion vector predictor; and decoding a motion vector used for performing inter predictive decoding on the current block, using one of the second motion vector predictor candidates, in which when the first flag indicates that the temporal motion vector prediction is not used, the first parameter is not decoded.

With this, the moving picture decoding apparatus does not decode the first parameter which is not necessary when the temporal motion vector prediction is not used. With this, the moving picture decoding apparatus can improve the coding efficiency.

Furthermore, the moving picture decoding apparatus according to an aspect of the present disclosure includes the moving picture coding apparatus and the moving picture decoding apparatus.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are described in detail with reference to the Drawings.

Each of the exemplary embodiments described below shows a general or specific example. The numerical values, shapes, materials, structural elements, the arrangement and connection of the structural elements, steps, the processing order of the steps and others shown in the following exemplary embodiments are mere examples, and therefore do not limit the present disclosure. Furthermore, among the components in the following embodiments, the components not recited in an independent claim encompassing the most generic concept shall be considered as optional components.

Embodiment 1

Figure 2:
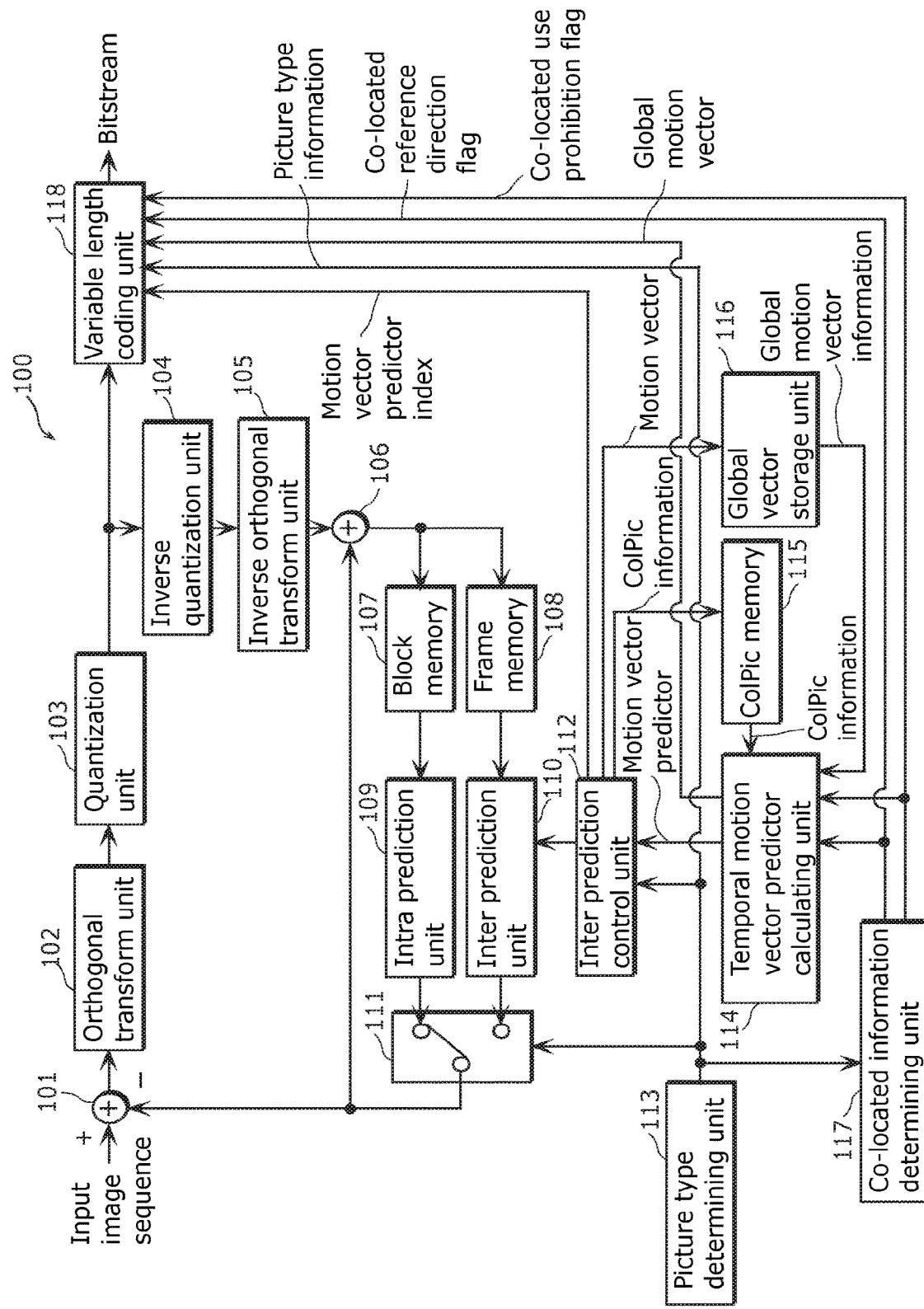
FIG. 2 is a block diagram of a moving picture coding apparatus according to the embodiment 1.

FIG. 2 is a block diagram illustrating configuration of a moving picture coding apparatus using a moving picture coding method according to the embodiment 1.

As illustrated in FIG. 2, the moving picture coding apparatus 100 includes a subtractor 101, an orthogonal transform unit 102, a quantization unit 103, an inverse quantization unit 104, an inverse orthogonal transform unit 105, an adder 106, a block memory 107, a frame memory 108, an intra prediction unit 109, an inter prediction unit 110, the switch 111, an inter prediction control unit 112, a picture type determining unit 113, a temporal motion vector predictor calculating unit 114, a colPic memory 115, an global vector storage unit 116, a co-located information determining unit 117, and a variable length coding unit 118.

The subtractor 101 obtains an input image sequence including a current block from outside of the apparatus, obtains a predictive block from a switch 111, subtracts the predictive block from the current block so as to generate a differential block, and outputs the differential block to the orthogonal transform unit 102.

The orthogonal transform unit 102 generates a transform coefficient by transforming the differential block obtained from the subtractor 101 from the image domain to the frequency domain, and outputs the generated transform coefficient to the quantization unit 103. The quantization unit 103 generates a quantized coefficient by quantizing the transform coefficient obtained from the quantization unit 103, and outputs the generated quantized coefficient to the inverse quantization unit 104 and the variable length coding unit 118.

The inverse quantization unit 104 reconstructs the transform coefficient by performing inverse quantization on the quantized coefficient obtained from the quantization unit 103, and outputs the reconstructed transform coefficient to the inverse orthogonal transform unit 105. The inverse orthogonal transform unit 105 reconstructs the differential block by transforming the restored transform coefficient obtained from the inverse quantization unit 104 from the frequency domain to an image domain, and outputs the reconstructed differential block to the adder 106.

The adder 106 reconstructs the current block by adding the reconstructed differential block obtained from the inverse orthogonal transform unit 105 and the predictive block obtained from the switch 111, and outputs the reconstructed current block to the block memory 107 and the frame memory 108. The block memory 107 stores the reconstructed input image sequence on a block basis. The frame memory 108 stores the reconstructed input image sequence on a frame basis.

The picture type determining unit 113 determines a picture type, among I picture, B picture, and P picture, to be used for coding the input image sequence, and generates picture type information indicating the determined picture type. Subsequently, the picture type determining unit 113 outputs the generated picture type information to the switch 111, the inter prediction control unit 112, the co-located information determining unit 117, and the variable length coding unit 118.

The intra prediction unit 109 generates a predictive block by performing intra prediction on the current block using the reconstructed input image sequence on a block basis stored in the block memory 107, and outputs the generated predictive block to the switch 111. The inter prediction unit 110 generates the predictive block by performing inter prediction on the current block using the reconstructed input image sequence on a frame basis stored in the frame memory 108, and a motion vector derived by motion estimation, and outputs the generated predictive block to the switch 111.

The switch 111 outputs the predictive block generated by the inter prediction unit 109 or the predictive block generated by the inter prediction unit 110 to the subtractor 101 and the adder 106. For example, the switch 111 outputs a predictive block with a smaller cost for coding, among the two predictive blocks.

The co-located information determining unit 117 determines whether or not the use of co-located block is prohibited. Subsequently, the co-located information determining unit 117 generates a co-located use prohibition flag indicating the determination result for each picture, and outputs the generated co-located use prohibition flag to the temporal motion vector predictor calculating unit 114 and the variable length coding unit 118. This co-located use prohibition flag is included in a bitstream (typically a picture header or a slice header). Note that, in the embodiment 1, the temporal motion vector predictor using the information of the co-located block by prohibiting the use of co-located block by using the co-located use prohibition flag such that the temporal motion vector predictor is not added to the motion vector predictor candidate. However, it is not limited to this example. For example, a flag directly indicating whether or not a temporal predictive motion using the information of co-located block (enable_temporal_mvp_flag) is prepared, and the flag may be included in the bitstream (typically a picture header or a slice header).

Furthermore, the co-located information determining unit 117 determines the co-located block from either one of a block included in a picture preceding the current picture (hereafter referred to as a forward reference block) or a picture following the current picture (hereafter referred to as a backward reference block) in display order. In other words, the forward reference block is a block included in a reference picture specified by a reference picture list L0. The backward reference block is a block included in a reference picture specified by a reference picture list L1. Note that, in the example in the embodiment 1, the forward reference block is included in the reference picture list L0 and the backward reference block is included in the reference picture list L1. However, it is not limited to this example. For example, as in the case in which the reference picture list L0 includes the forward reference block and the reference picture list L1 includes the forward reference block, the reference block in the same direction may be included in both of the reference picture lists. Alternatively, reference blocks in opposite directions may be included in the two reference picture lists.

Subsequently, the co-located information determining unit 117 generates a co-located reference direction flag (collocated_from_10_flag) indicating the determination result for each picture, and outputs the generated co-located reference direction flag to the temporal motion vector predictor calculating unit 114 and the variable length coding unit 118. This co-located reference direction flag is included in a bitstream (typically a picture header or a slice header). For example, when the value of collocated_from_10_flag is 1, the co-located block is calculated from the reference picture list L0, and when the value of collocated_from_0_flag is 0, the co-located block is calculated from the reference picture list L1. Note that when a value indicating "prohibition" is set to the co-located use prohibition flag (for example, when the value of enable_temporal_mvp_flag is 0), the co-located reference direction flag (collocated_from_10_flag) may be omitted. The method for doing so shall be described in detail later.

Here, the co-located block is a block in a picture different from the current picture including the current block, and is a block at a position same as the current block in the picture. For example, among the pictures included in the reference picture list determined according to the value of the co-located reference direction flag, the picture having a value of the reference picture index the same as the value of the co-located reference picture index (collocated_ref_idx) is used as the co-located picture. A block in the co-located picture at the same position as the current picture is used as the co-located block.

Here, the co-located reference picture index (collocated_ref_idx) is a index value for specifying the co-located picture from the pictures included in the reference picture list determined according to the value of the co-located reference direction flag. Collocated_ref_idx is included in the bitstream (typically the picture header or the slice header).

For example, when the picture corresponding to the reference picture index 0 in the reference picture list L1 is specified as the co-located picture, the co-located information determining unit 117 sets the value 0 to the co-located reference direction flag (collocated_from_10_flag) and sets the value 0 to the co-located reference picture index collocated_ref_idx. Note that when a value indicating "prohibition" is set to the co-located use prohibition flag (for example, when the value of enable_temporal_mvp_flag is 0), the co-located reference picture index (collocated_ref_idx) may be omitted. The method for doing so shall be described in detail later. Furthermore, the positions of the current block and the co-located block in the pictures may not accurately coincide with each other. For example, the co-located information determining unit 117 may set a (adjacent) block around the co-located block of the current block in the picture different from the current picture may be set as the co-located block.

The temporal motion vector predictor calculating unit 114 derives, according to the value of the co-located use prohibition flag obtained from the co-located information determining unit 117, the motion vector predictor candidates which are candidates of the motion vector predictor using colPic information such as motion vector of the co-located block stored in the colPic memory 115 or the global motion vector of the colPic picture stored in the global vector storage unit.

More specifically, when the co-located prohibition flag is on (prohibited), the temporal motion vector predictor calculating unit 114 adds the global motion vector read from the global vector storage unit 116 (replacement vector) to the motion vector predictor candidates. In contrast, when the co-located prohibition flag is off (allowed), the temporal motion vector predictor calculating unit 114 adds the temporal motion vector predictor calculated using the colPic information read from the colPic memory 115 to the motion vector predictor candidates.

Furthermore, the temporal motion vector predictor calculating unit 114 assigns a value of the motion vector predictor to the motion vector predictor added as the candidate. Subsequently, the temporal motion vector predictor calculating unit 114 outputs the motion vector predictor added to the candidate and the motion vector predictor index to the inter prediction control unit 112. In contrast, when the co-located block does not have a motion vector, the temporal motion vector predictor calculating unit 114 stops deriving a motion vector by the temporal motion vector prediction or derives a vector with zero motion as the motion vector predictor candidate. The temporal motion vector predictor calculating unit 114 outputs the global motion vector to the variable length coding unit 118.

The inter prediction control unit 112 determines that the motion vector is to be coded using a motion vector predictor having a smallest error from the motion vector derived by the motion estimation, from among the motion vector predictor candidates. Here, the error indicates a difference value between the motion vector predictor candidate and the motion vector derived by the motion estimation, for example.

Furthermore, the inter prediction control unit 112 specifies the motion vector predictor index corresponding to the determined motion vector predictor for each block. Subsequently, the inter prediction control unit 112 outputs the motion vector predictor index and the difference value between the motion vector and the motion vector predictor to the variable length coding unit 118. Furthermore, the inter prediction control unit 112 transfers the colPic information including the motion vector and others of the current block to the colPic memory 115. The inter prediction control unit 112 transfers the motion vector and others of the current block to the global vector storage unit 116.

The colPic memory 115 stores the colPic information including a motion vector and others of the current block for a motion vector predictor used for coding the next picture. The global vector storage unit 116 calculates the global motion vector from the motion vectors of the current blocks included in a picture, and stores the global motion vector for a motion vector predictor used for coding the next picture.

The variable length coding unit 118 generates a bitstream by performing variable length coding on the quantized coefficient obtained from the quantization unit 103, the predictive emotion vector index obtained from the inter prediction control unit 112 and a difference value between the motion vector and the motion vector predictor, picture type information obtained from the picture type determining unit 113, the co-located use prohibition flag (or enable_temporal_mvp_flag), a co-located reference direction flag (collocated_from_10_flag), and a co-located reference picture index (collocated_ref_idx) obtained from the co-located information determining unit 117, and the global motion vector obtained from the temporal motion vector predictor calculating unit 114.

Figure 3:
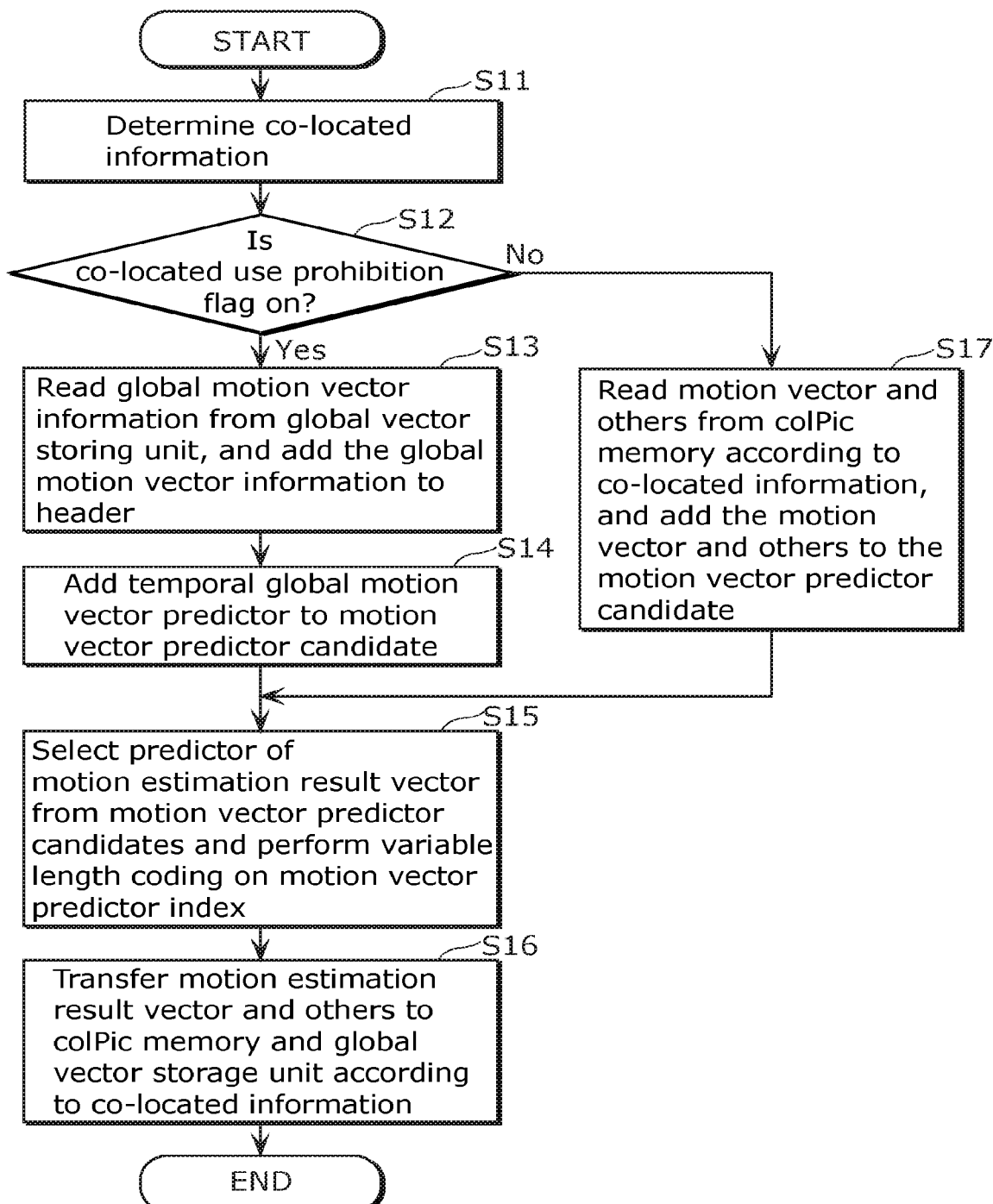
FIG. 3 is a diagram illustrating an overview of process flow of a moving picture coding method according to the embodiment 1.

FIG. 3 illustrates an overview of the process flow in the moving picture coding method according to the embodiment 1.

The co-located information determining unit 117 determines the co-located information including the co-located use prohibition flag, the co-located reference direction flag, the co-located reference picture index and others by a method that shall be described later, when deriving the motion vector predictor candidate by temporal motion vector prediction (S11).

Next, the temporal motion vector predictor calculating unit 114 determines whether or not the co-located use prohibition flag is on (prohibited) (or the value of enable_temporal_mvp_flag is 0) (S12). Subsequently, if the determination result if true (yes in S12), the temporal motion vector predictor calculating unit 114 reads the global motion vector from the global vector storage unit 116, and attaches the read global motion vector to the header information such as a picture header (S13).

Next, the temporal motion vector predictor calculating unit 114 adds, as a replacement vector for the temporal motion vector predictor, the global motion vector to the motion vector predictor candidate (S14). Furthermore, the temporal motion vector predictor calculating unit 114 assigns a value of the motion vector predictor to the motion vector predictor added to the candidate.

In contrast, when the co-located use prohibition flag is off (no in S12) (or the value of enable_temporal_mvp_flag is 1), the temporal motion vector predictor calculating unit 114 reads colPic information including the reference motion vector and others of the co-located block from the colPic memory, according to the co-located information, calculates the temporal motion vector predictor using the reference motion vector in the co-located block, and adds the calculated temporal motion vector predictor to the motion vector predictor candidates (S17). Furthermore, the temporal motion vector predictor calculating unit 114 assigns a value of the motion vector predictor to the motion vector predictor added to the candidate.

In general, if the value of the motion vector predictor index is small, a small amount of information is required. In contrast, if the value of the motion vector predictor index is large, a large amount of information is necessary. Accordingly, the coding efficiency is higher when a smaller motion vector predictor index is assigned to a motion vector predictor having a high possibility of becoming a more accurate motion vector.

Next, the inter prediction unit 110 generates the predictive block of the current block by performing inter prediction using a motion vector derived by motion estimation. Subsequently, the subtractor 101, the orthogonal transform unit 102, the quantization unit 103, and the variable length coding unit 118 code the current block by using the predictive block generated by the inter prediction unit 110.

Furthermore, the inter prediction control unit 112 codes the motion vector by using a motion vector predictor which is a motion vector predictor candidate having a smallest error from the motion vector, among the motion vector predictor candidates. The inter prediction control unit 112 calculates difference values between motion vector predictor candidates and the motion vector derived by the motion estimation as an error, and determines a motion vector predictor candidate having the smallest error among the calculated errors as the motion vector predictor to be used for coding the motion vector.

Subsequently, the inter prediction control unit 112 outputs the motion vector predictor index corresponding to the selected motion vector predictor and the error information between the motion vector and the motion vector predictor to the variable length coding unit 118. The variable length coding unit 118 performs variable length coding on the motion vector predictor index and the error information obtained from the inter prediction control unit 112, and include the variable-length coded motion vector predictor index and error information to the bitstream (S15).

Next, the inter prediction control unit 112 stores the colPic information including motion vector and others used for the inter prediction to the colPic memory 115. In the colPic memory 115, the motion vector, the reference picture index value, and the prediction direction of the reference picture are stored for calculating the temporal motion vector predictor in the current block. The inter prediction control unit 112 stores the motion vector and others used for the inter prediction in the global vector storage unit 116 (S16).

Figure 4:
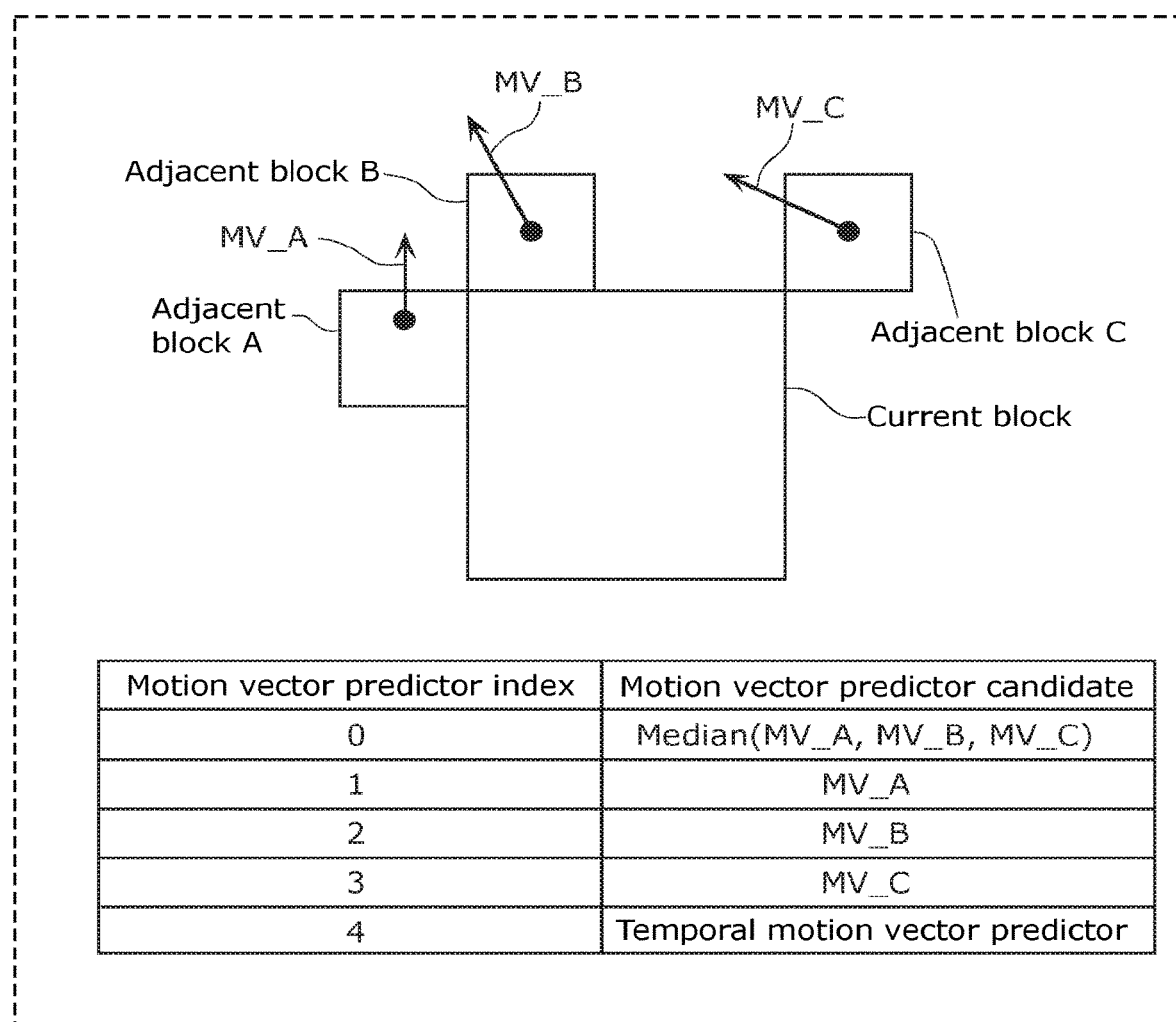
FIG. 4 illustrates an example of motion vector predictor candidates according to the embodiment 1.

FIG. 4 illustrates an example of the motion vector predictor candidates. The motion vector A (MV_A) is a motion vector of an adjacent block A on the left of the current block. The motion vector B (MV_B) is a motion vector of an adjacent block B on the current block. The motion vector C (MV_C) is a motion vector of an adjacent block C on the upper right of the current block. Median(MV_A, MV_B, MV_C) represents a median value of the motion vectors A, B, and C. Here, the median value is derived by the following equation 1 to equation 3, for example.

[Math. 1]
$$\text{Median}(x, y, z) = x + y + z - \text{Min}(x, \text{Min}(y, z)) - \text{Max}(x, \text{Max}(y, z)) \quad \text{(Expression 1)}$$

[Math. 2]
$$\text{Min}(x, y) = \begin{cases} x & (x \leq y) \\ y & (x > y) \end{cases} \quad \text{(Expression 2)}$$

[Math. 3]
$$\text{Max}(x, y) = \begin{cases} x & (x \geq y) \\ y & (x < y) \end{cases} \quad \text{(Expression 3)}$$

The values of the motion vector predictor indices are as follows: the value corresponding to Median(MV_A, MV_B, MV_C) is 0, the value corresponding to the motion vector A is 1, the value corresponding to the motion vector B is 2, the value corresponding to the motion vector C is 3, and the value corresponding to the temporal motion vector predictor (or a replacement vector) is 4. Note that, the method for assigning the motion vector predictor index is not limited to this example.

FIG. 5 illustrates an example of a code table used for the variable length coding on the motion vector predictor index. In the example illustrated in FIG. 5, a code having a shorter code length is assigned in order from a smaller value of motion vector predictor index. As described above, assigning a smaller motion vector predictor index to a motion vector predictor candidate having high possibility of prediction accuracy improves the coding efficiency.

Figure 6:
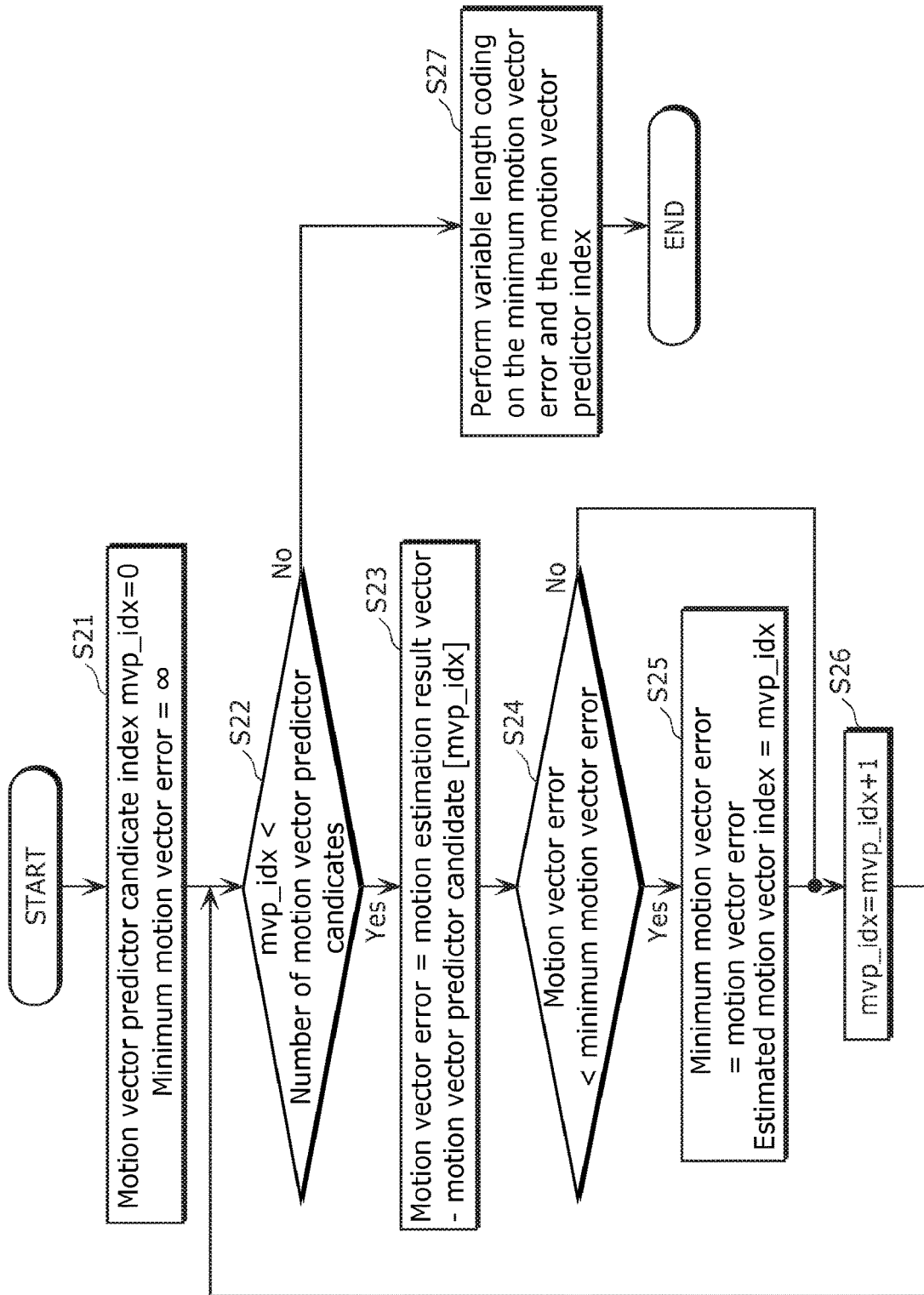
FIG. 6 is a diagram illustrating flow for determining motion vector predictor candidates according to the embodiment 1.

FIG. 6 illustrates a flow for determining the motion vector predictor candidates by the inter prediction control unit 112. By the flow illustrated in FIG. 6, the inter prediction control unit 112 determines, as the motion vector predictor to be used for coding the motion vector, the motion vector predictor candidate having the smallest error from the motion vector derived by the motion estimation. Subsequently, the variable length coding is performed on the error information between the motion vector and the motion vector predictor and the motion vector predictor index indicating the determined motion vector predictor and included in the bitstream.

More specifically, first, the inter prediction control unit 112 resets the motion vector predictor candidate index mvp_idx and the minimum motion vector error (S21). Next, the inter prediction control unit 112 compares the motion vector predictor candidate index mvp_idx and the number of predictive vector candidates (the number of records in the table illustrated in FIG. 4) (S22).

If mvp_idx<the number of motion vector predictor candidates (yes in S22), the inter prediction control unit 112 calculates the motion vector error (error information) of the motion vector predictor candidate specified among the motion vector predictor candidates by the value of current mvp_idx (S23). For example, the inter predictive control unit 112 calculates the motion vector error by subtracting the motion vector predictor candidate having the motion vector predictor index=0 in FIG. 4 from the motion vector used for coding the current block.

Next, the inter prediction control unit 112 compares the motion vector error calculated in step S23 and the minimum motion vector error (S24). If the motion vector error<minimum motion vector error (yes in S24), the inter prediction control unit 112 sets (overwrites) the motion vector error calculated in step S23 to the minimum motion vector error, and sets (overwrites) the current mvp_idx to the motion vector predictor index (S25). In contrast, if motion vector error≥minimum motion vector error (no in S24), step S25 is skipped.

The inter prediction control unit 112 increments mvp_idx only by one (S26), and repeats the process (step S22 to step S26) as many times as the number of the motion vector predictor candidates. Subsequently, with the timing when mvp_idx=the number of motion vector predictor candidates (no in S22), the inter prediction control unit 112 outputs the value set to the minimum motion vector error and the motion vector predictor index to the variable length coding unit 118, and ends the process in FIG. 6 (S27).

Figure 7:
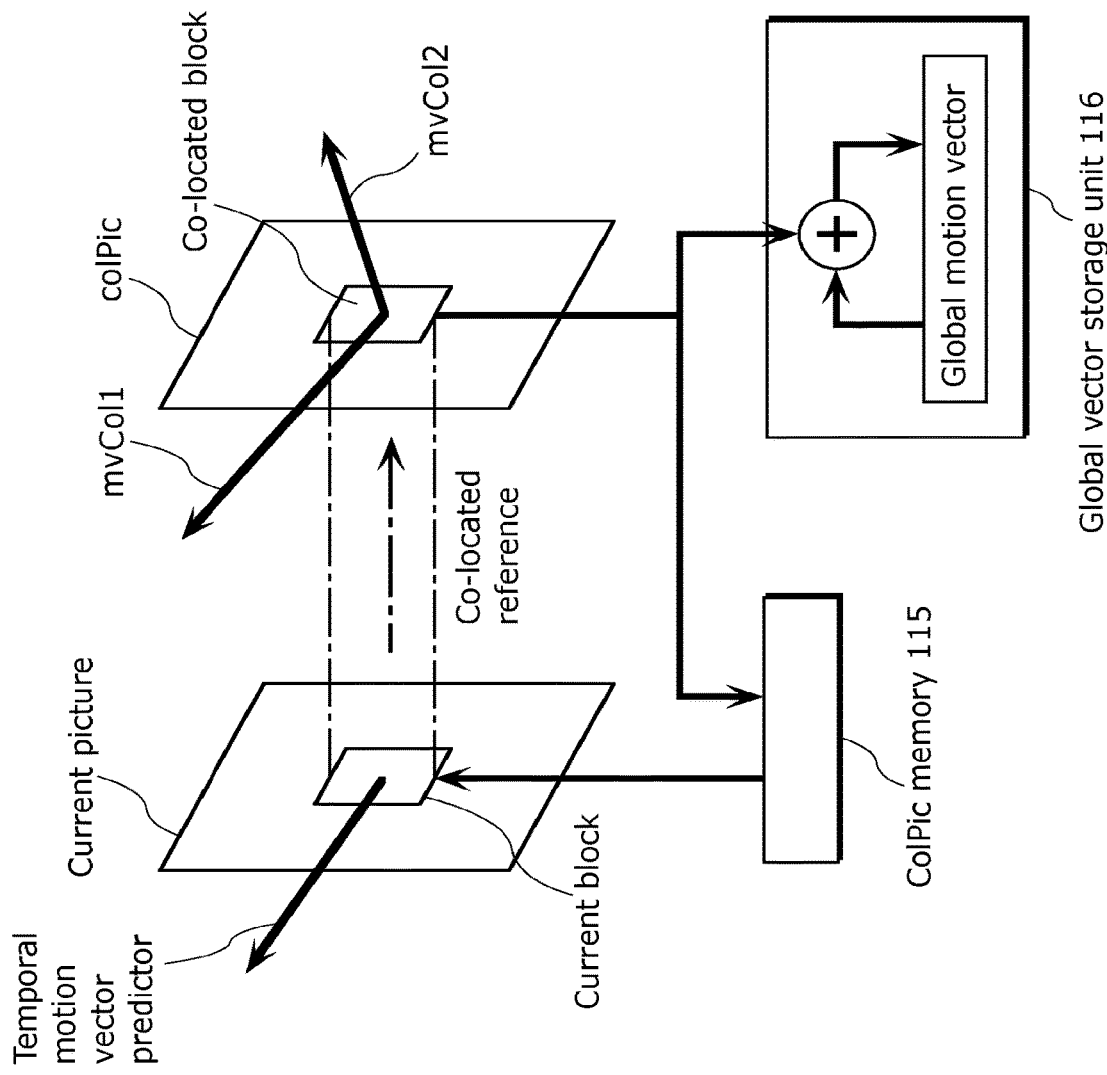
FIG. 7 is a conceptual diagram illustrating reading/writing process to/from a colPic memory and a global vector storage unit according to the embodiment 1.

FIG. 7 is a conceptual diagram illustrating reading/writing process from/on the colPic memory 115 and the global vector storage unit 116 illustrated in FIG. 2. In FIG. 7, the motion vector mvCol1 in the prediction direction 1 and the motion vector mvCol2 in the prediction direction 2 included in the co-located block in the co-located picture colPic are stored in the colPic memory 115 and the global vector storage unit 116.

Here, when the current block is coded, the colPic information including the motion vector and others stored in the colPic memory 115 or the global motion vector in the global vector storage unit 116 is read according to the co-located use prohibition flag, and added to the motion vector predictor candidates.

The motion vector predictor candidate is used for coding the motion vector in the current block. Note that, in the embodiment 1, the description is made using an example in which the prediction direction 1 is the forward reference and the prediction direction 2 is the backward reference. However, the prediction direction 1 may be the backward reference and the prediction direction 2 may be the forward reference, or both the prediction direction 1 and the prediction direction 2 may be the forward reference or the backward reference. Note that, the following is an example where the prediction direction 1 is a prediction using the reference picture list L0 and the prediction direction 2 is a prediction using the reference picture list L1.

The global vector storage unit 116 stores the global motion vector calculated from the motion vectors in the current blocks composing the current picture. For example, the global motion vector is an average value of the motion vectors in the predictive directions when performing the inter-predictive coding on the entire current picture. Note that, in the embodiment 1, an example where an average value of the motion vectors in the current blocks composing the current picture as the global vector is described. However, it is not limited to this example.

For example, the global vector may be a median value or weighted average value of the motion vectors in the current blocks composing the current picture when performing the inter-predictive coding. The global motion vector may be a motion vector which appears most frequently among the motion vectors when performing the inter predictive coding on the current blocks composing the current picture. The global motion vector may be a motion vector which refers to the closest picture in display order, among the motion vectors when performing the inter predictive coding on the current blocks composing the current picture.

Figure 8A:
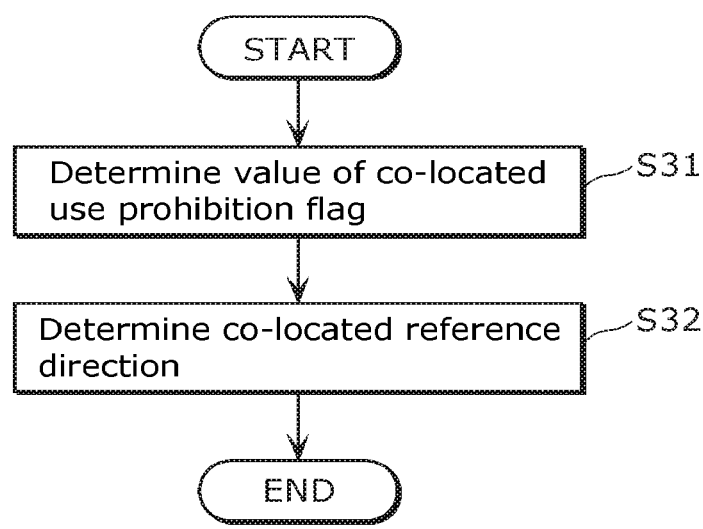
FIG. 8A illustrates a detailed process flow of S11 in FIG. 3 according to the embodiment 1.

FIG. 8A illustrates the detailed process flow of step S11 in FIG. 3. The following shall describe FIG. 8A.

First, the co-located information determining unit 117 determines whether or not the temporal motion vector prediction using the co-located block is to be performed on the current picture (S31). Subsequently, the co-located information determining unit 117 generates the co-located use prohibition flag indicating whether or not the use of the co-located block is allowed (temporal motion vector prediction) (or enable_temporal_mvp_flag) for each picture, and outputs the generated co-located use prohibition flag to the variable length coding unit 118.

For example, at the time of streaming distribution, in order to suppress the propagation of decoding error due to the temporal motion vector prediction, there is a possibility that the co-located use prohibition flag is set to be on with a constant interval. An exemplary implementation is that a counter which counts the number of coded current picture is prepared, and if the number of coded pictures is smaller than a threshold, the co-located use prohibition flag is set to be off, and if the number of coded pictures is greater than or equal to the threshold, the co-located use prohibition flag is set to be on and the counter is reset to 0.

In addition, for a picture that could be used for reference (for example, P-picture and B-picture referred to by another picture), the co-located use prohibition flag is set to be on, and for a picture that could not be used for reference (for example, B-picture not referred to by another picture), the co-located use prohibition flag is turned off so as to suppress the decoding error from propagating, for example. As described above, by setting the co-located use prohibition flag for the picture referred to by another picture to be on, it is possible to effectively suppress the decoding error from propagating.

Next, the co-located information determining unit 117 determines either the forward reference block or the backward reference block as the co-located block (S32). For example, the co-located information determining unit 117 selects, as the co-located block, a co-located block included in a picture closer to the current picture in display order among the co-located block (forward reference block) included in the forward reference picture and the co-located block (backward reference block) included in the backward reference picture. Subsequently, the co-located information determining unit 117 generates, for each picture (or slice), a co-located reference direction flag indicating whether the co-located block is the forward reference block or the backward reference block, and the co-located reference picture index for specifying the co-located picture, and outputs the generated co-located reference direction flag and the co-located reference picture index to the variable length coding unit 118.

Figure 8B:
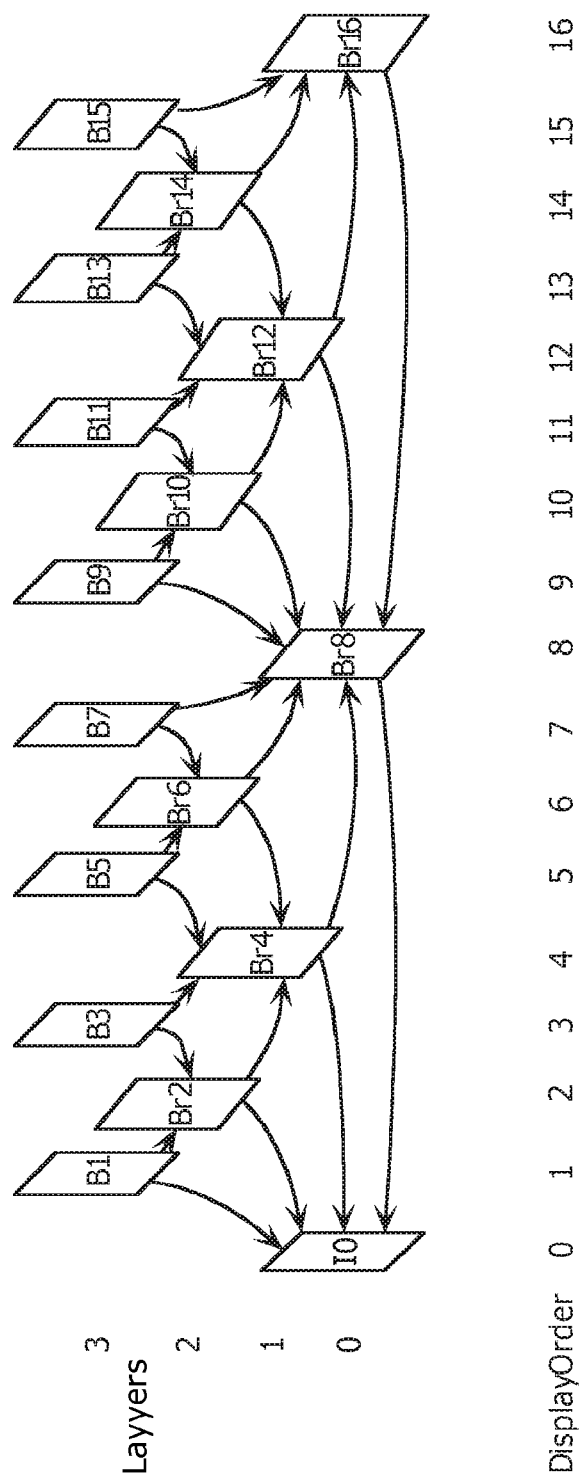
FIG. 8B is a diagram illustrating an example of B pictures referred to by other pictures according to the embodiment 1.

FIG. 8B illustrates an example of B-picture referred to by the other pictures. In the example in FIG. 8B, a reference structure having multiple layers is defined. The first picture in the stream is set to be an I-picture, and the other pictures excluding the first I-picture are set to be B-pictures. Furthermore, the picture belonging to a layer in a higher level among the layers refers to pictures in the same level or pictures belonging to a lower level than the layer.

For example, in FIG. 8B, the picture B1 belonging to the layer 3 refers to a picture 10 belonging to the layer 0 and a picture Br2 belonging to the layer 2. Furthermore, Br8 belonging to the layer 0, the lowest level, refers to the picture 10 belonging to the same layer. Here, the pictures belonging to the layer 0, the lowest level, refers only to pictures preceding in display order. In this reference structure, the co-located use prohibition flag may be turned on for a picture belonging to the layer 0, highly likely to be referred to by the other pictures.

Figure 9:
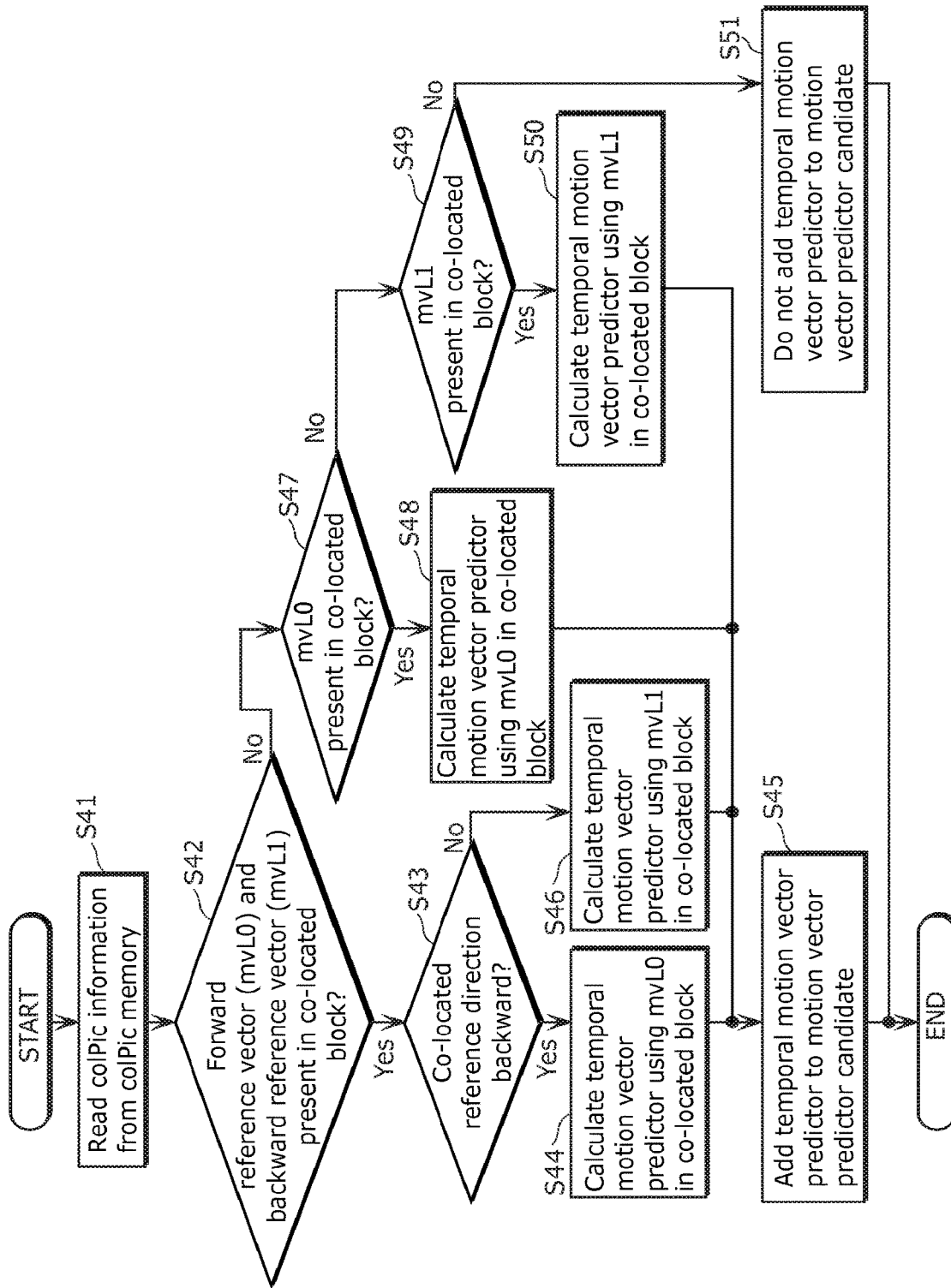
FIG. 9 illustrates a detailed process flow of S17 in FIG. 3 according to the embodiment 1.

FIG. 9 illustrates the detailed process flow of step S17 in FIG. 3. The following shall describe FIG. 9.

First, the temporal motion vector predictor calculating unit 114 reads colPic information including the reference motion vector in the prediction direction 1 and the reference motion vector in the prediction direction 2 from the colPic memory 115 (S41). Next, the temporal motion vector predictor calculating unit 114 determines whether or not the co-located block included in the colPic information has two or more motion vectors (S42). More specifically, the temporal motion vector predictor calculating unit 114 determines whether or not the co-located block includes the forward reference motion vector (mvL0) and the backward reference motion vector (mvL1).

When it is determined that the co-located block includes two or more motion vectors (yes in S42), the temporal motion vector predictor calculating unit 114 determines whether or not the co-locate block is the backward reference block (S43). Stated differently, the temporal motion vector predictor calculating unit 114 determines whether or not the picture including the co-located block is located after the current picture in display order.

Next, when it is determined that the co-located block is the backward reference block (yes in S43), the temporal motion vector predictor calculating unit 114 derives a temporal motion vector predictor by temporal motion vector prediction using a forward reference motion vector (motion vector mvL0 for a reference picture in the reference picture list L0) in the co-located block (S44). Subsequently, the temporal motion vector predictor calculating unit 114 adds the temporal motion vector predictor calculated in step S44 to the motion vector predictor candidates (S45).

In contrast, if the co-located block is determined to be the forward reference block (no in S43), the temporal motion vector predictor calculating unit 114 derives the temporal motion vector predictor by the temporal motion vector prediction using the backward reference motion vector in the co-located block (motion vector mvL1 for the reference picture in the reference picture list L1) (S46), and adds the derived temporal motion vector predictor to the motion vector predictor candidate (S45).

In contrast, if it is determined that the co-located block includes either one of the forward reference motion vector and the backward reference motion vector (no in S42), the temporal motion vector predictor calculating unit 114 determines whether or not the co-located block includes the forward reference motion vector (S47). If it is determined that the co-located block includes the forward reference motion vector (yes in S47), the temporal motion vector predictor calculating unit 114 derives a temporal motion vector predictor of the current block using the forward reference motion vector of the co-located block (S48), and adds the derived temporal motion vector predictor to the motion vector predictor candidates (S45).

In contrast, if it is determined that the co-located block does not include the forward reference motion vector (no in S47), the temporal motion vector predictor calculating unit 114 determines whether or not the co-located block includes the backward reference motion vector (S49). If it is determined that the co-located block includes the backward reference motion vector (yes in S49), the temporal motion vector predictor calculating unit 114 derives a temporal motion vector predictor of the current block using the backward reference motion vector (S50), and adds the derived temporal motion vector predictor to the motion vector predictor candidates (S45).

In contrast, if it is determined that the co-located block does not include the backward reference motion vector (no in S49), the temporal motion vector predictor calculating unit 114 ends the process in FIG. 9 without adding the temporal motion vector predictor to the motion vector predictor candidates (S51). Alternatively, the temporal motion vector predictor calculating unit 114 may add a motion vector having a motion amount of 0 to the motion vector predictor candidates as the temporal motion vector predictor in the co-located block, instead of the process in step S51.

Note that, in the process flow in FIG. 9, the temporal motion vector predictor calculating unit 114 determines whether or not the co-located block has the forward reference motion vector in step S47, and determines whether or not the co-located block includes a backward reference motion vector in step S49. However, it is not limited to this flow. For example, the temporal motion vector predictor calculating unit 114 may determine whether or not the co-located block includes the backward reference motion vector first, and subsequently determine whether or not the co-located block includes the forward reference motion vector.

Figure 10:
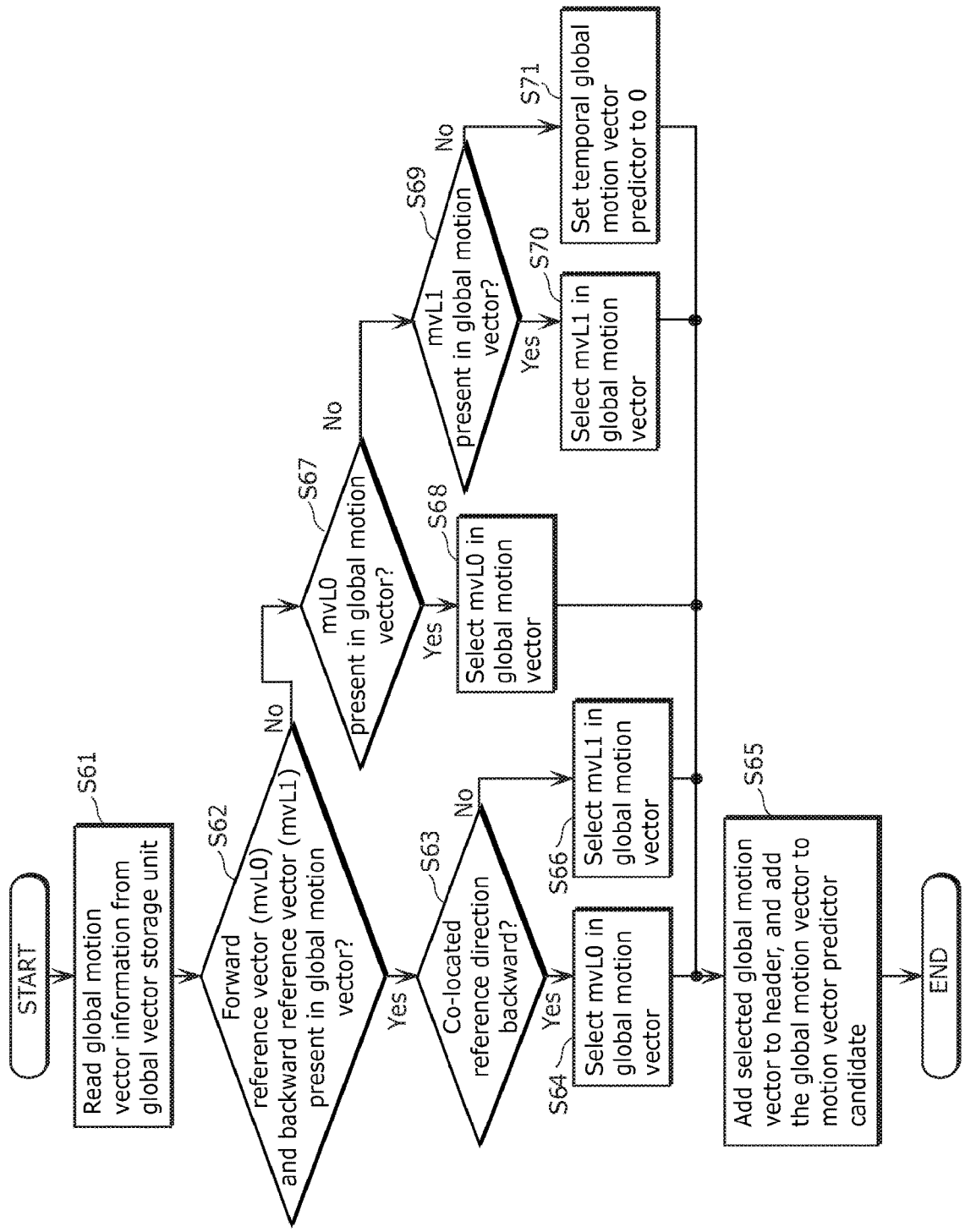
FIG. 10 illustrates a detailed process flow of S13 and S14 in FIG. 3 according to the embodiment 1.

FIG. 10 illustrates the detailed process flow of step S13 and step S14 in FIG. 3. The following shall describe FIG. 10.

First, the temporal motion vector predictor calculating unit 114 reads the global motion vector information including at least one of the global motion vector in the prediction direction 1 and the global motion vector in the prediction direction 2 from the global vector storage unit 116 (S61). Next, the temporal motion vector predictor calculating unit 114 determines whether or not the global motion vector information includes two or more motion vectors (S62). More specifically, the temporal motion vector predictor calculating unit 114 determines whether or not the forward reference motion vector (mvL0) and the backward reference motion vector (mvL1) are included in the global motion vector information.

When it is determined that the global motion vector information includes two or more motion vectors (yes in S62), the temporal motion vector predictor calculating unit 114 determines whether or not the co-located reference direction is the backward reference block (S63). When it is determined that the co-located reference direction is the backward reference block (yes in S63), the temporal motion vector predictor calculating unit 114 selects the forward reference motion vector included in the global motion vector information (S64).

Subsequently, the temporal motion vector predictor calculating unit 114 adds the selected global motion vector to the header information such as the picture header (output to the variable length coding unit 118) and adds the selected global motion vector to the motion vector predictor candidates in the current block (S65). Note that, the temporal motion vector predictor calculating unit 114 adds information for specifying a reference picture referred to by the selected global vector (more specifically, referred to by motion vectors used for calculating the global motion vector) to the header information. This information is used for the scaling that shall be described later with reference to FIG. 11A to FIG. 12B.

When it is determined that the co-located reference direction is the forward reference block (no in S63), the temporal motion vector predictor calculating unit 114 selects the backward reference motion vector included in the global motion vector information (S66). Subsequently, the temporal motion vector predictor calculating unit 114 attaches the selected global motion vector to the header information such as the picture header and adds the selected global motion vector to the motion vector predictor candidates in the current block (S65).

Furthermore, when it is determined that the global motion vector information includes either one of the forward reference motion vector and the backward reference motion vector (no in S62), the temporal motion vector predictor calculating unit 114 determines whether or not the global motion vector information includes the forward reference motion vector (S67).

When it is determined that the global motion vector information includes the forward reference vector (yes in S67), the temporal motion vector predictor calculating unit 114 selects the forward reference motion vector included in the global motion vector information (S68). Subsequently, the temporal motion vector predictor calculating unit 114 adds the selected global motion vector to the header information such as the picture header and adds the selected global motion vector to the motion vector predictor candidates in the current block (S65).

In contrast, when it is determined that the global motion vector information does not include the forward reference motion vector (no in S67), the temporal motion vector predictor calculating unit 114 determines whether or not the global motion vector information includes the backward reference motion vector (S69). When it is determined that the global motion vector information includes the backward reference vector (yes in S69), the temporal motion vector predictor calculating unit 114 selects the backward reference motion vector included in the global motion vector information (S70). Subsequently, the temporal motion vector predictor calculating unit 114 adds the selected global motion vector to the header information such as the picture header and adds the selected global motion vector to the motion vector predictor candidates in the current block (S65).

In contrast, when it is determined that the global motion vector information does not include the backward reference motion vector (no in S69), the temporal motion vector predictor calculating unit 114 does not add the temporal motion vector predictor to the motion vector predictor candidate, or sets the global motion vector to 0 (S71). Subsequently, the temporal motion vector predictor calculating unit 114 attaches the set global motion vector to the header information such as the picture header and adds the set global motion vector to the motion vector predictor candidates in the current block (S65).

Note that, in the process flow in FIG. 10, the temporal motion vector predictor calculating unit 114 determines whether or not the global motion vector includes the forward reference motion vector in step S67, and determines whether or not the global motion vector includes a backward reference motion vector in step S69. However, it is not limited to this flow. For example, the temporal motion vector predictor calculating unit 114 may first determine whether or not the global motion vector includes the backward reference motion vector, and subsequently determines whether or not the global motion vector includes the forward reference motion vector.

In step S63 to step S66 in FIG. 10, an example in which the temporal motion vector predictor calculating unit 114 selects either one of the global motion vector mvL0 or mvL1, based on the co-located reference direction flag. However, it is not limited to this example. For example, the temporal motion vector predictor calculating unit 114 may select the global motion vector mvL0 as a candidate for the motion vector predictor in the reference picture list L0, and may select the global motion vector mvL1 as a candidate for the motion vector predictor in the reference picture list L1. With this, when the global motion vector is used, it is not necessary to attach the co-located reference direction flag to the header, further improving the coding efficiency.

Next, a scaling method when the temporal motion vector predictor is added to the motion vector predictor candidate shall be described in detail. Note that, the description for the scaling method when the global motion vector is added to the motion vector predictor candidate shall be omitted since the scaling methods are identical except for using the input of the global motion vector instead of the motion vector of the co-located block.

FIG. 11A illustrates a method for deriving the motion vector predictor candidate (temporal motion vector predictor) by the temporal motion vector prediction using the forward reference motion vector when the co-located block is the backward reference block and the forward reference motion vector and the backward reference motion vector are included. More specifically, the motion vector predictor candidate (Temporal MV) is derived by the following equation 4, using the forward reference motion vector.

$$TemporalMV = mvL0 \times (B2 - B0)/(B4 - B0) \quad \text{(Expression 4)}$$

Here, (B2–B0) represents time difference information between display times of the picture B2 and the picture B0. Similarly, (B4–B0) represents time difference information between display times of the picture B4 and the picture B0.

FIG. 11B illustrates a method for deriving the motion vector predictor candidate (temporal motion vector predictor) by the temporal motion vector prediction using the backward reference motion vector. More specifically, the motion vector predictor candidate is derived by the following equation 5, using the backward reference motion vector.

$$TemporalMV = mvL1 \times (B2 - B0)/(B4 - B8) \quad \text{(Expression 5)}$$

FIG. 12A illustrates a method for deriving the motion vector predictor candidate (temporal motion vector predictor) by the temporal motion vector prediction using the backward reference motion vector when the co-located block is the forward reference block and the forward reference motion vector and the backward reference motion vector are included. More specifically, the motion vector predictor candidate is derived by the following equation 6, using the backward reference motion vector.

$$TemporalMV = mvL1 \times (B6 - B8)/(B4 - B8) \quad \text{(Expression 6)}$$

FIG. 12B illustrates a method for deriving the motion vector predictor candidate (temporal motion vector predictor) by the temporal motion vector prediction using the forward reference motion vector. More specifically, the motion vector predictor candidate is derived by the following equation 7, using the backward reference motion vector.

$$TemporalMV = mvL0 \times (B6 - B8)/(B4 - B0) \quad \text{(Expression 7)}$$

As described above, in the embodiment 1, the moving picture coding apparatus 100 sets the temporal motion vector prediction using a motion vector for each unit of coding in the reference picture to be off at a constant interval, attaches a motion vector of the entire reference picture to the header information instead, and codes the motion vector of the current picture using the scaled global motion vector. With this, it is possible to prevent the decoding error from being propagated while suppressing the reduction in coding efficiency.

More specifically, when the co-located use prohibition flag is on, the moving picture coding apparatus 100 adds the global vector read from the global vector storage unit 116 to the motion vector predictor candidate in the current block and attaches to the header information such as the picture header. With this, even if the reference picture is lost at the time of decoding, the moving picture decoding apparatus can decode the bitstream without a decoding error. The error propagation is suppressed accordingly.

Furthermore, when the co-located use prohibition flag is off, the moving picture coding apparatus 100 can select a motion vector predictor most suitable for the current block according to the co-located reference direction flag, and thus is capable of improving the compression efficiency. In particular, the moving picture coding apparatus 100 can reduce the prediction error by using the backward reference motion vector when the co-located block is the forward reference block. The backward reference motion vector is a motion vector pointing a reference picture in a direction of picture including the current block from the picture including the co-located block, and has high possibility of being close to the most suitable motion vector. Accordingly, the prediction error is small.

In contrast, the forward reference motion vector is a motion vector in a direction opposite to the direction in which the picture including the current block is located, and has low possibility of being close to the most suitable motion vector. Accordingly, the prediction error is large. In the same manner, when the co-located block is the backward reference block, there is a high possibility that the forward reference motion vector is close to the most suitable motion vector. Accordingly, the prediction error is small.

Note that, in the embodiment 1, if the co-located block includes two or more motion vectors, the moving picture coding apparatus 100 switches the co-located block used for calculating the temporal motion vector predictor in the current block depending on whether the co-located block is the backward reference block or the forward reference block, it is not limited to this example.

For example, the moving picture coding apparatus 100 may calculate the temporal motion vector predictor using a motion vector referring to a reference picture temporally close to the picture including the co-located block (a motion vector having a short temporal distance). Here, the temporal distance is determined according to the number of pictures between the picture including the co-located block and the reference picture referred to by the co-located block in display order, for example.

Note that, in the embodiment 1, if the co-located block includes two or more motion vectors, the moving picture coding apparatus 100 switches the motion vector in the co-located block used for calculating the temporal motion vector predictor in the current block depending on whether the co-located block is the backward reference block or the forward reference block. However, it is not limited to this example. For example, the moving picture coding apparatus 100 may calculate the temporal motion vector predictor using a smaller motion vector in size among the two motion vectors in the co-located block. Here, the size of the motion vector is indicated by an absolute value of the motion vector, for example.

Furthermore, in the embodiment 1, when the co-located use prohibition flag is on, the moving picture coding apparatus 100 adds the global vector read from the global vector storage unit 116 to the motion vector predictor candidates as a vector replacing the temporal motion vector predictor. However, it is not limited to this example. For example, the moving picture coding apparatus 100 may always add, as the global motion vector, the motion vector having a value of 0 to the motion vector predictor candidate (that is, add a vector having a movement amount of 0 to the motion vector predictor candidates as the replacement vector). In this case, the moving picture coding apparatus 100 may attach the global motion vector to the header information and others. Furthermore, when the co-located use prohibition flag is on, the moving picture coding apparatus 100 does not have to always add the temporal motion vector predictor to the motion vector predictor candidates. By not adding the temporal motion vector predictor to the motion vector predictor candidate, it is possible to improve the coding efficiency.

Furthermore, in the embodiment 1, the moving picture coding apparatus 100 adds a co-located use prohibition flag to all of the pictures. However, the co-located use prohibition flag may be added only to a specific picture. For example, the moving picture coding apparatus 100 adds the co-located use prohibition flag only to pictures referred to by the other pictures (P-picture, B-picture referred to by the other pictures, and a picture belonging to the lowest level in the reference structure having more than one layer), and does not add a co-located use prohibition flag to a picture not referred to by the other pictures. As described above, the moving picture coding apparatus 100 can suppress the decoding error from being propagated while improving the coding efficiency by attaching the co-located use prohibition flags only to the specific pictures.

Furthermore, in the embodiment 1, the moving picture coding apparatus 100 attaches the co-located use prohibition flag for each picture. However, the moving picture coding apparatus 100 may attach the co-located use prohibition flag for each slice composed of blocks. Attaching the co-located use prohibition flag for each slice improves the accuracy in estimating the global vector.

In the embodiment 1, the moving picture coding apparatus 100 attaches the co-located use prohibition flag to all of the pictures. However, the moving picture coding apparatus 100 may determine that the temporal motion vector predictor may not be added to the predictive emotion vector candidates based on the picture type, without attaching the co-located use prohibition flag. For example, in a picture referred to by the other pictures (P-picture, B-picture referred to by the other pictures, and a picture belonging to a layer in the lowest level in the reference structure having more than one layer), the moving picture coding apparatus 100 may add the global vector to the motion vector predictor candidate without adding the temporal motion vector predictor to the motion vector predictor candidates. As described above, determining whether or not the temporal motion vector predictor is added to the motion vector predictor candidates based on the picture type allows omitting the co-located use prohibition flag. Accordingly, it is possible to improve the coding efficiency.

Figure 13:
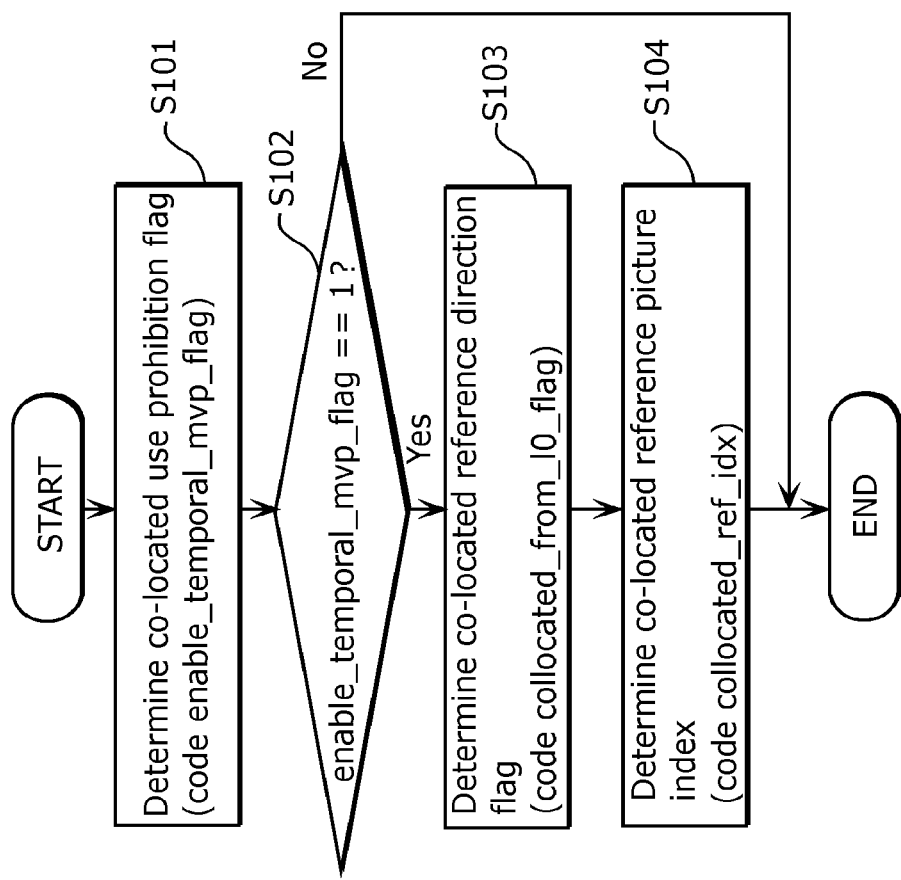
FIG. 13 is a diagram illustrating process flow of a moving picture coding method according to the embodiment 1.

Furthermore, when the temporal motion vector predictor is not included in the motion vector predictor candidate, the moving picture coding apparatus 100 can generate a bitstream with improved coding efficiency by not including an unnecessary flag to the bitstream. A specific example shall be described with reference to FIG. 13. FIG. 13 is a detailed flow of S11 in FIG. 3, and illustrates a variation of flow for determining the co-located information.

First, the moving picture coding apparatus 100 determines the value of the co-located use prohibition flag in the same method as in FIG. 8A, and codes the co-located prohibition flag representing the determined value (S101). Note that, here, an example in which a flag indicating whether or not a temporal predictive emotion vector using the information of the co-located block is allowed (enable_temporal_mvp_flag) is used as the co-located use prohibition flag shall be described.

Next, the moving picture coding apparatus 100 determines whether or not enable_temporal_mvp_flag is 1 (S102). If enable_temporal_mvp_flag is 1 (yes in S102), the moving picture coding apparatus 100 determines a value of the co-located reference direction flag and the co-located reference picture index in the same manner as the method in S32 in FIG. 8A, and codes the co-located reference direction flag and the co-located reference picture index (S103 and S104).

In contrast, if enable_temporal_mvp_flag is 0 (no in S102), the moving picture coding apparatus 100 does not code the co-located reference direction flag and the co-located reference picture index. As described above, when the temporal motion vector predictor is not included in the temporal motion vector candidates (when enable_temporal_mvp_flag is 0), the moving picture coding apparatus 100 does not attach the unnecessary co-located reference direction flag and the co-located reference picture index to the bitstream. With this, the moving picture coding apparatus 100 can improve the coding efficiency.

Figure 14:
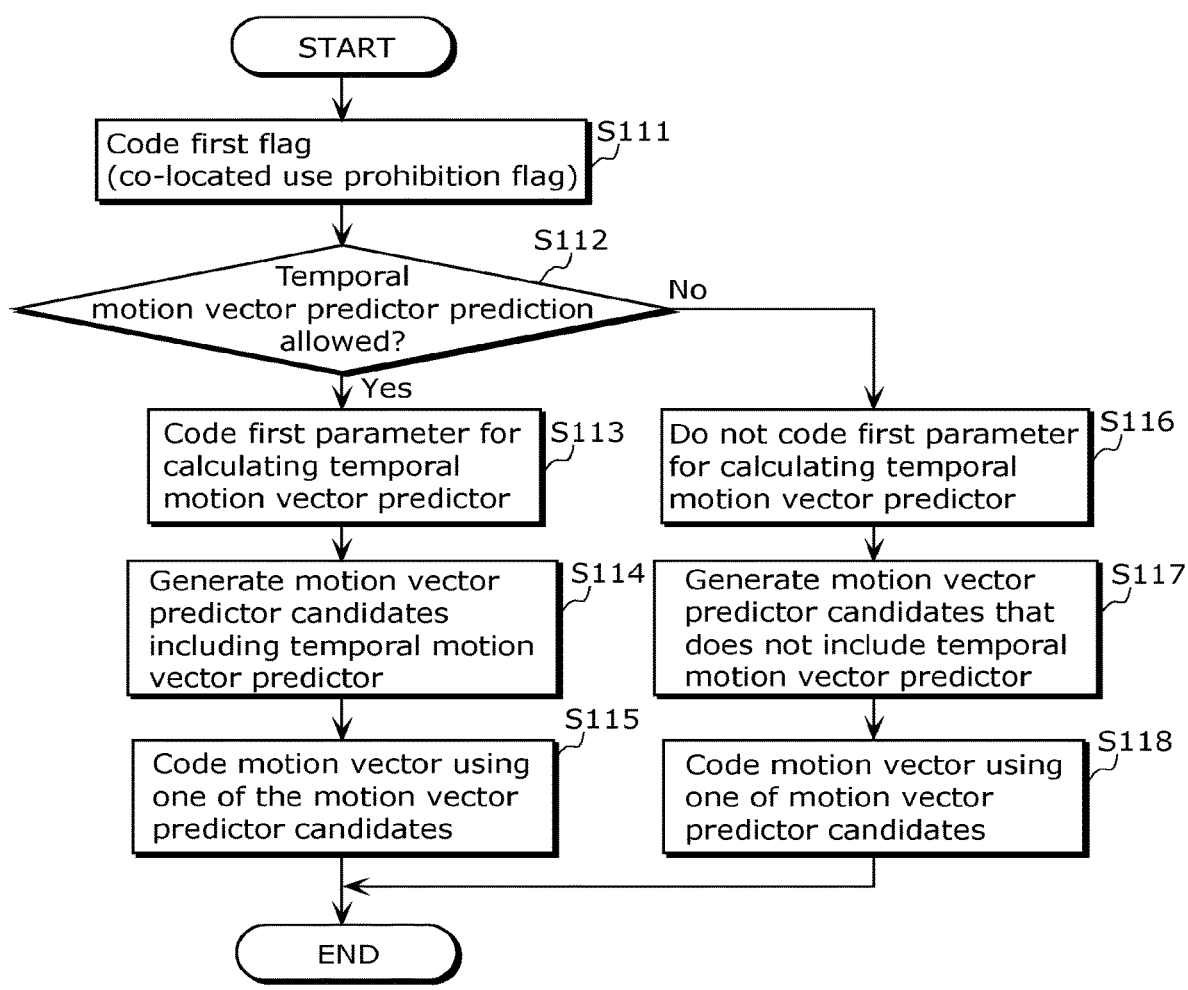
FIG. 14 is a diagram illustrating process flow of a moving picture coding method according to the embodiment 1.

As described above, the moving picture coding apparatus 100 performs the moving picture coding process illustrated in FIG. 14.

The moving picture coding apparatus 100 performs inter-predictive coding using a motion vector on the current block included in the current picture.

First, the moving picture coding apparatus 100 generates the first flag (co-located use prohibition flag) indicating whether or not the temporal motion vector prediction using the temporal motion vector predictor which is a motion vector of a block included in a coded picture different from the current picture (whether the temporal motion vector prediction is allowed or prohibited) is used, and codes the generated first flag (S111). The moving picture coding apparatus 100 attaches the coded first flag to the bitstream.

Next, the moving picture coding apparatus 100 determines whether or not the first flag indicates that the temporal motion vector prediction is used (allowed) (S112).

If the first flag indicates that the temporal motion vector prediction is used (allowed) (yes in S112), the moving picture coding apparatus 100 generates the first parameter for calculating the temporal motion vector predictor, and codes the generated first parameter (S113). The moving picture coding apparatus 100 attaches the coded first parameter to the bitstream.

More specifically, the first parameter includes a parameter for specifying the coded picture (co-located picture) which is a target for referring to the motion vector. More specifically, the first parameter includes a reference picture index (collocated_ref_idx) for specifying the coded picture (co-located picture) among the pictures in the reference picture list used for coding the current picture. Furthermore, the first parameter includes a flag (collocated_from_l0_flag) indicating a reference picture list to be used for specifying the coded picture (co-located picture) among the picture lists used for coding the current picture.

Here, each of the reference pictures lists list more than one reference picture (coded picture). Furthermore, in each of the reference picture lists, the reference pictures are indicated by the reference picture indices. The moving picture coding apparatus 100 selects a reference picture list indicated by the flag (collcated_from_l0_flag) from among the reference picture lists, and identifies a picture including the reference picture index (collocated_ref_idx) from among the reference pictures included in the selected reference picture list as the coded picture (co-located picture).

Next, the moving picture coding apparatus 100 generates a temporal motion vector predictor using the first parameter, and derives first motion vector predictor candidates including the generated temporal motion vector predictor (S114).

Next, the moving picture coding apparatus 100 codes a motion vector to be used for performing inter-predictive coding on the current block using one of the first motion vector predictor candidates (S115). More specifically, the moving picture coding apparatus 100 selects the first motion vector predictor candidate having the smallest difference from the motion vector used for inter-predictive coding on the current block among the first motion vector predictor candidates, and codes the motion vector using the selected first motion vector predictor. More specifically, the moving picture coding apparatus 100 codes the difference between the selected first motion vector predictor candidate and the motion vector.

Furthermore, the moving picture coding apparatus 100 codes the current block by the inter coding using the motion vector. Subsequently, the moving picture coding apparatus 100 attaches the coded motion vector (difference) and the coded current block to the bitstream.

In contrast, if the first flag indicates that the temporal motion vector prediction is not used (prohibited) (no in S112), the moving picture coding apparatus 100 does not code the first parameter (S116). Stated differently, the moving picture coding apparatus 100 does not generate the first flag. The moving picture coding apparatus 100 does not attach the first flag to the bitstream.

In addition, the moving picture coding apparatus 100 derives second motion vector predictors that do not include the temporal motion vector predictor (S117).

Next, the moving picture coding apparatus 100 codes a motion vector to be used for performing inter-predictive coding on the current block using one of the second motion vector predictor candidates (S118). Note that, a specific example of this process is identical to the process in which the first motion vector predictor candidates in step S115 is replaced with the second motion vector predictor candidates.

Note that, the step S111 is performed by the flag coding unit included in the moving picture coding apparatus 100. Furthermore, steps S113 and S116 are performed by the parameter coding unit included in the moving picture coding apparatus 100. Steps S114 and S117 are performed by the candidate deriving unit included in the moving picture coding apparatus 100. Steps S115 and S118 are performed by the motion vector coding unit included in the moving picture coding apparatus 100.

Here, the function of the flag coding unit is implemented by the co-located information determining unit 117 and the variable length coding unit 118 illustrated in FIG. 2, for example. Furthermore, the function of the parameter coding unit is implemented by the co-located information determining unit 117 and the variable length coding unit 118 illustrated in FIG. 2, for example. The function of the candidate deriving unit is implemented by the inter prediction control unit 112 and the temporal motion vector predictor calculating unit 114 illustrated in FIG. 2. The function of the motion vector coding unit is implemented by the subtractor 101, the inter prediction unit 110, the inter prediction control unit 112, and the variable length coding unit 118 and others illustrated in FIG. 2.

In addition, the first flag (co-located use prohibition flag) and the first parameter (collocated_from_10_flag and collocated_ref_idx) are generated and coded for each picture or slice. Stated differently, the first flag and the first parameter are included in a picture header of a slice header of the bitstream. Note that, the first flag and the first parameter may be generated for different units (picture or slice). For example, the first flag may be generated per picture, and the first parameter may be generated per slice.

Furthermore, at least one of the first flag and the first parameter may be generated and coded for a plurality of pictures. Stated differently, at least one of the first flag and the first parameter may be included in the PPS (picture parameter set) or SPS (sequence parameter set) of the bitstream.

Furthermore, the first flag may be included in hierarchy in multiple units among the units in slice, picture, and pictures (sequence). For example, the moving picture coding apparatus 100 generates the first flag indicating whether or not temporal motion vector prediction is used for the picture for each picture. Furthermore, if the first flag indicates that the temporal motion vector prediction is used, the moving picture coding apparatus 100 generates a second flag indicating whether or not the temporal motion vector prediction is used, for each slice in the picture. In contrast, if the first flag indicates that the temporal motion vector prediction is not used, the moving picture coding apparatus 100 does not generate the second flag for each slice. Note that, the moving picture coding apparatus 100 may generate the second flag for each slice included in the picture, only when the first flag indicates that the temporal motion vector prediction is not used. Furthermore, the moving picture coding apparatus 100 may generate the first flag for each picture and the second flag for each picture or slice.

Embodiment 2

In the embodiment 2, a moving picture decoding apparatus 200 which decodes a bitstream generated by the moving picture coding apparatus 100.

Figure 15:
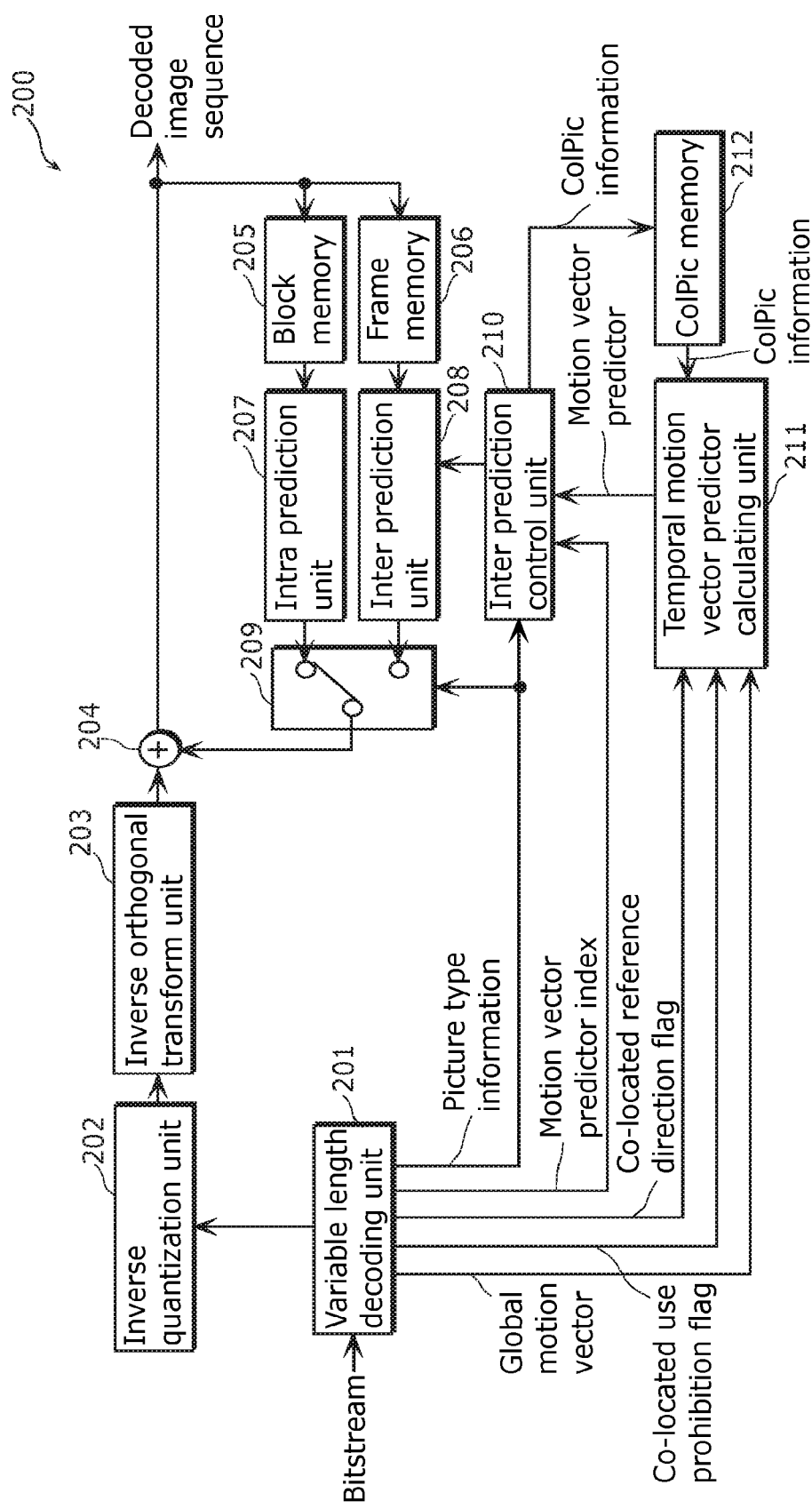
FIG. 15 is a block diagram of a moving picture decoding apparatus according to the embodiment 2.

FIG. 15 is a block diagram illustrating a configuration of the moving picture decoding apparatus 200 using a moving picture decoding method according to the embodiment 2.

In the embodiment 2, a block included in a picture preceding a current picture to be decoded (a reference picture specified by the reference picture list L0) in display order is referred to as a forward reference block. Furthermore, a block included in a picture following the current picture (a reference picture specified by the reference picture list L1) in display order is referred to as a backward reference block.

As illustrated in FIG. 15, the moving picture decoding apparatus 200 includes a variable length decoding unit 201, an inverse quantization unit 202, an inverse orthogonal transform unit 203, an adder 204, a block memory 205, a frame memory 206, an intra prediction unit 207, an inter prediction unit 208, a switch 209, an inter prediction control unit 210, a temporal motion vector predictor calculating unit 211, and a colPic memory 212.

The variable length decoding unit 201 performs variable length decoding on the input bitstream, and obtains picture type information, a motion vector predictor index, a co-located use prohibition flag (or enable_temporal_mvp_flag), a co-located reference direction flag (collocated_from_10_flag), a co-located reference picture index (collocated_ref_idx), a global motion vector, and a quantization coefficient. The variable length decoding unit 201 outputs (i) the picture type information to the switch 209 and the inter prediction control unit 210, (ii) the motion vector predictor index to the inter prediction control unit 210, (iii) a co-located use prohibition flag (or enable_temporal_mvp_flag), a co-located reference direction flag (collocated_from_10_flag), a co-located reference picture index (collocated_ref_idx), and the global motion vector to the temporal motion vector predictor calculating unit 211, and (iv) quantization coefficient to the inverse quantization unit 202.

The inverse quantization unit 202 reconstructs a transform coefficient by inversely quantizing the quantization coefficient obtained from the variable length decoding unit 201, and outputs the reconstructed transform coefficient to the inverse orthogonal transform unit 203. The inverse orthogonal transform unit 203 reconstructs the differential block by transforming the restored transform coefficient obtained from the inverse quantization unit 202 from the frequency domain to an image domain, and outputs the reconstructed differential block to the adder 204.

The adder 204 reconstructs a differential block reconstructed by adding a differential block obtained from the inverse orthogonal transform unit 203 and a predictive block obtained from the switch 209. Subsequently, the adder 204 outputs a decoded image sequence including the reconstructed decoded block to outside of the apparatus and stores the decoded image sequence in the block memory 205 and the frame memory 206.

The block memory 205 stores a decoded image sequence obtained from the adder 204 on a block basis. The frame memory 206 stores a decoded image sequence obtained from the adder 204 on a frame basis.

The intra prediction unit 207 generates a predictive block of the current block by performing intra-prediction using a decoded image sequence per block stored in the block memory 205, and outputs the generated predictive block to the switch 209. The inter prediction unit 208 generates a predictive block of the current block by performing inter prediction using a decoded image sequence per frame stored in the frame memory 206, and outputs the generated predictive block to the switch 209. The switch 209 outputs the predictive block generated by the intra prediction unit 207 or the predictive block generated by the inter prediction unit 208 to the adder 204.

When the co-located use prohibition flag obtained from the variable length decoding unit 201 is off, the temporal motion vector predictor calculating unit 211 derives a motion vector predictor candidate (temporal motion vector predictor) using colPic information such as a motion vector of the co-located block stored in the colPic memory 212. In contrast, when the co-located use prohibition flag is on, the temporal motion vector predictor calculating unit 211 adds the global motion vector obtained from the variable length decoding unit 201 to the motion vector predictor candidate.

Furthermore, the temporal motion vector predictor calculating unit 211 assigns a motion vector predictor index to the motion vector predictor added as the candidate. Subsequently, the temporal motion vector predictor calculating unit 211 outputs the motion vector predictor and the motion vector predictor index to the inter predictive control unit 210.

Furthermore, when the co-located block does not have a motion vector, the temporal motion vector predictor calculating unit 211 may stop deriving a motion vector by the temporal motion vector prediction or add a motion vector having motion amount 0 to the motion vector predictor candidate.

The inter prediction control unit 210 specifies a motion vector predictor corresponding to a motion vector predictor index obtained from the variable length decoding unit 201 among the motion vector predictor candidates. Subsequently, the inter prediction control unit 210 calculates a motion vector used for inter prediction by adding error information between the motion vector and motion vector predictor to the specified motion vector predictor. Furthermore, the inter prediction control unit 210 stores the colPic information including the motion vector and others of the current block in the colPic memory 212.

Figure 16:
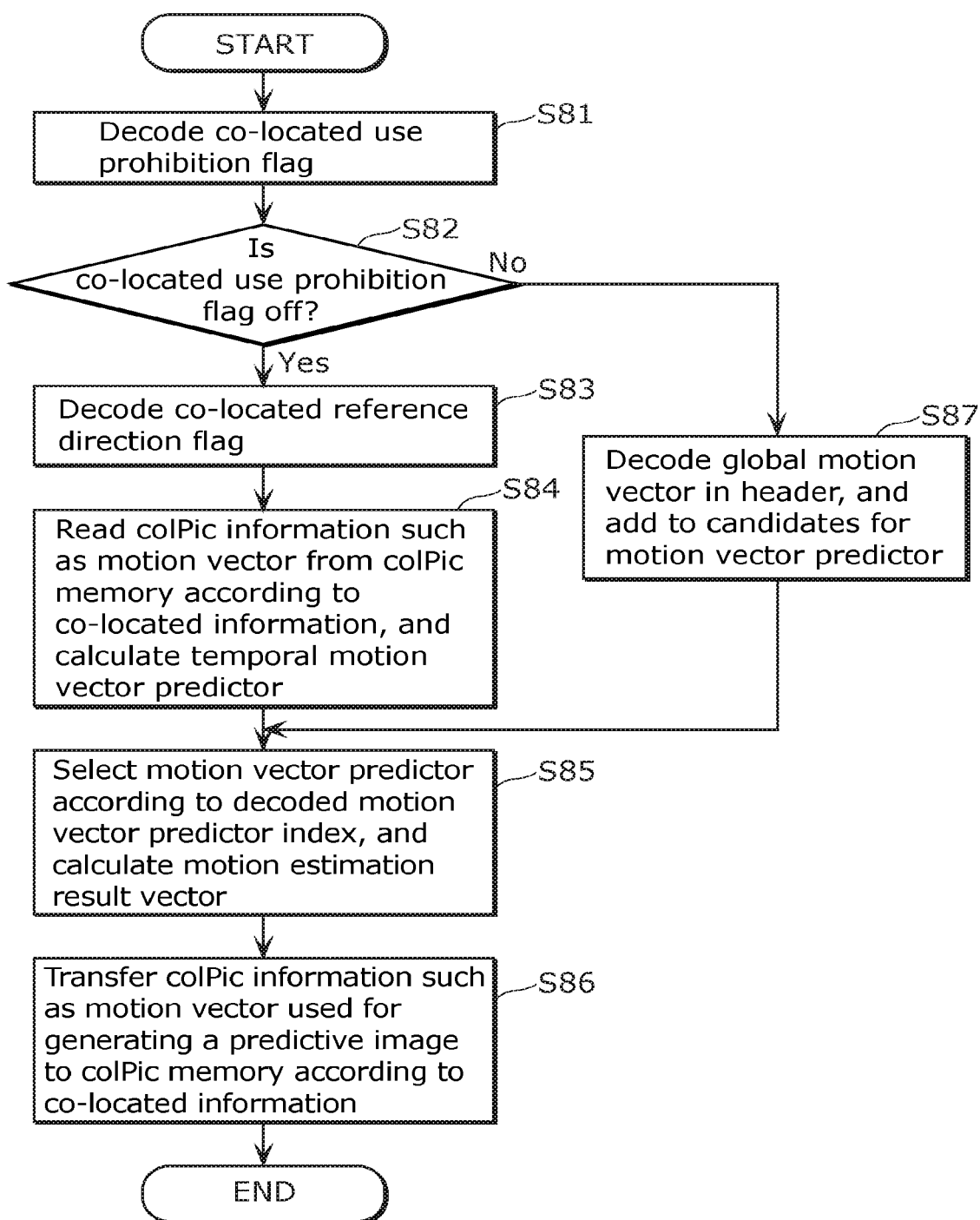
FIG. 16 is a diagram illustrating an overview of process flow of a moving picture decoding method according to the embodiment 2.

FIG. 16 is a diagram illustrating an overview of process flow of a moving picture decoding method according to the embodiment 2.

First, the variable length decoding unit 201 decodes a co-located use prohibition flag on a picture basis (S81). The variable length decoding unit 201 subsequently determines whether or not the co-located use prohibition flag is off (S82). When the co-located use prohibition flag is off (yes in S82), the variable length decoding unit 201 decodes the co-located reference direction flag and the co-located reference picture index (collocated_ref_idx) on a picture basis (S83). The variable length decoding unit 201 outputs the decoded co-located use prohibition flag, the co-located reference direction flag, and the co-located reference picture index to the temporal motion vector predictor calculating unit 211.

Next, the temporal motion vector predictor calculating unit 211 reads the colPic information including the reference motion vector and others in the co-located block from the colPic memory 212 according to the co-located information, generates the temporal motion vector predictor using the reference motion vector in the co-located block, and adds the generated temporal motion vector predictor to the motion vector predictor candidate, in the same manner as FIG. 9 (S84).

In contrast, when the co-located use prohibition flag is on (no in S82), the temporal motion vector predictor calculating unit 211 obtains the global motion vector stored in the header information such as picture header from the variable length decoding unit 201, and adds the obtained global motion vector to the motion vector predictor candidate (S87).

Next, the inter prediction control unit 210 selects a motion vector predictor corresponding to the decoded motion vector predictor index, out of the motion vector predictor candidates (S85). Furthermore, the inter prediction control unit 210 derives a motion vector by adding the predictive error information to the selected motion vector predictor, and outputs the derived motion vector to the inter prediction unit 208. Subsequently, the inter prediction unit 208 generates a predictive block of the current block by inter prediction using the derived motion vector.

Next, the inter prediction control unit 210 stores the colPic information including the motion vector and others used for the inter prediction in the colPic memory 212 (S86). In the colPic memory 212, the motion vector, the reference picture index value, and the prediction direction of the reference picture are stored for calculating the temporal motion vector predictor of the current block.

Note that, a method for selecting the reference motion vector for calculating the temporal motion vector predictor when the reference block includes two or more reference motion vectors is not limited to a method based on the co-located block reference direction flag. For example, the moving picture decoding apparatus 200 may calculate a temporal distance of the reference motion vector, and may use a temporally shorter reference motion vector. Here, the temporal distance is calculated based on the number of pictures between the reference picture including the reference block and a picture to be referred to by the reference picture. Furthermore, for example, the moving picture decoding apparatus 200 may calculate the size of the reference motion vector, and determine a motion vector derived by a reference motion vector smaller in size as a temporal motion vector predictor.

Figure 17:
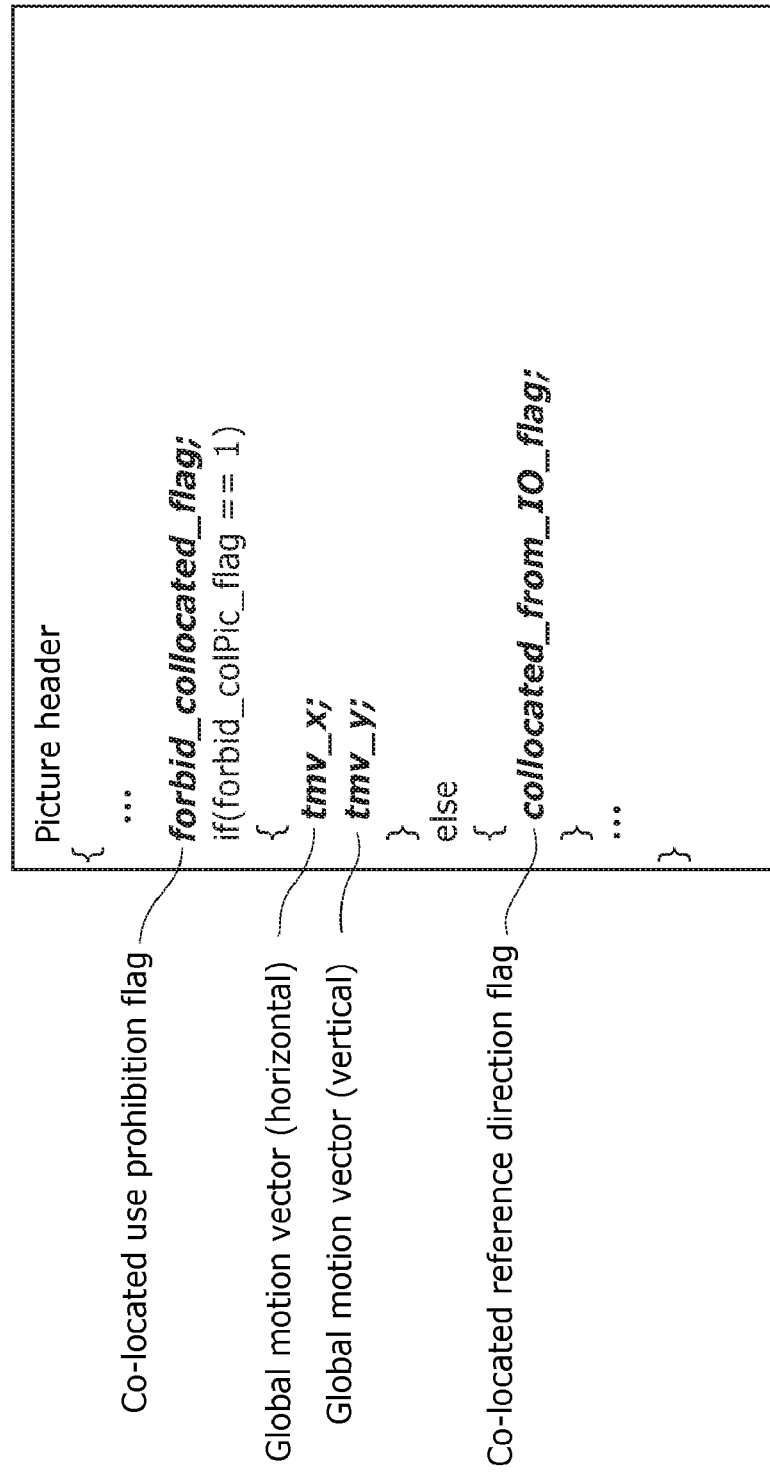
FIG. 17 is a diagram illustrating syntax of a bitstream in the moving picture decoding method according to the embodiment 2.

FIG. 17 is a diagram illustrating an example of syntax of a bitstream in the moving picture decoding method according to the embodiment 2. In FIG. 17, forbid_collocated_flag represents the co-located use prohibition flag, tmv_x represents horizontal component of the global motion vector, tmv_y represents vertical component of the global motion vector, and collocated_from_l0_flag represents the co-located reference direction flag.

As illustrated in FIG. 17, when the co-located use prohibition flag (forbid_collocated_flag) is 1, the global motion vector (tmv_x and tmv_y) is attached to the bitstream, and added to the motion vector predictor candidate.

Alternatively, when the co-located use prohibition flag (forbid_collocated_flag) is 0, the co-located reference direction flag (collocated_from_l0_flag) is attached to the bitstream. Subsequently, the co-located block is determined according to the co-located reference direction flag, and a temporal motion vector predictor is calculated using a reference motion vector in the co-located block. Note that, here, collocated_from_l0_flag having a value of 1 indicates that the co-located block is a forward reference block, and collocated_from_l0_flag having a value of 0 indicates that the co-located block is a backward reference block. However, it is not necessarily limited to this example.

Note that, in the embodiment 2, when the co-located use prohibition flag is on, the moving picture decoding apparatus 200 uses the global motion vector decoded from the header information and others. However, the global motion vector having a value of 0 may always be added to the motion vector predictor candidate depending on the coding method. In this case, the global motion vector is not attached to the header information and others, and thus the decoding process is omitted. Furthermore, when the co-located use prohibition flag is on, the moving picture decoding apparatus 200 does not have to always add the temporal motion vector predictor to the motion vector predictor candidates.

As described above, in the embodiments 1 and 2, the moving picture coding apparatus 100 sets the temporal motion vector prediction using a motion vector for each coding process unit in the reference picture to be off, and attaches the global motion vector of the reference picture to the header information. In addition, the moving picture coding apparatus 100 can generate a bitstream which prevents the decoding error from propagating while suppressing the reduction in coding efficiency by coding the motion vector in the current picture. Furthermore, the moving picture decoding apparatus 200 can appropriately decode the bitstream generated as described above.

More specifically, when the co-located use prohibition flag is on, the moving picture coding apparatus 100 adds the global vector read from the global vector storage unit 116 to the motion vector predictor candidate in the current block and attaches to the header information such as the picture header. With this, even if the reference picture is lost at the time of decoding, the moving picture decoding apparatus 200 can decode the bitstream without a decoding error. As described above, the moving picture decoding apparatus 200 can appropriately decode the bitstream whose error propagation is suppressed.

Furthermore, when the co-located use prohibition flag is off, the moving picture decoding apparatus 200 can appropriately decode the bitstream including a current block having a most suitable motion vector predictor selected, according to the co-located reference direction flag.

Note that, in the embodiments 1 and 2, when the co-located use prohibition flag is on, the moving picture coding apparatus 100 uses the global vector read from the global vector storage unit 116. However, the global motion vector having a value of 0 may always be added to the motion vector predictor candidate. Furthermore, when the co-located use prohibition flag is on, the moving picture coding apparatus 100 does not have to always add the temporal motion vector predictor to the motion vector predictor candidates. This configuration reduces the decoding process in the moving picture decoding apparatus 200.

Furthermore, in the embodiment 2, the moving picture decoding apparatus 200 decodes the co-located use prohibition flag of all of the pictures. However, only the co-located use prohibition flag of a specific picture may be decoded. For example, the moving picture decoding apparatus 200 decodes only a co-located use prohibition flag for a picture referred to by another picture (P picture, B picture referred to by another picture, and a picture belonging to the lowest level in a reference structure having multiple layers), and does not decode a co-located use prohibition flag in a picture not referred to by another picture. As described above, by decoding only the co-located use prohibition flag of the specific picture, it is possible to reduce the decoding process and suppresses the decoding error from propagating.

Furthermore, in the embodiment 2, the moving picture decoding apparatus 200 decodes the co-located use prohibition flag for each picture. However, the moving picture decoding apparatus 200 may decode the co-located use prohibition flag for each slice composed of blocks. Decoding the co-located use prohibition flag for each slice improves the accuracy in estimating the global vector.

Furthermore, in the embodiment 2, the moving picture decoding apparatus 200 decodes all of the co-located use prohibition flags in all of the pictures. However, the temporal motion vector predictor may not be added to the motion vector predictor candidate based on the picture type. For example, in a picture referred to by the other pictures (P-picture, B-picture referred to by the other pictures, and a picture belonging to a layer in the lowest level in the reference structure having more than one layer), the moving picture decoding apparatus 200 may add the global vector to the motion vector predictor candidate without adding the temporal motion vector predictor to the motion vector predictor candidates. As described above, by determining whether the temporal motion vector predictor or the global motion vector is added to the motion vector predictor candidate based on the picture type allows improvement on the coding efficiency while reducing the decoding process.

Figure 18:
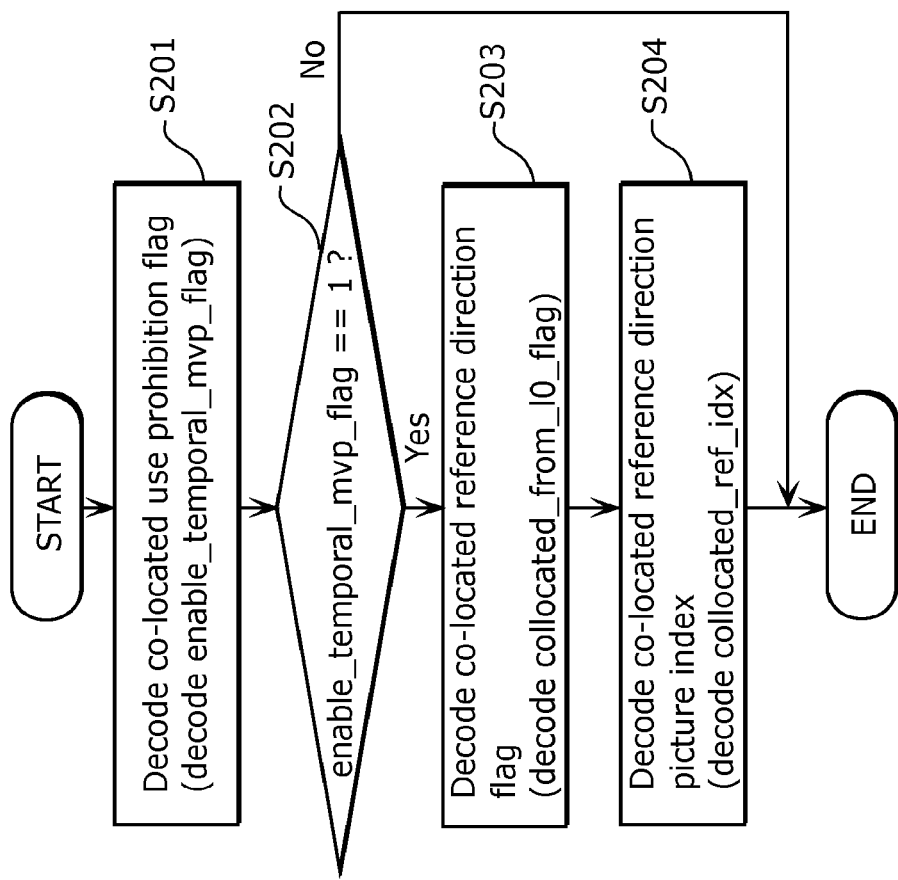
FIG. 18 is a diagram illustrating process flow of a moving picture decoding method according to the embodiment 2.

Furthermore, when the temporal motion vector predictor is not included in the motion vector predictor candidate, the moving picture coding apparatus 100 can generate a bitstream with improved coding efficiency by not including an unnecessary flag to the bitstream. Furthermore, the moving picture decoding apparatus 200 can appropriately decode the bitstream generated as described above. A specific example shall be described with reference to FIG. 18. FIG. 18 illustrates a variation of flow for decoding the co-located information.

First, the moving picture decoding apparatus 200 decodes the co-located use prohibition flag (S201). Note that, here, an example in which a flag indicating whether or not a temporal predictive motion vector using the information of the co-located block is allowed (enable_temporal_mvp_flag) is decoded shall be described.

Next, the moving picture decoding apparatus 200 determines whether or not enable_temporal_mvp_flag is 1 (S202). When enable_temporal_mvp_flag is 1 (yes in S202), the moving picture decoding apparatus 200 decodes the co-located reference direction flag and the co-located reference picture index separately (S203 and S204).

In contrast, if enable_temporal_mvp_flag is 0 (no in S202), the moving picture coding apparatus 200 does not decode the co-located reference direction flag and the co-located reference picture index. As described above, when the temporal motion vector predictor is not included in the temporal motion vector candidates (when enable_temporal_mvp_flag is 0), the moving picture coding apparatus 100 can generate a bitstream with improved coding efficiency by not attaching the unnecessary co-located reference direction flag and the co-located reference picture index to the bitstream. Furthermore, the moving picture decoding apparatus 200 can appropriately decode the bitstream.

FIG. 19A and FIG. 19B illustrate examples of syntax when a co-located use prohibition flag (enable_temporal_mvp_flag) indicating whether or not the temporal motion vector predictor using information of the co-located block is allowed is attached to the picture parameter set (PPS), and a co-located reference direction flag (collocated_from_10_flag) and the co-located reference picture index (collocated_ref_idx) are attached to the slice header.

When the value of the co-located use prohibition flag is 1, calculating a temporal motion vector predictor using the co-located information is allowed. When the value of the co-located use prohibition flag is 0, calculating a temporal motion vector predictor using the co-located information is prohibited.

When the value of the co-located reference direction flag is 1, a co-located picture is selected from the reference picture list in the prediction direction 1. When the value of the co-located reference direction flag is 0, a co-located picture is selected from the reference picture list in the prediction direction 1.

Among the pictures included in the reference picture list determined according to the value of collocated_from_10_flag, a picture having a reference picture index collocated_ref_idx is selected as the co-located picture.

Figure 20:
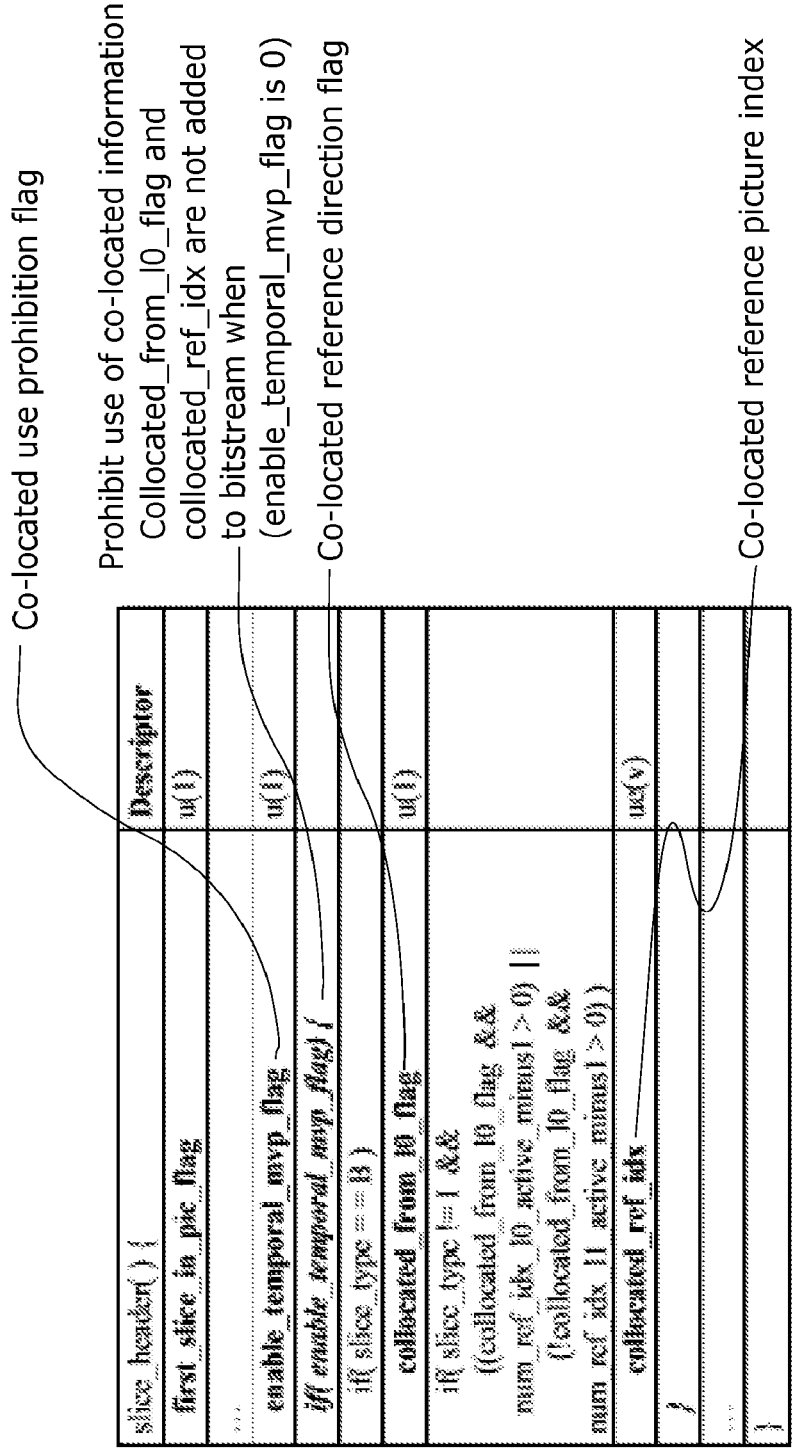
FIG. 20 is a diagram illustrating an example of syntax according to the embodiment 2.

Furthermore, FIG. 20 illustrates an example of syntax when all of the co-located use prohibition flag indicating whether or not the temporal motion vector predictor using the information of the co-located block is allowed (enable_temporal_mvp_flag), the co-located reference direction flag (collocated_from_10_flag), and the co-located reference picture index (collocated_ref_idx) are attached to the slice header.

As illustrated in FIG. 19B and FIG. 20, when the value of enable_temporal_mvp_flag is 0, collocated_from_10_flag and collocated_ref_idx are not attached to the bitstream.

Figure 21:
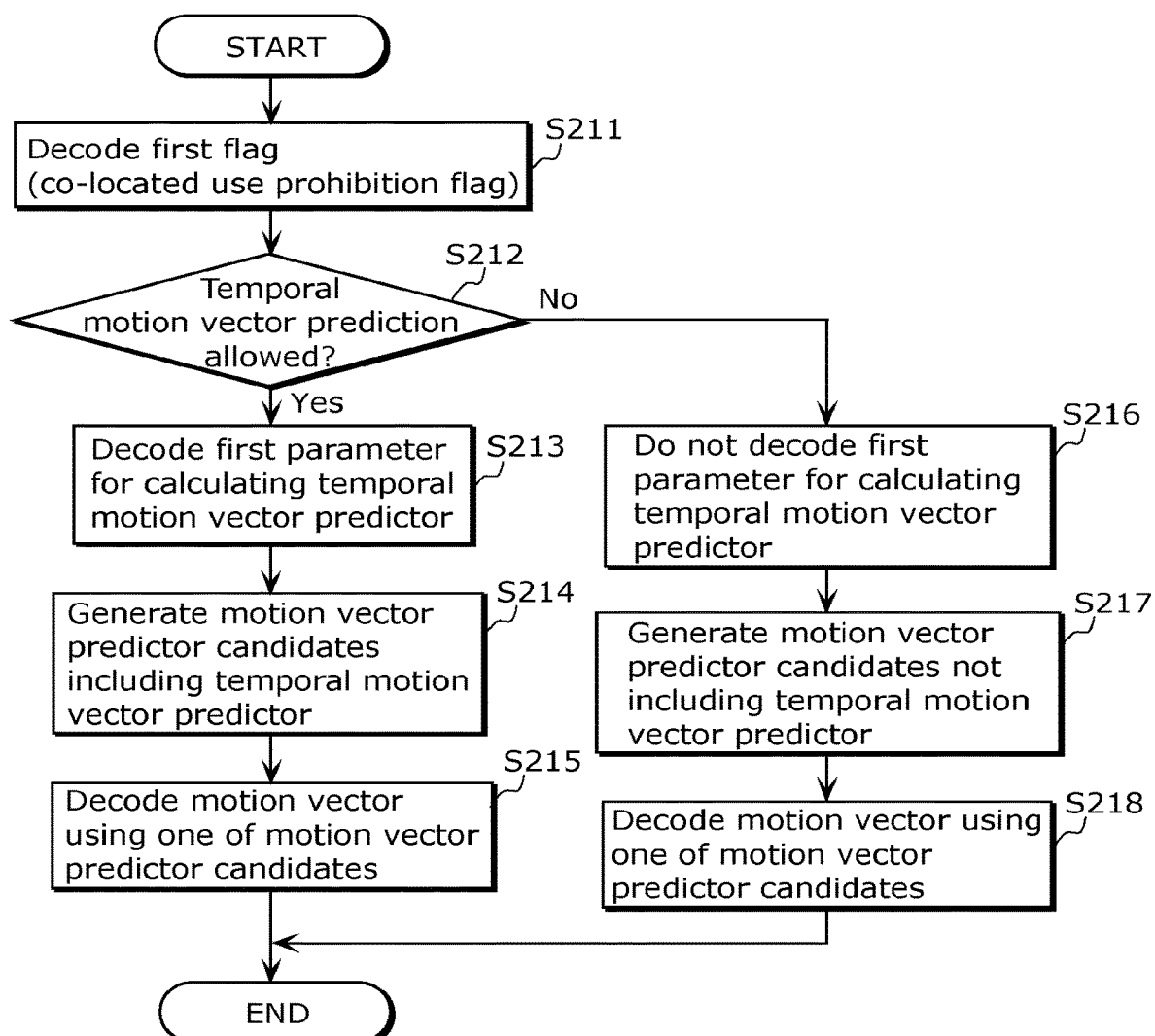
FIG. 21 is a diagram illustrating process flow of a moving picture decoding method according to the embodiment 2.

As described above, the moving picture decoding apparatus 200 performs the moving picture decoding process illustrated in FIG. 21.

The moving picture decoding apparatus 200 performs inter predictive coding using a motion vector on the current block in the current picture.

First, the moving picture decoding apparatus 200 decodes the first flag (co-located use prohibition flag) indicating whether or not temporal motion vector prediction using the temporal motion vector predictor which is a motion vector of a block in a decoded picture different from the current picture (whether the temporal motion vector prediction is allowed or prohibited) (S211). Accordingly, the moving picture decoding apparatus 200 obtains the coded first flag from the bitstream, and obtains the first flag by decoding the coded first flag.

Next, the moving picture decoding apparatus 200 determines whether or not the first flag indicates that the temporal motion vector prediction is used (allowed) (S212).

When the first flag indicates that the temporal motion vector prediction is used (allowed) (yes in S212), the moving image decoding apparatus 200 decodes the first parameter for calculating the temporal motion vector predictor (S213). More specifically, the moving picture decoding apparatus 200 obtains the coded first parameter from the bitstream, and obtains the first parameter by decoding the obtained coded first parameter. More specifically, the first parameter includes a parameter for specifying the decoded picture (co-located picture) which is a target referred to by the motion vector. More specifically, the first parameter includes a reference picture index (collocated_ref_idx) for specifying the decoded picture (co-located picture) among the pictures in the reference picture list used for decoding the current picture. In addition, the first parameter includes a flag indicating a reference picture list to be used (collocated_from_10_flag) for specifying the coded picture (co-located picture) among the reference picture lists used for decoding the current picture.

Next, the moving picture decoding apparatus 200 determines the temporal motion vector predictor using the first parameter, and derives the first motion vector predictor candidate including the determined temporal motion vector predictor (S214).

Next, the moving picture decoding apparatus 200 decodes a motion vector used for performing inter predictive decoding on the current block using one of the first motion vector predictor candidates (S215). More specifically, the moving picture decoding apparatus 200 obtains a coded motion vector (difference value) from the bitstream. Subsequently, the moving picture decoding apparatus 200 generates the difference value of the motion vector by decoding the coded motion vector (difference value). Next, a motion vector is generated by using a difference value between one of the first motion vector predictor candidates and the motion vector.

Furthermore, the moving picture decoding apparatus 200 decodes the current block by performing inter decoding using the motion vector. More specifically, the moving picture decoding apparatus 200 obtains a coded current block (difference value) from the bitstream. Subsequently, the moving picture decoding apparatus 200 generates a difference value of the current block by decoding the coded current block (difference value). Next, the moving picture decoding apparatus 200 reconstructs the current block using a difference value between the motion vector and the current block.

In contrast, when the first flag indicates that the temporal motion vector prediction is not used (prohibited) (no in S212), the moving picture decoding apparatus 200 does not decode the first parameter (S216). Stated differently, the moving picture decoding apparatus 200 does not obtain the first parameter from the bitstream.

Next, the moving picture decoding apparatus 200 derives the second motion vector predictor candidate that does not include the temporal motion vector predictor (S217).

Next, the moving picture decoding apparatus 200 performs inter decoding on the current block, using one of the second motion vector predictor candidates (S218). Note that, a specific example of the process is identical to the process in which the first motion vector predictor candidates in step S215 described above is replaced with the second motion vector predictor candidates.

Note that step S211 is performed by the flag decoding unit included in the moving picture decoding apparatus 200. Furthermore, steps S213 and S216 are performed by a parameter decoding unit included in the moving picture decoding apparatus 200. Steps S214 and S217 are performed by a candidate deriving unit included in the moving picture decoding apparatus 200. Steps S215 and S218 are performed by the motion vector decoding unit included in the moving picture decoding apparatus 200.

Here, the function of the flag decoding unit is implemented by the variable length decoding unit 201 and others illustrated in FIG. 15, for example. Here, the function of the parameter decoding unit is implemented by the variable length decoding unit 201 and others illustrated in FIG. 15, for example. The function of the candidate deriving unit is implemented by the inter prediction control unit 210 and the temporal motion vector predictor calculating unit 211 illustrated in FIG. 15. The function of the motion vector decoding unit is implemented by the variable length decoding unit 201, the inter prediction unit 208, and the inter prediction control unit 210 and others illustrated in FIG. 15.

Variation

Figure 22:
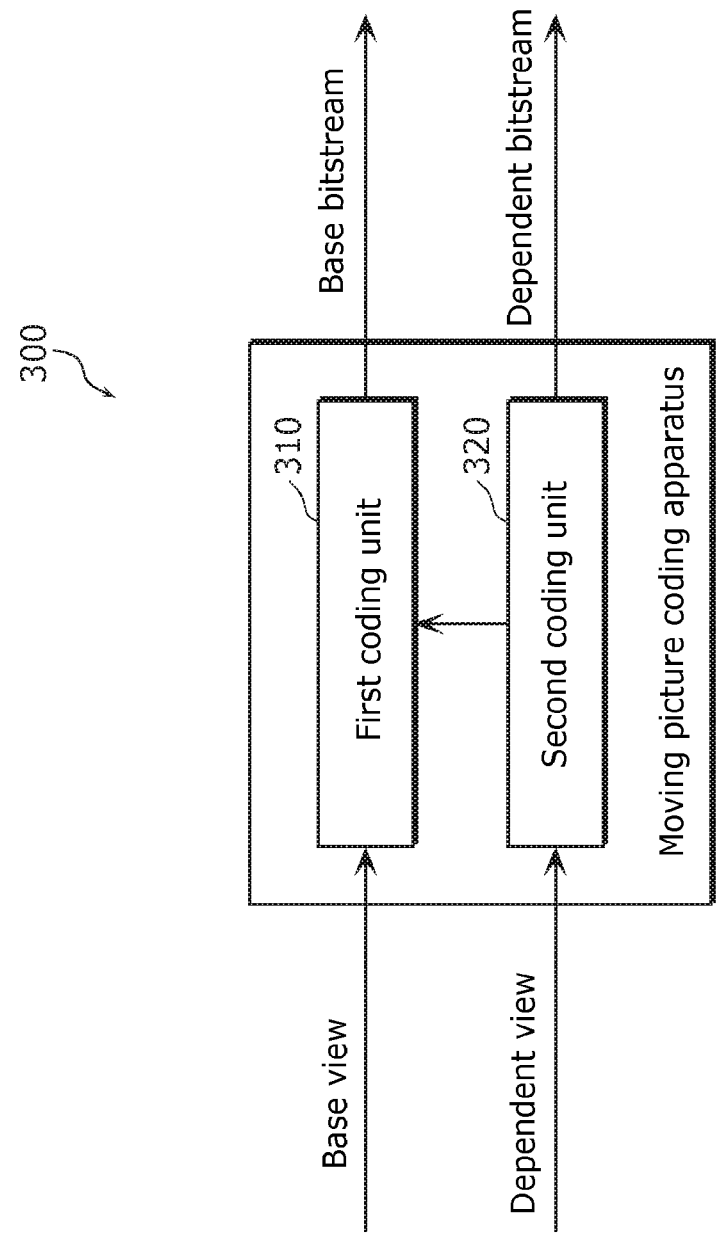
FIG. 22 is a block diagram of a moving picture coding apparatus according to the variation of the embodiment 1.

Next, a moving picture coding apparatus 300 according to a variation of the embodiment 1 shall be described with reference to FIG. 22. FIG. 22 is a block diagram of the moving picture coding apparatus 300 according to the variation of the embodiment 1. Note that, the description on the points same as the embodiment 1 is omitted, and the description shall be made focusing on the difference.

As illustrated in FIG. 22, the moving picture coding apparatus 300 includes a first coding unit 310 which generates a base bitstream by coding a base view, and a second coding unit 320 which generates a dependent bitstream by coding a dependent view. Note that, in FIG. 22, an example in which the moving picture coding apparatus 300 outputs the base bitstream and the dependent bitstream as independent streams. However, it is not limited to this example, and the moving picture coding apparatus 300 may output one bitstream which includes the base bitstream and the dependent bitstream joined as one.

The basic configuration of the first coding unit 310 and the second coding unit 320 are identical to the moving picture coding apparatus 100 illustrated in FIG. 2. However, in addition to the function as the moving picture coding apparatus 100, the second coding unit 320 has function for referring to the frame memory 108 and others in the first coding unit 310.

Figure 23:
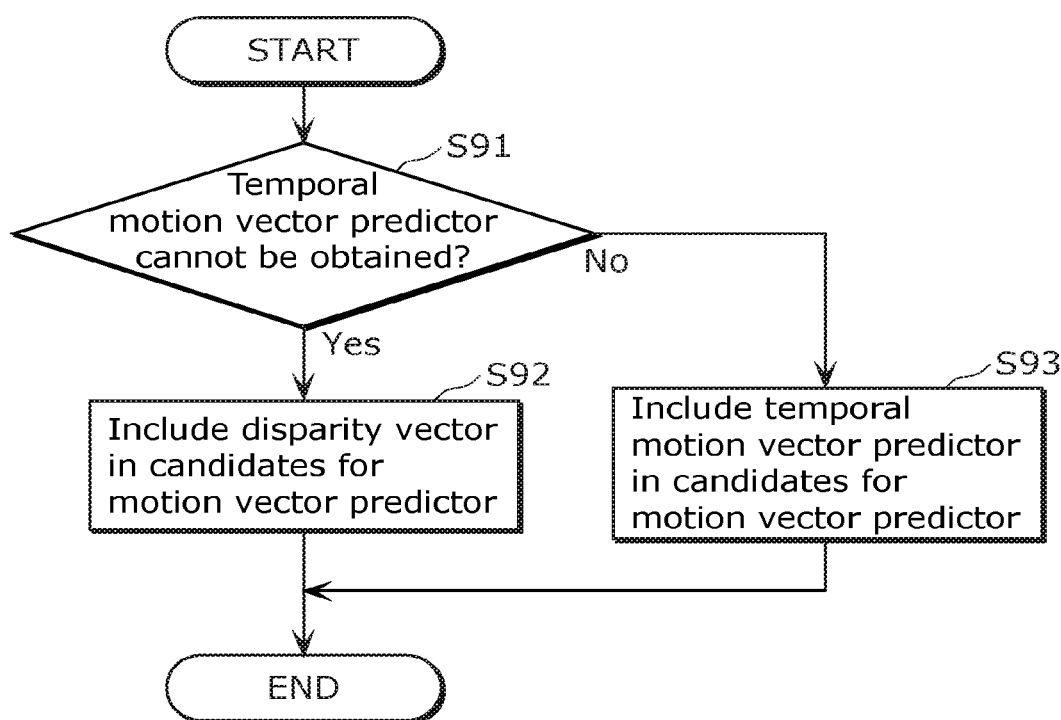
FIG. 23 is a flowchart illustrating actions in the moving picture coding method according to the variation of the embodiment 1.
Figure 24:
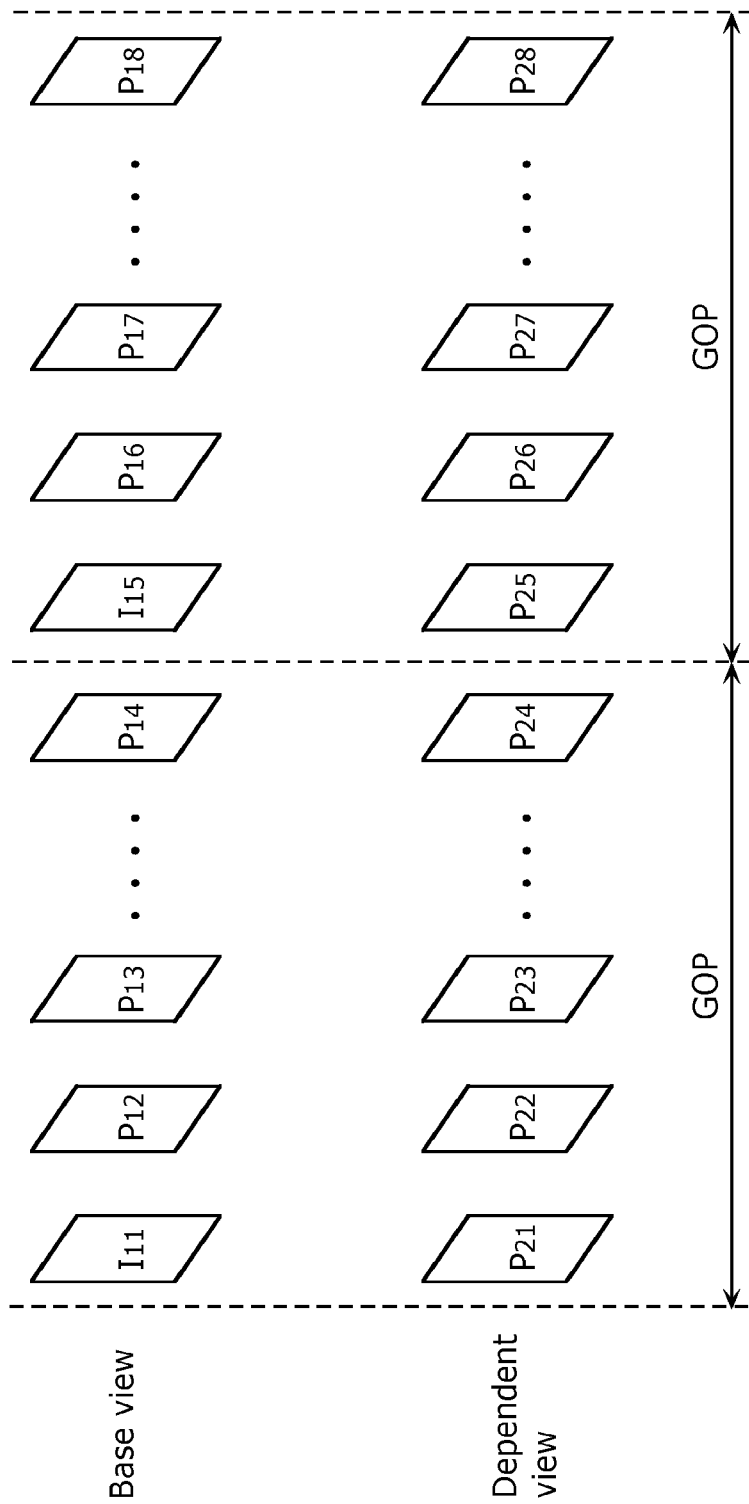
FIG. 24 illustrates an example of an image including base view and dependent view, according to the variation of the embodiment 2.

Next, a moving picture coding method according to the variation of the embodiment 1 shall be described with reference to FIG. 23 and FIG. 24. FIG. 23 is a flowchart illustrating an operation of the moving picture coding method according to the variation of the embodiment 1. FIG. 24 illustrates an example of picture belonging to the base view and the dependent view.

As illustrated in FIG. 24, the base view includes pictures I11, P12, P13, P14, I15, P16, and P17. Among pictures belonging to the base view, the pictures at the beginning of group of pictures (GOP) I11 and I15 are I pictures, and the rest of the pictures P12, P13, P14, P16, and P17 are P pictures. Note that, the base view is coded and decoded referring only to pictures belonging to the base view (that is, intra predictive coding or inter predictive coding).

The dependent view is composed of pictures P21, P22, P23, P24, P25, P26, and P27, as illustrated in FIG. 24. All of the pictures P21, P22, P23, P24, P25, P26, and P27 belonging to the dependent view are P pictures. Note that, the dependent view is coded and decoded by referring to, in addition to a picture belonging to the dependent view, a picture corresponding to the picture to be processed belonging to the base view (stated differently, the inter view predictive coding).

The base view and the dependent view are video of the subject from different viewpoints. Stated differently, corresponding pictures in the base view and the dependent view (pictures to which the same time stamp is attached) have a disparity in the horizontal direction. Subsequently, the second coding unit 320 can code a picture belonging to the dependent view by using an image corresponding to the current picture belonging to the base view as the reference picture. The following shall describe an operation of the temporal motion vector predictor calculating unit 114 in the second coding unit 320 with reference to FIG. 23.

First, the temporal motion vector predictor calculating unit 114 determines whether or not the temporal motion vector predictor can be obtained when coding the current block (S91). When the temporal motion vector predictor is not obtained (yes in S91), the temporal motion vector predictor calculating unit 114 includes the disparity vector to be described later as the motion vector predictor candidate (S92). In contrast, when the temporal motion vector predictor can be obtained (no in S91), the temporal motion vector predictor calculating unit 114 includes the temporal motion vector predictor to the motion vector predictor candidate (S93).

Here, the case in which the temporal motion vector predictor cannot be obtained includes a case in which the current block is the pictures P21 and P25 which are at the beginning of the GOP. The pictures P21 and P25 at the beginning of the GOP cannot refer to a picture preceding the picture in display order. To put it differently, when the coding order and the display order match, the pictures P21 and P25 can only refer to the corresponding pictures I11 and I15 corresponding in the base view.

However, the pictures I11 and I15 are I pictures, and thus there is no information on motion vector. In this case, the temporal motion vector predictor calculating unit 114 includes the disparity vector stored in the global vector storage unit 116 to the motion vector predictor candidate as the replacement vector of the temporal motion vector predictor, and includes the disparity vector to the header information of the dependent bitstream.

Here, the disparity vector is a vector corresponding to the disparity between the base view and the dependent view. More specifically, the inter predictive control unit 112 in the second coding unit 320 outputs a motion vector when performing inter-view predictive coding on the blocks composing the current picture in the dependent view (stated differently, the motion vector when coding is performed using a corresponding picture in the base view as the reference picture) to the global vector storage unit 116. Subsequently, the global vector storage unit 116 stores an average value, a median value, or a mode value of the motion vectors obtained from the inter prediction control unit 112 for each picture as the disparity vector.

Note that, in step S92 in FIG. 23, the temporal motion vector predictor calculating unit 114 may select a disparity vector calculated by the picture P21 at the beginning of the GOP immediately before the GOP belonging to the picture P25 (disparity vector having the picture I11 as the reference picture) or a disparity vector calculated by the picture P24 which is coded immediately before (the disparity vector having the picture P14 as the reference picture).

Furthermore, in step S91 in FIG. 23, a specific example of a case where the temporal motion vector predictor cannot be obtained is not limited to the example described above, and may be a case in which the co-located use prohibition flag in the current picture is on. Since the description of the co-located use prohibition flag is common to the description on the embodiment 1, overlapping description shall be omitted.

As described above, the present disclosure is applicable to a case in which the base view and the dependent view composing the multi-view video are coded. More specifically, by switching whether the temporal motion vector predictor or the disparity vector which is a replacement vector of the temporal motion vector predictor is included as a motion vector predictor candidate when coding the current picture belonging to the dependent view allows preventing the decoding error from propagating while suppressing the reduction in the coding efficiency.

Figure 25:
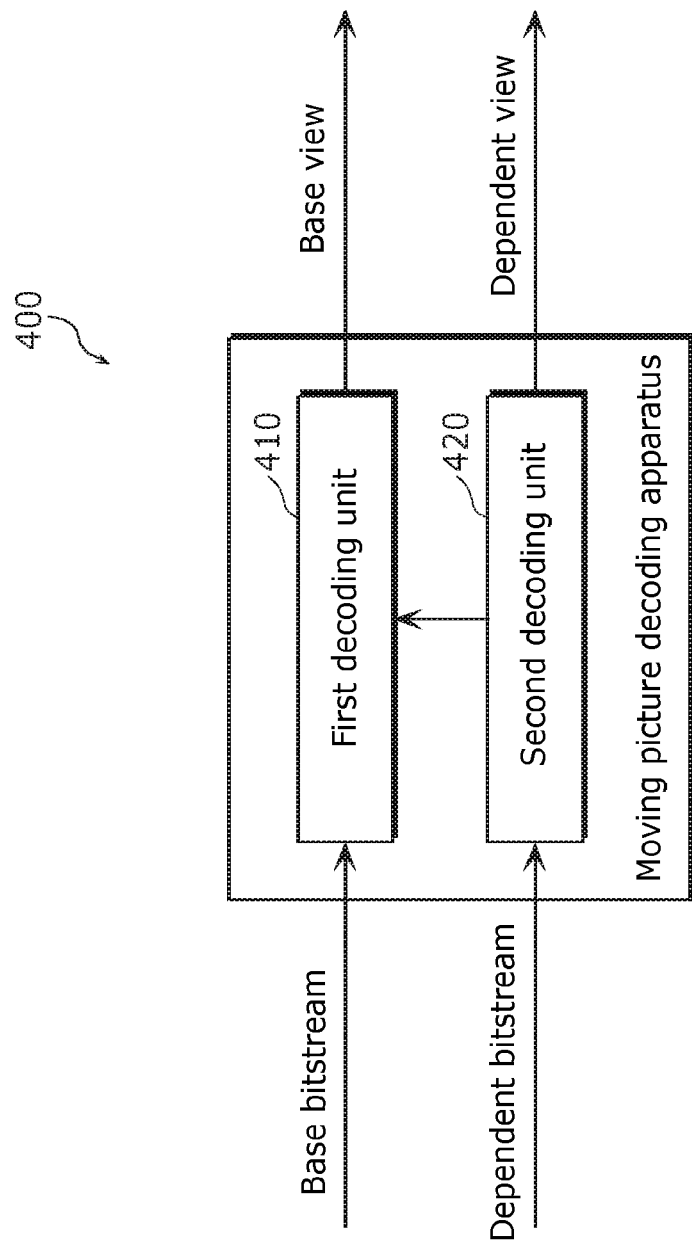
FIG. 25 is a block diagram of a moving picture decoding apparatus according to the variation of the embodiment 2.

Next, a moving picture coding apparatus 400 according to a variation of the embodiment 2 shall be described with reference to FIG. 25. FIG. 25 is a block diagram of the moving picture coding apparatus 400 according to the variation of the embodiment 2. Note that, the description on the points same as the embodiment 2 is omitted, and the description shall be made focusing on the difference.

The moving picture decoding apparatus 400 includes a first decoding unit 410 which generates a base view by decoding the base bitstream, and a second decoding unit 420 which generates a dependent view by decoding the dependent bitstream as illustrated in FIG. 25. Note that, although FIG. 25 illustrates an example in which independent base bitstream and the dependent bitstream are separately input to the moving picture decoding apparatus 400, it is not limited to this example. For example, one bitstream in which the base bitstream and the dependent bitstream are joined is input, and may be divided into the base bitstream and the dependent bitstream inside the moving picture decoding apparatus 400.

The basic configuration of the first decoding unit 410 and the second decoding unit 420 is identical to the moving picture decoding apparatus 200 illustrated in FIG. 15. However, the second decoding unit 420 has a function of referring to the frame memory 206 and others of the first decoding unit 410, in addition to the function of the moving picture decoding apparatus 200. More specifically, the moving picture decoding apparatus 400 decodes the base bitstream and the dependent bitstream coded by the moving picture coding apparatus 300.

In addition, the second decoding unit 420 in the moving picture decoding apparatus 400 can switch whether the temporal motion vector predictor stored in the colPic memory 212 or the disparity vector included in the header information of the dependent bitstream is included as one of the motion vector predictor candidates for the current block. Note that, the operation of the temporal motion vector predictor calculating unit 211 included in the second decoding unit 420 is identical to the process in FIG. 23.

The moving picture coding apparatus and the moving picture decoding apparatus according to the embodiment has been described above. The present disclosure is not limited to the embodiment.

Each processing unit constituting the moving picture coding apparatus and the moving picture decoding apparatus is typically configured from an LSI which is an integrated circuit. The processing units may be individually packaged in one chip, or one chip may include a part of or all of the processing units.

The form of integration is not limited to LSI, but may be a dedicated circuit or a general-purpose processor. In addition, it is also acceptable to use a Field Programmable Gate Array (FPGA) that is programmable after the LSI has been manufactured, and a reconfigurable processor in which connections and settings of circuit cells within the LSI are reconfigurable.

In each embodiment, each component may be configured of a dedicated hardware or implemented by executing a software program suitable for each component. Each component may be implemented by a program executing unit such as CPU or processor reading and executing a software program recorded on such as a hard disk or a recording medium a semiconductor memory.

Stated differently, the moving picture coding apparatus and the moving picture decoding apparatus include a control circuitry and a storage electrically connected to (accessible from the control device) the control circuitry. The control circuitry includes at least one of a dedicated software and a program execution unit. Furthermore, when the control circuitry includes a program execution unit, the storage stores a software program executed by the program executing unit.

Furthermore, the present disclosure may be the software program, or a non-transitory computer readable recording medium on which the program is stored. Needless to say, the program can be distributed via a transmission medium such as the Internet.

Furthermore, the numbers used in the description above are examples for specifically describing the present disclosure. Accordingly, the present disclosure is not limited by the numbers presented as examples.

Furthermore, division of the functional block in the block diagram is an example, and functional blocks may be implemented as one functional block, one functional block may be divided into more than one block, or a part of the function may be moved to another functional block. Alternatively, the function of the functional blocks having similar function may be processed concurrently or in time-division by a single hardware or software.

The order of execution of steps including the moving picture coding method and the moving picture decoding method is an example for specifically describing the present disclosure, and may be in another order. Furthermore, a part of the step may be executed at the same time (concurrently) with the other steps.

Although the moving picture coding apparatus and the moving picture decoding apparatus according to one or multiple embodiments of the present disclosure have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 26:
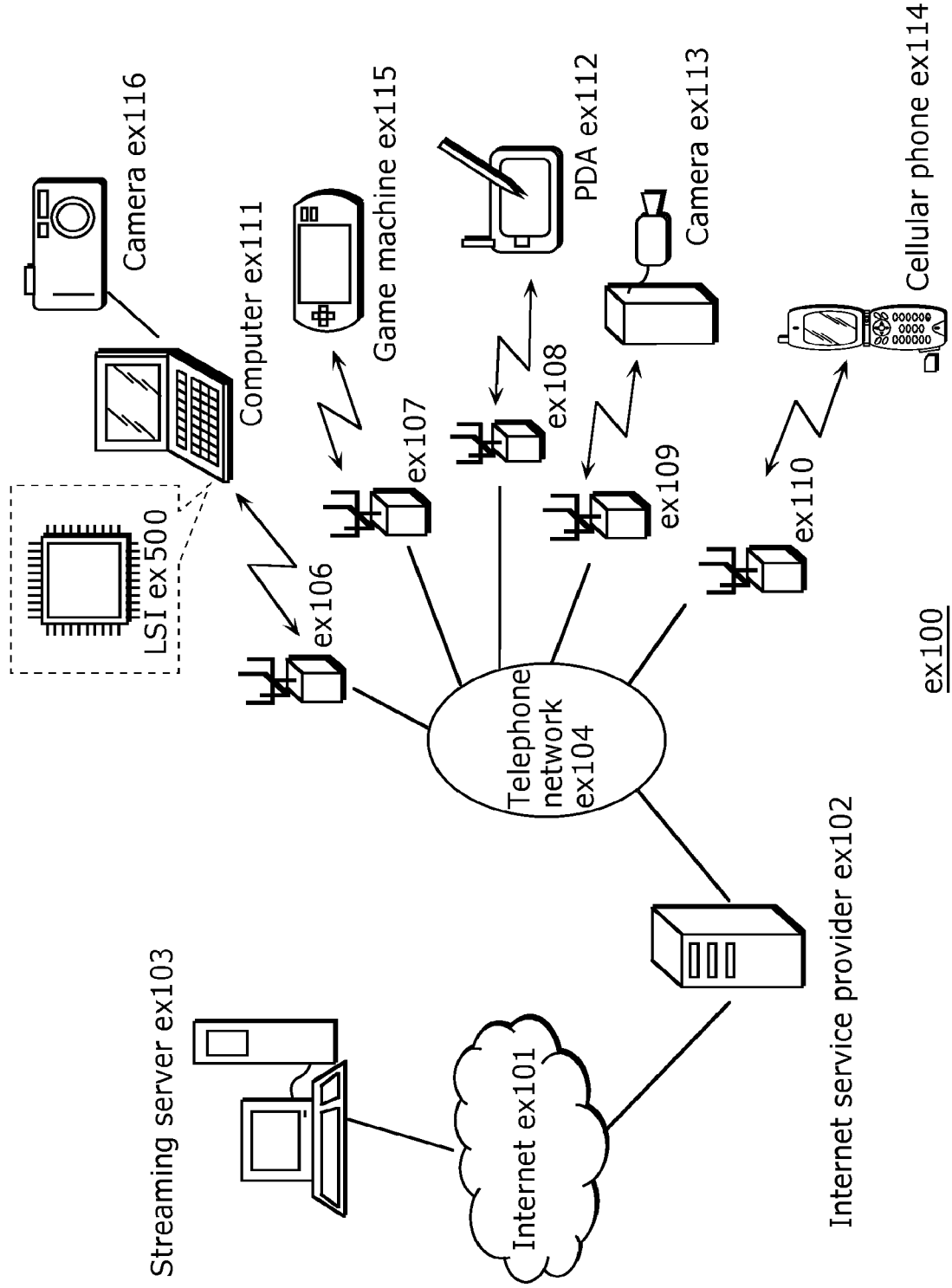
FIG. 26 illustrates an overall configuration of a content providing system ex190 for implementing content distribution services.

FIG. 26 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 26, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video.

Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for encoding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 27:
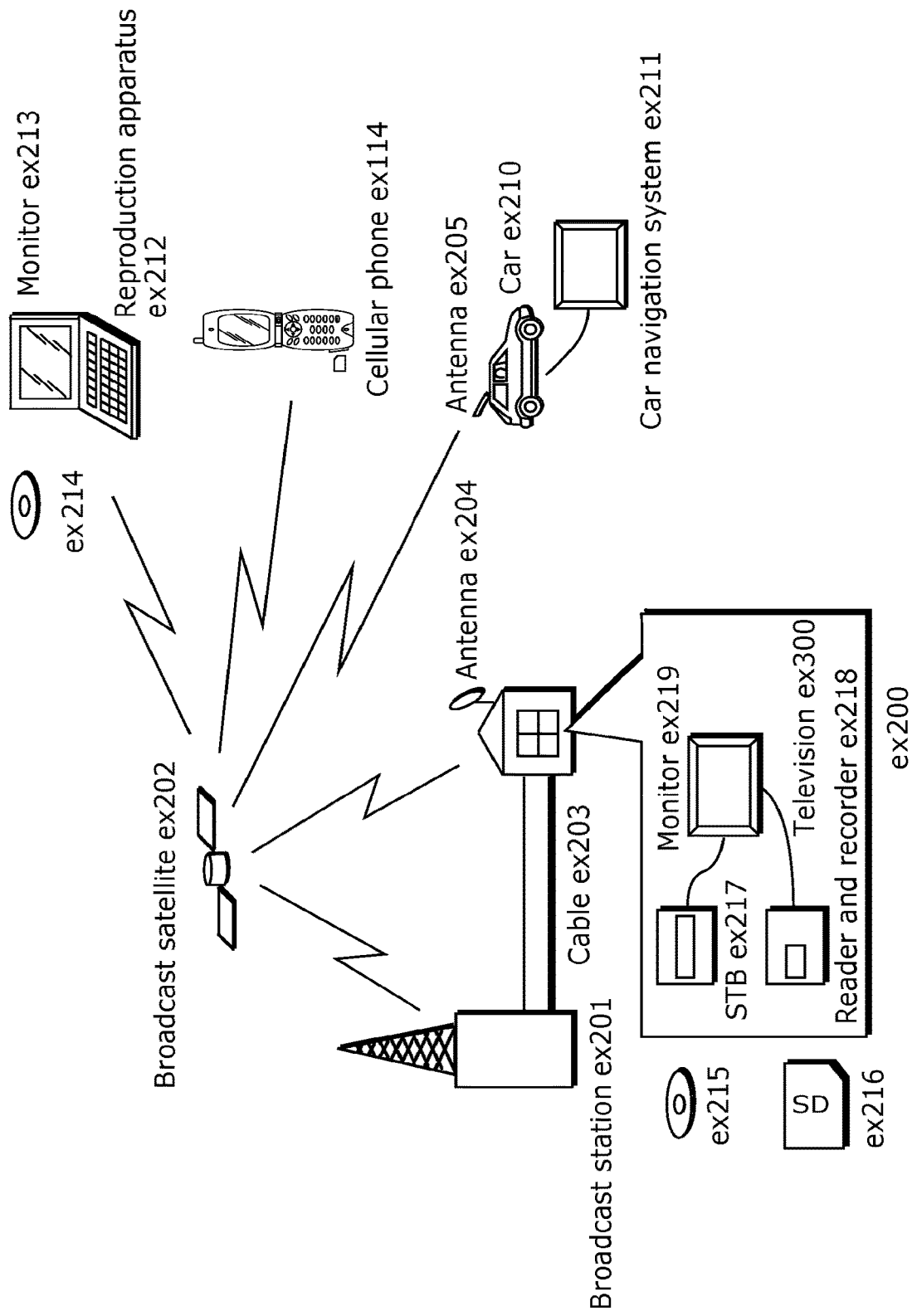
FIG. 27 illustrates an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 27. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 28:
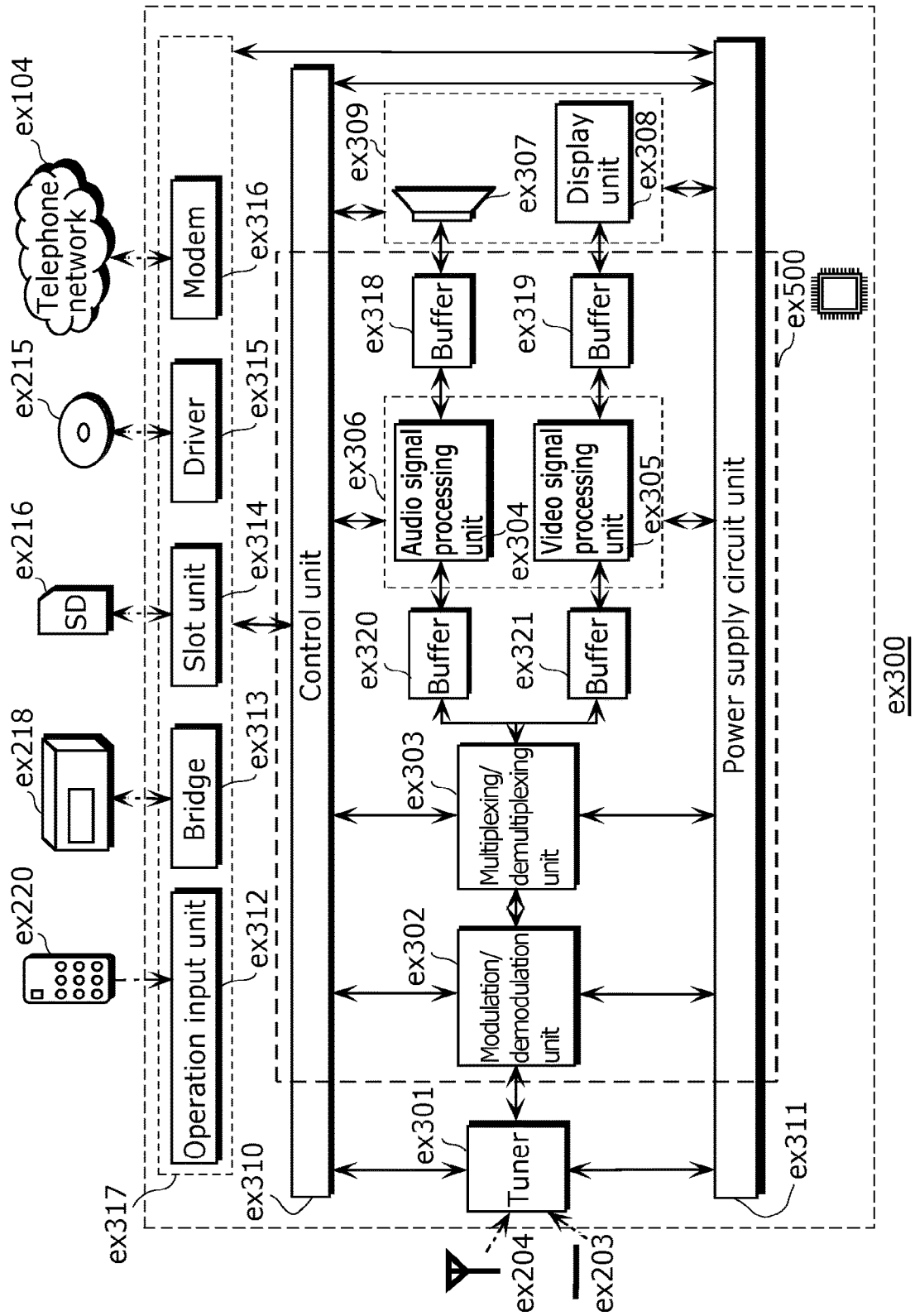
FIG. 28 illustrates a block diagram illustrating an example of a configuration of a television.

FIG. 28 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or encode the multiplexed data, and the television ex300 and the reader/recorder ex218 may share the decoding or encoding.

Figure 29:
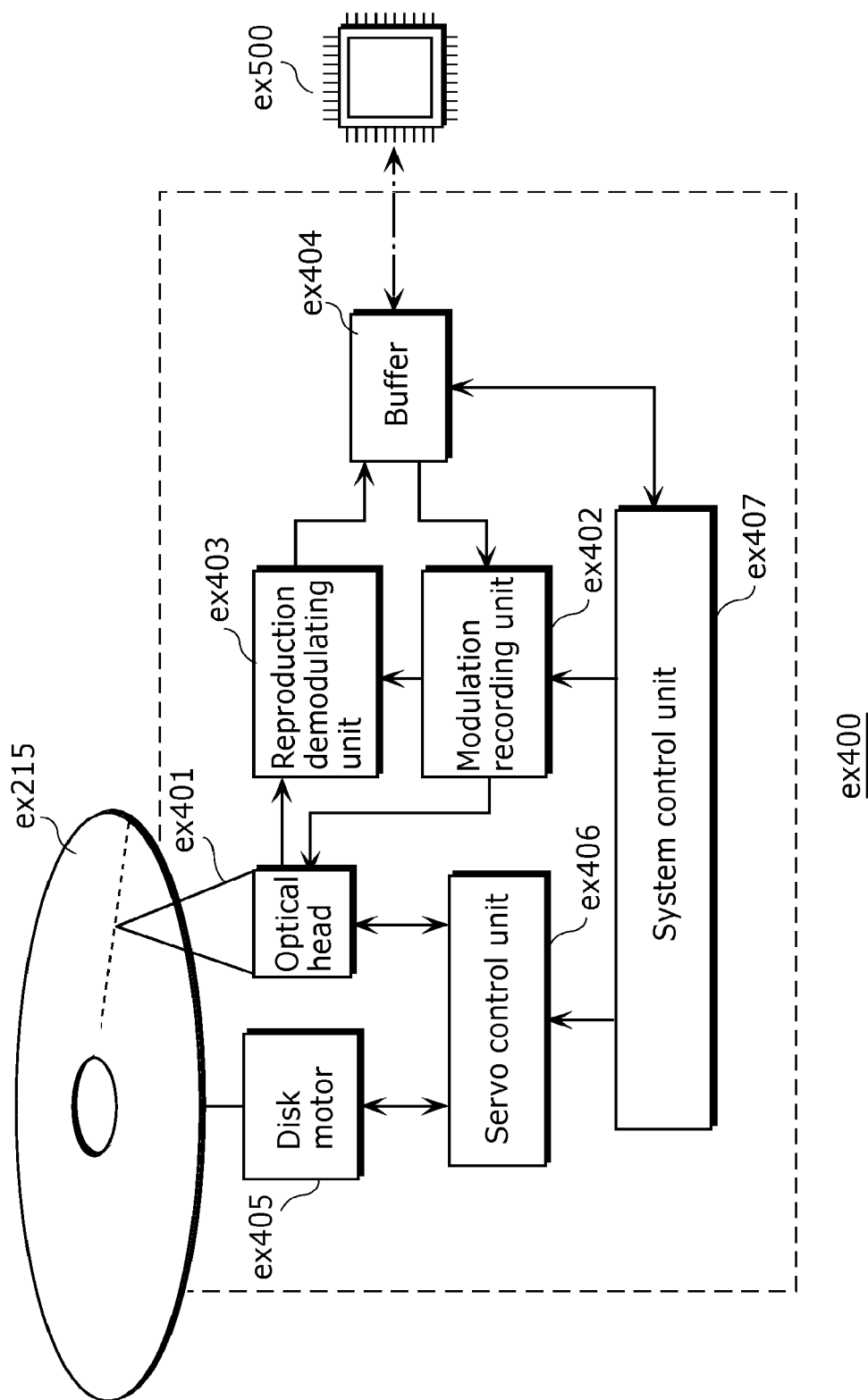
FIG. 29 illustrates a block diagram illustrating an example of a configuration of an information reproducing/recording unit that reads and writes information from and on a recording medium that is an optical disk.

As an example, FIG. 29 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 30:
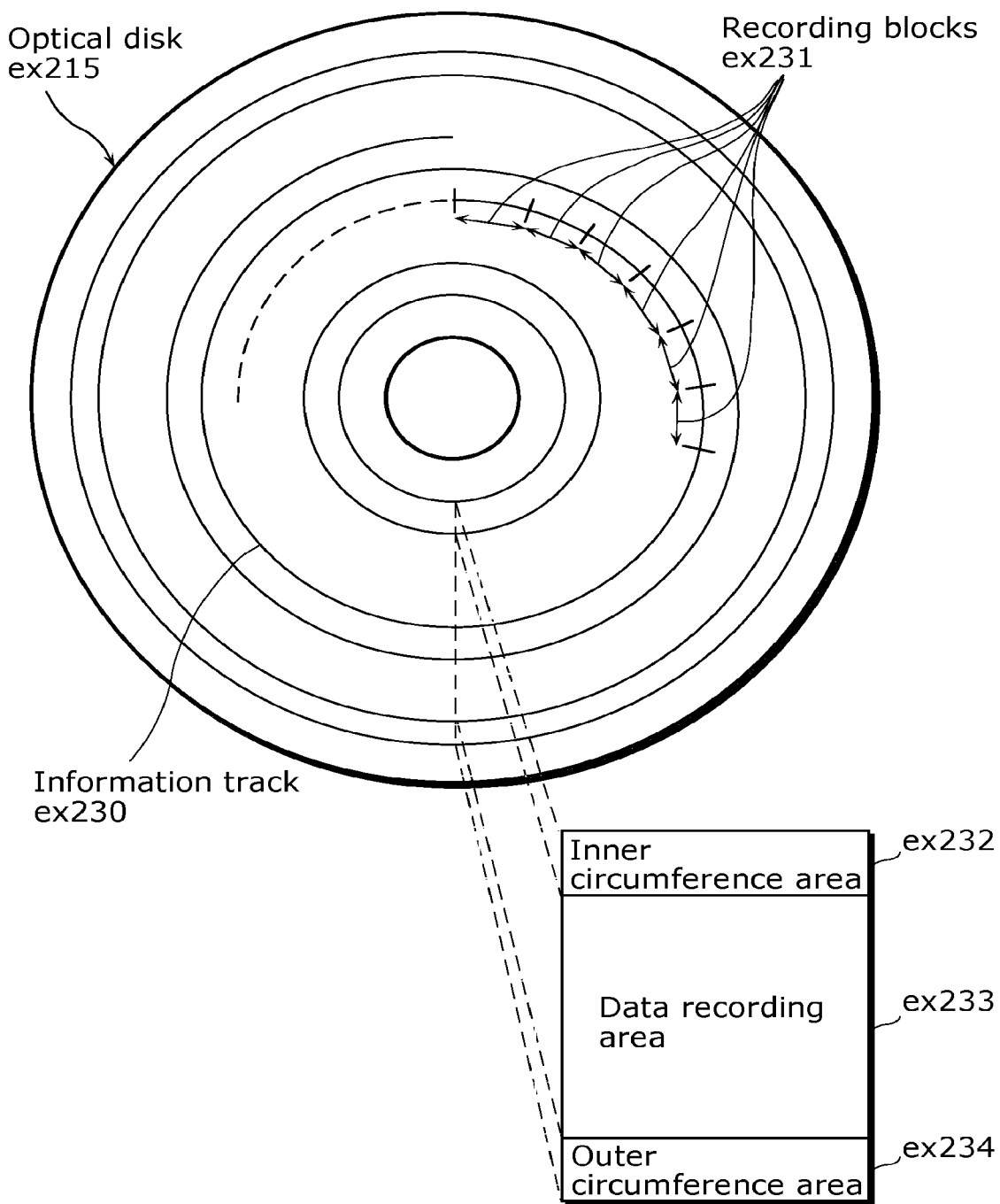
FIG. 30 illustrates an example of a configuration of a recording medium that is an optical disk.

FIG. 30 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 28. The same will be true for the configuration of the computer ex111, the cellular phone ex114, and others.

Figure 31A:
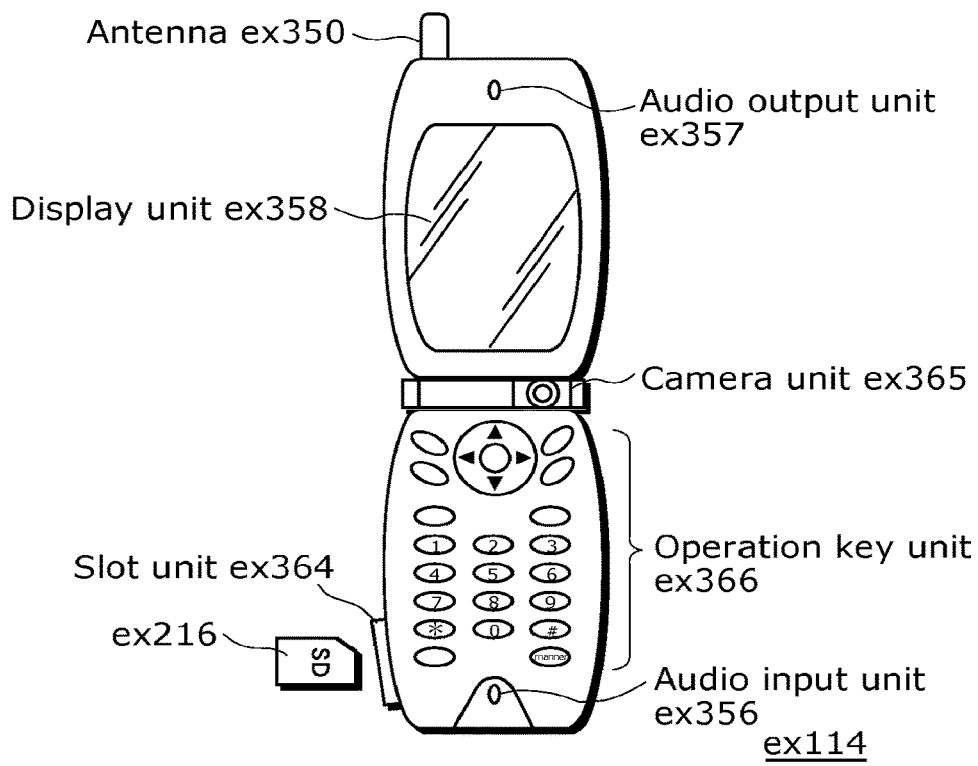
FIG. 31A illustrates an example of a cellular phone.

FIG. 31A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded or decoded data of the received video, the still pictures, e-mails, or others; and a slot unit ex364 that is an interface unit for a recording medium that stores data in the same manner as the memory unit ex367.

Figure 31B:
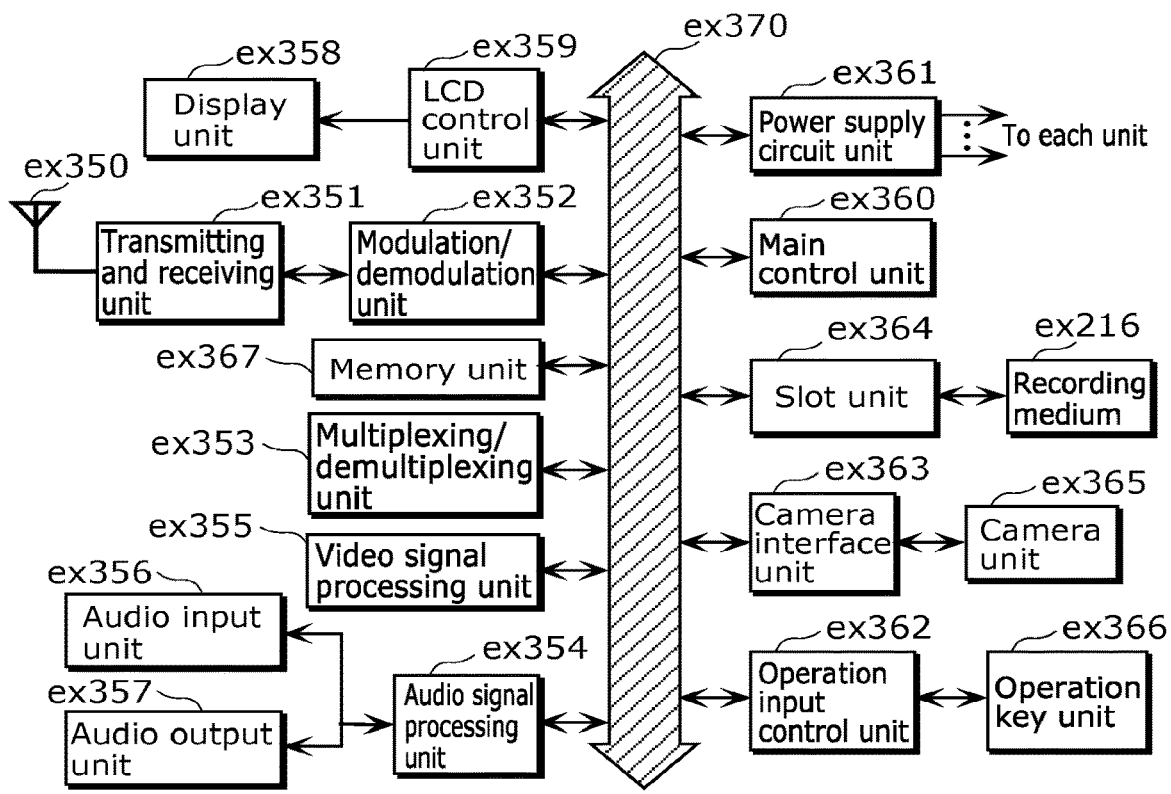
FIG. 31B is a block diagram showing an example of a configuration of a cellular phone.

Next, an example of a configuration of the cellular phone ex114 will be described with reference to FIG. 31B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 32 illustrates a structure of the multiplexed data. As illustrated in FIG. 32, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 33:
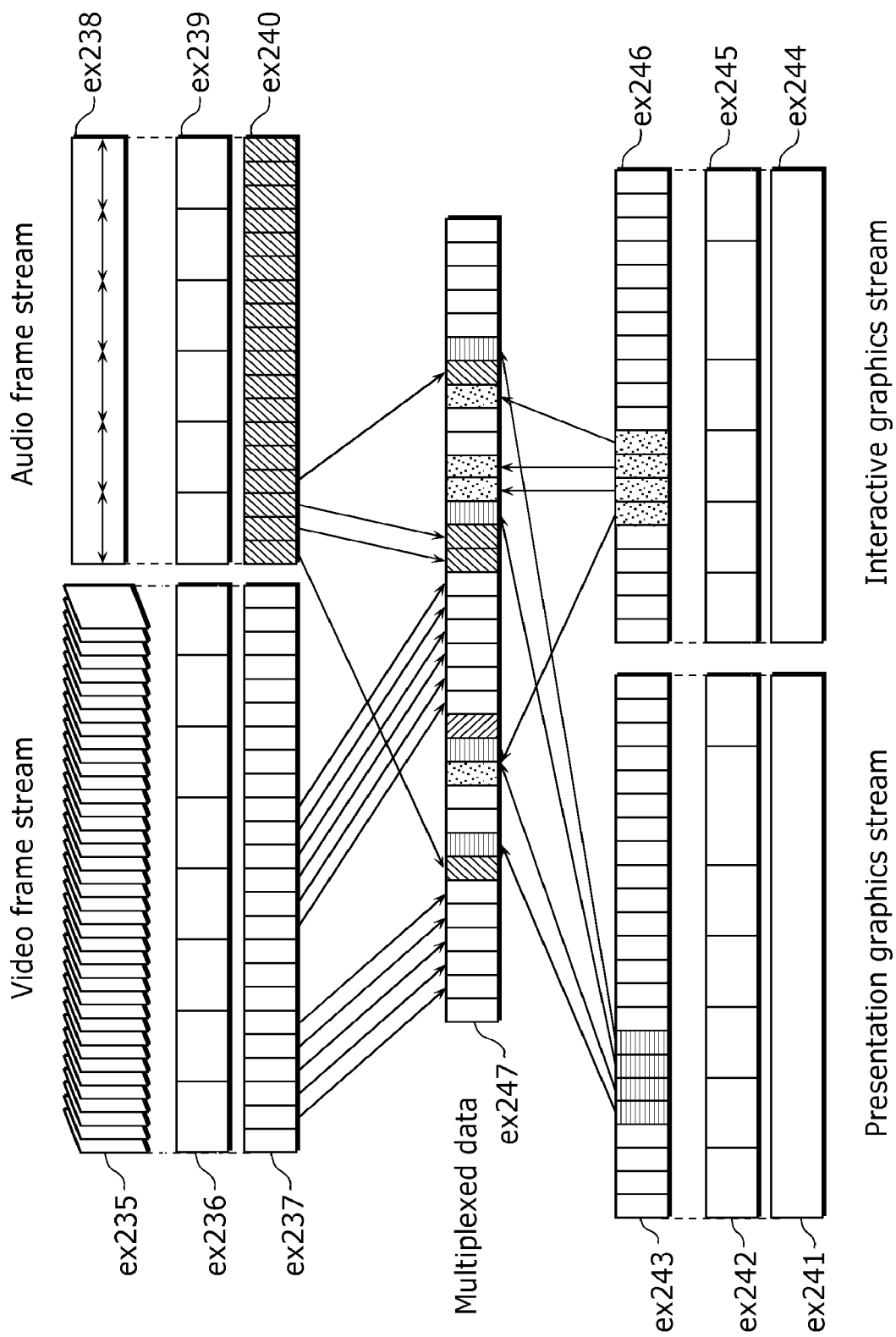
FIG. 33 schematically illustrates how each stream is multiplexed in multiplexed data.

FIG. 33 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 34:
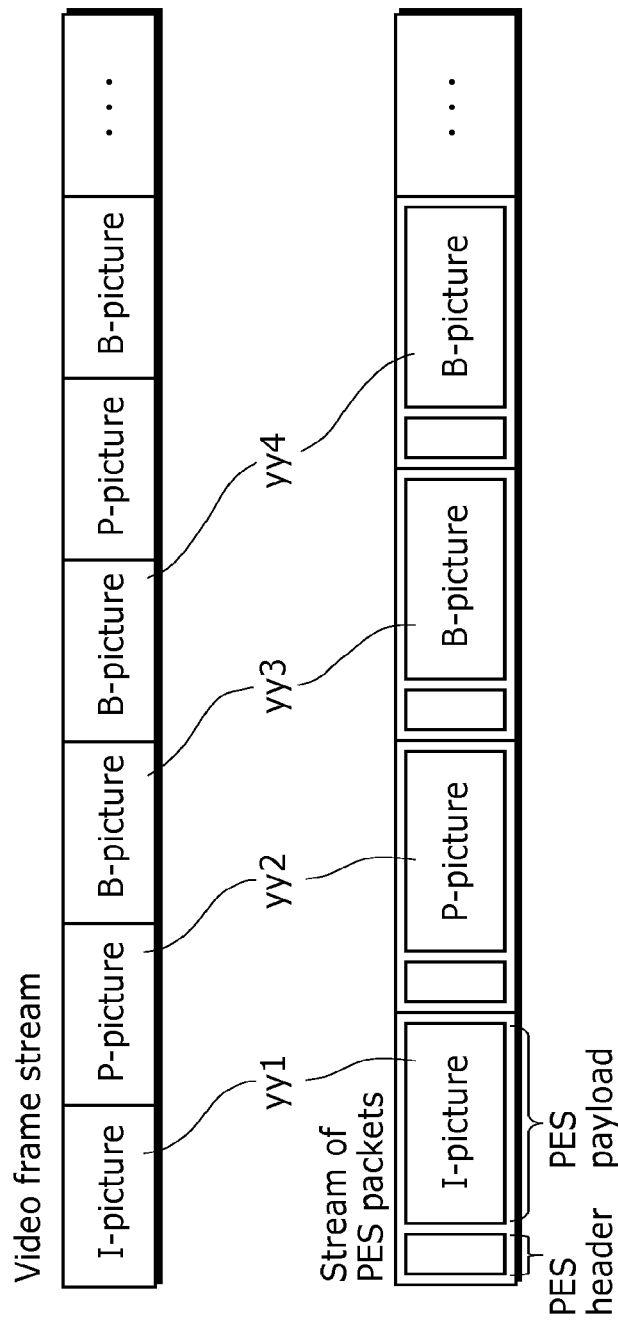
FIG. 34 illustrates how a video stream is stored in a stream of PES packets in more detail.

FIG. 34 illustrates how a video stream is stored in a stream of PES packets in more detail. The first bar in FIG. 34 shows a video frame stream in a video stream. The second bar shows the stream of PES packets. As indicated by arrows denoted as yy1, yy2, yy3, and yy4 in FIG. 34, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 35:
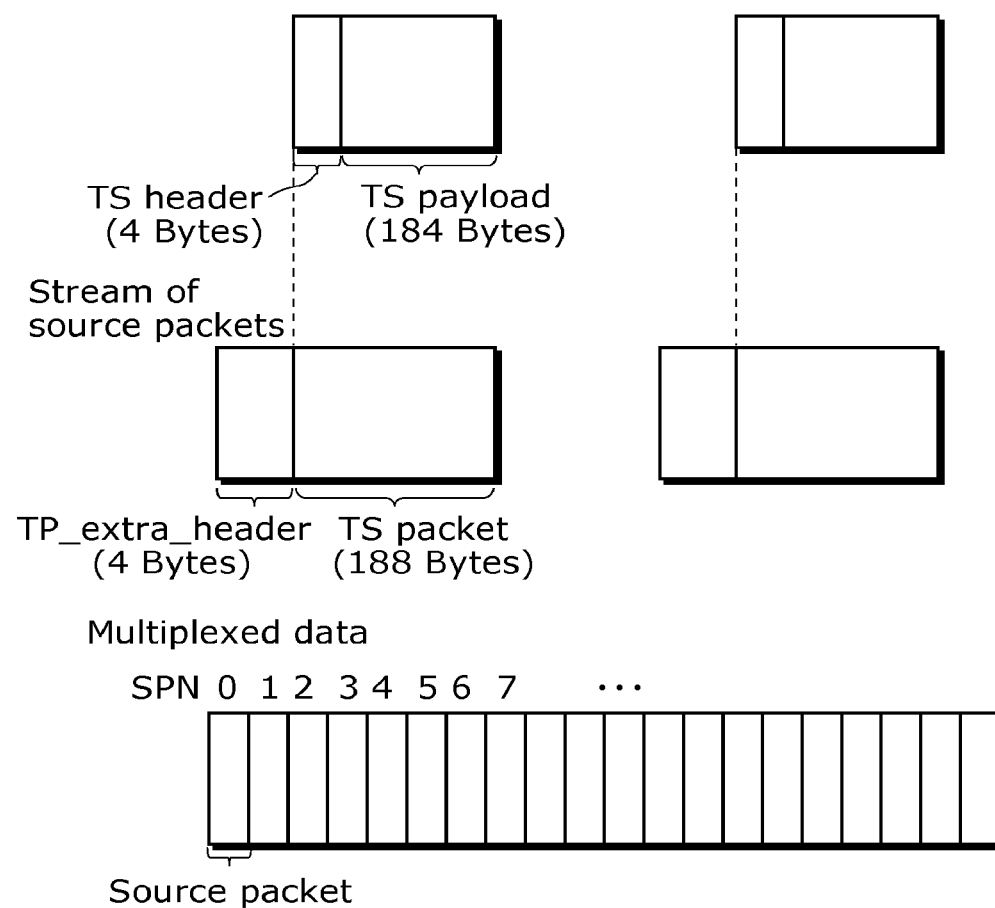
FIG. 35 illustrates a structure of TS packets and source packets in the multiplexed data.

FIG. 35 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 35. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 36:
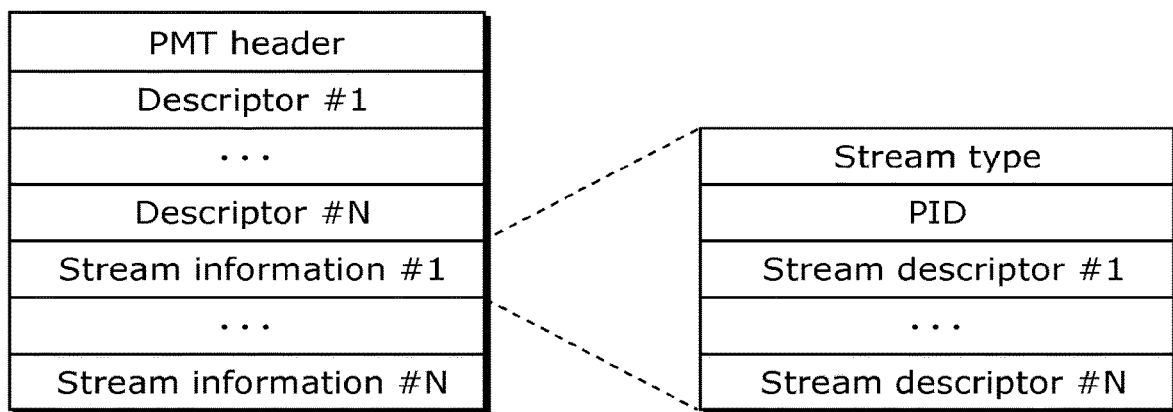
FIG. 36 illustrates a data structure of a PMT.

FIG. 36 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 37:
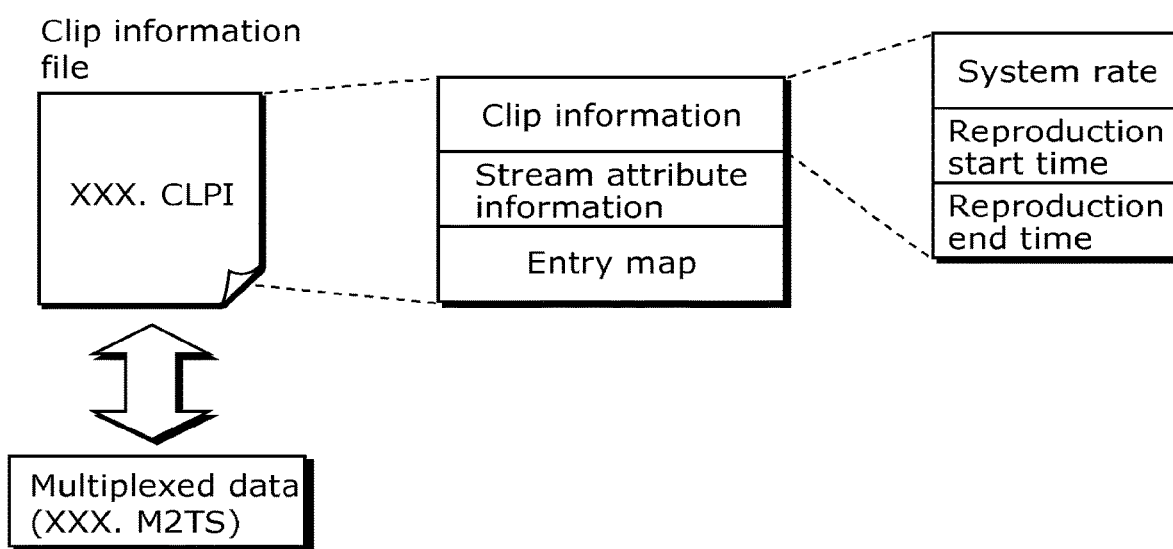
FIG. 37 illustrates an internal structure of multiplexed data information.

Each of the multiplexed data information files is management information of the multiplexed data as shown in FIG. 37. The multiplexed data information files are in one to one correspondence with the multiplexed data, and each of the files includes multiplexed data information, stream attribute information, and an entry map.

As illustrated in FIG. 37, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 38:
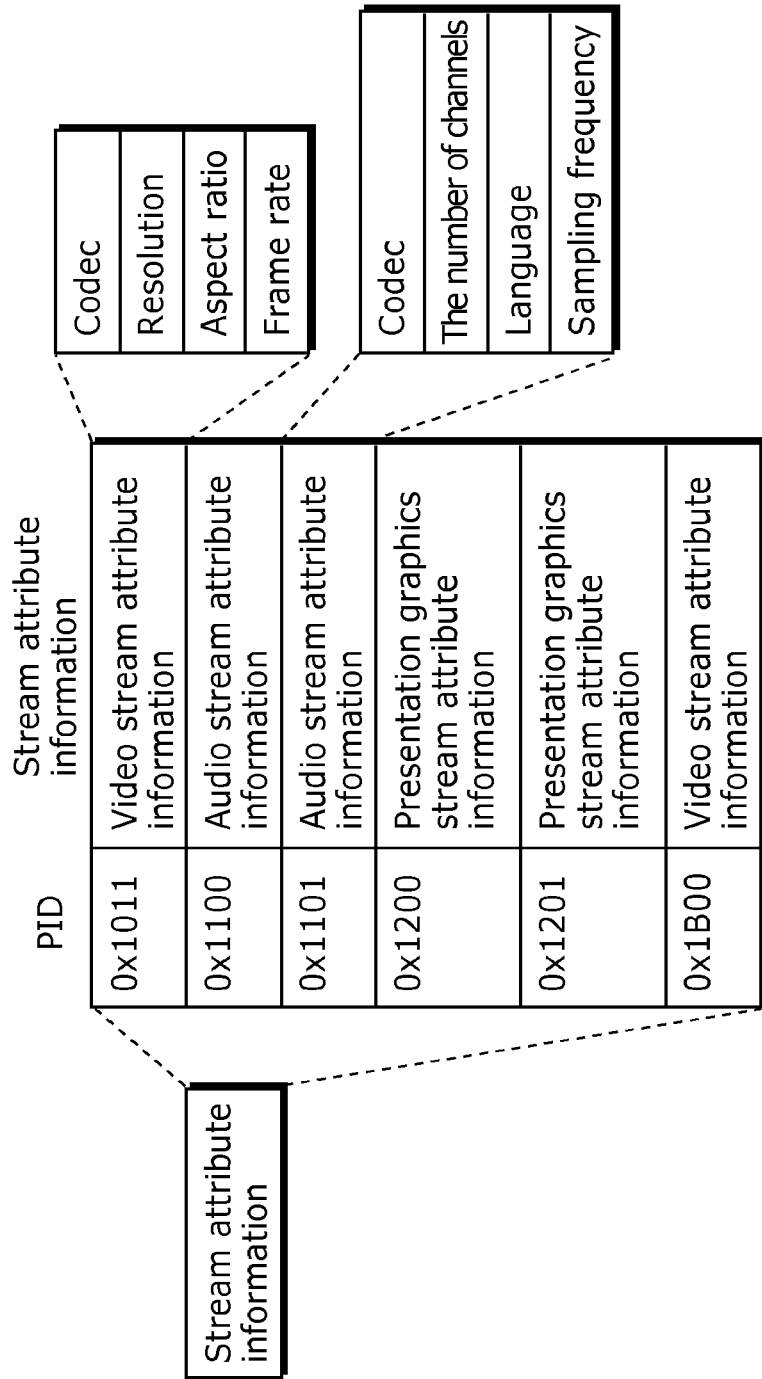
FIG. 38 illustrates an internal structure of stream attribute information.

As shown in FIG. 38, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 39:
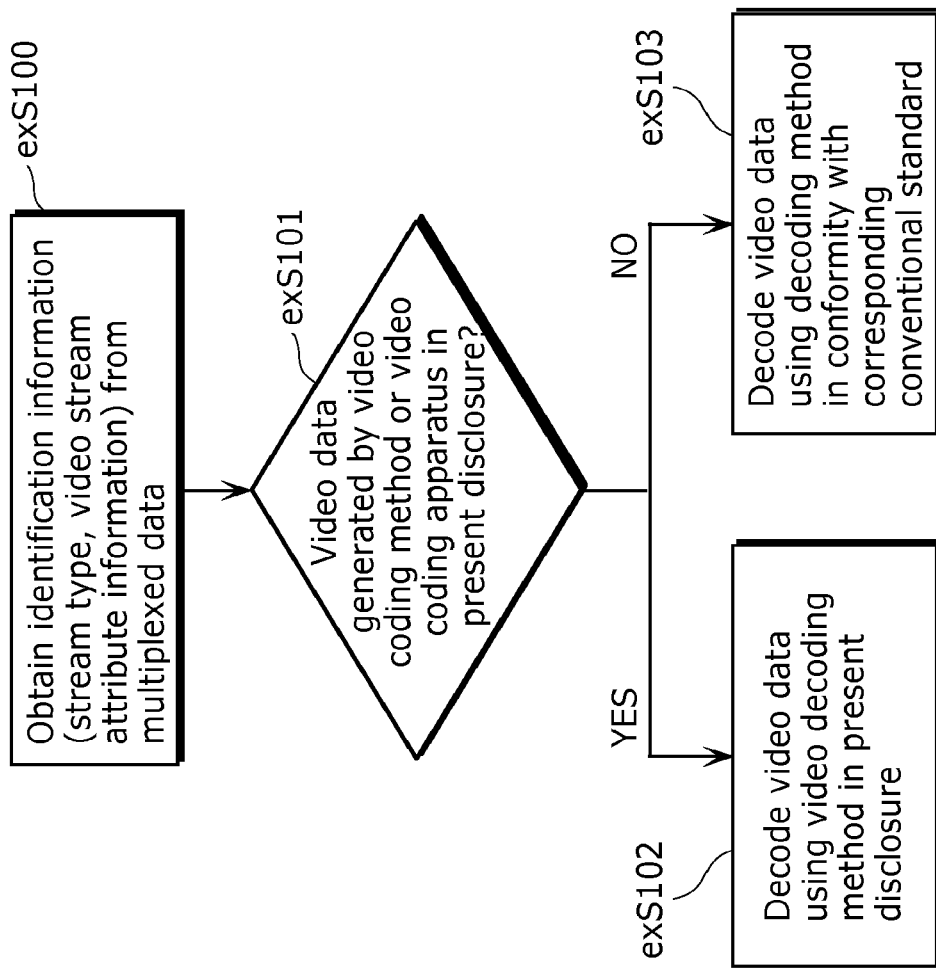
FIG. 39 illustrates steps for identifying video data.

Furthermore, FIG. 39 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 40:
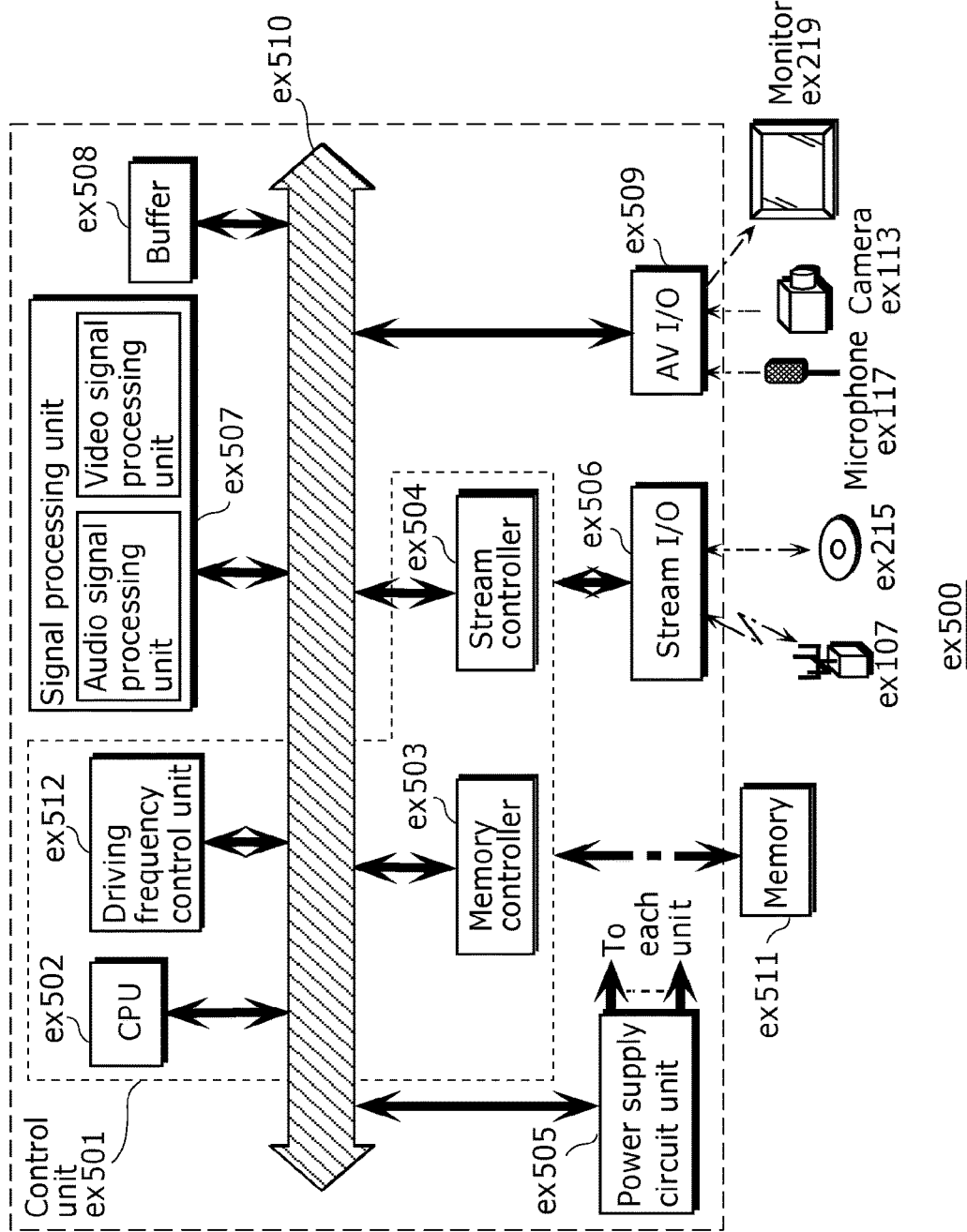
FIG. 40 illustrates an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 40 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 41:
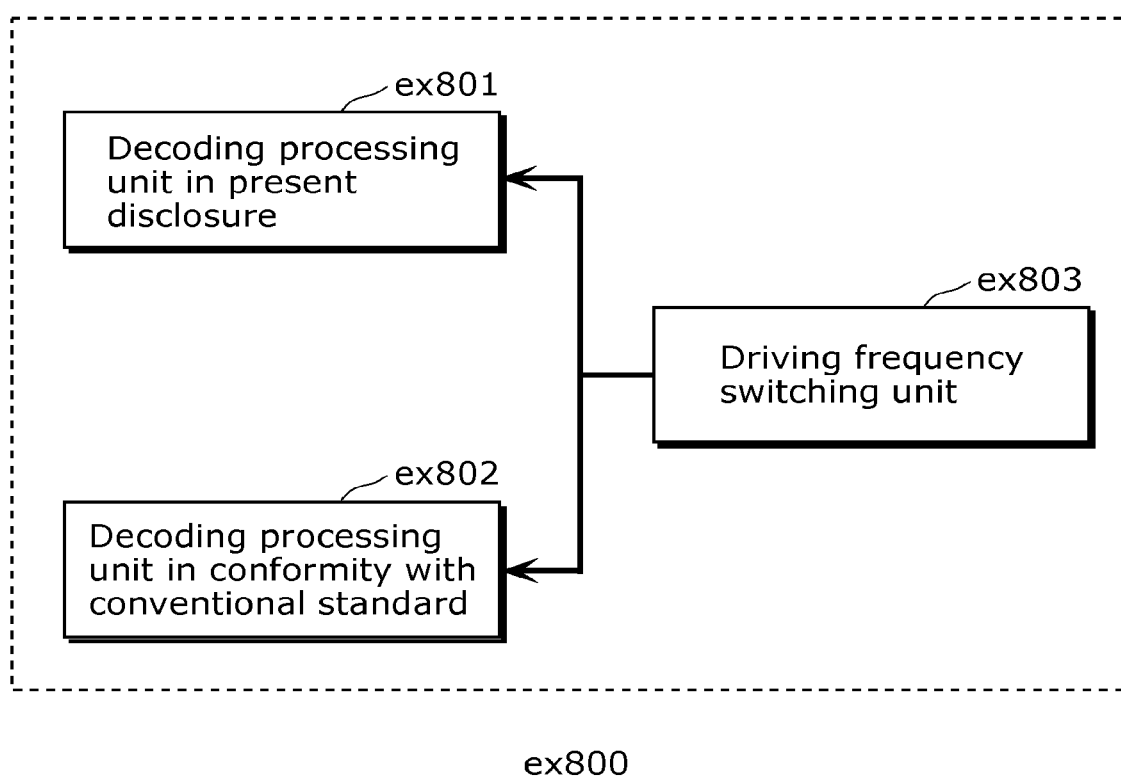
FIG. 41 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 41 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 40. Here, each of the decoding processing unit ex801 that executes the moving picture decoding method described in each of embodiments and the decoding processing unit ex802 that conforms to the conventional standard corresponds to the signal processing unit ex507 in FIG. 40. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 43. The driving frequency can be selected by storing the look-up table in the buffer ex508 and in an internal memory of an LSI, and with reference to the look-up table by the CPU ex502.

Figure 42:
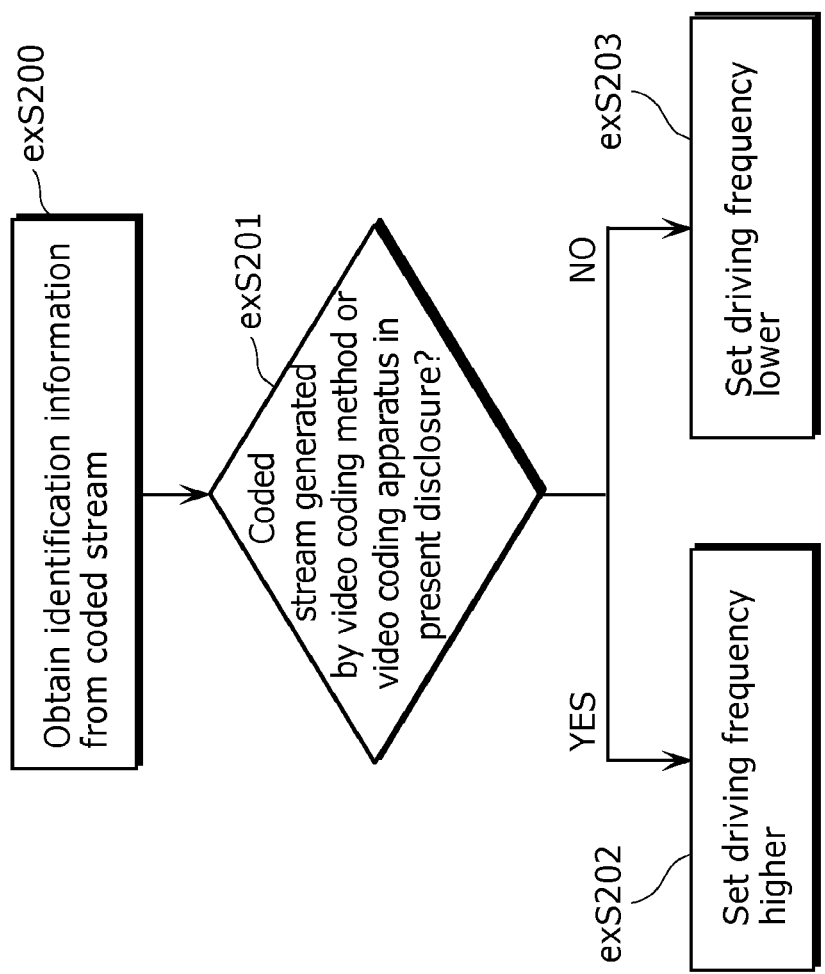
FIG. 42 illustrates steps for identifying video data and switching between driving frequencies.

FIG. 42 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 44A:
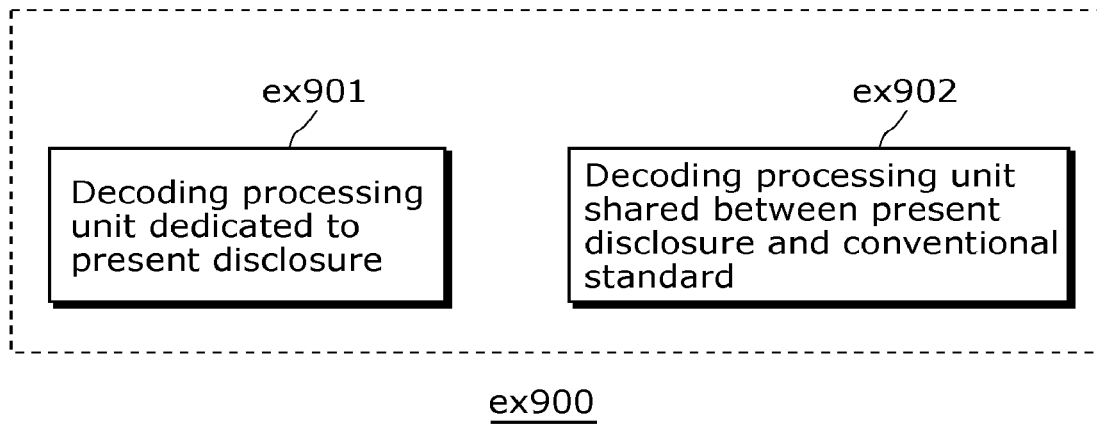
FIG. 44A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 44A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present invention and does not conform to MPEG-4 AVC. Since the aspect of the present invention is characterized by inter prediction in particular, for example, the dedicated decoding processing unit ex901 is used for inter prediction. Otherwise, the decoding processing unit is probably shared for one of the entropy decoding, inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 44B:
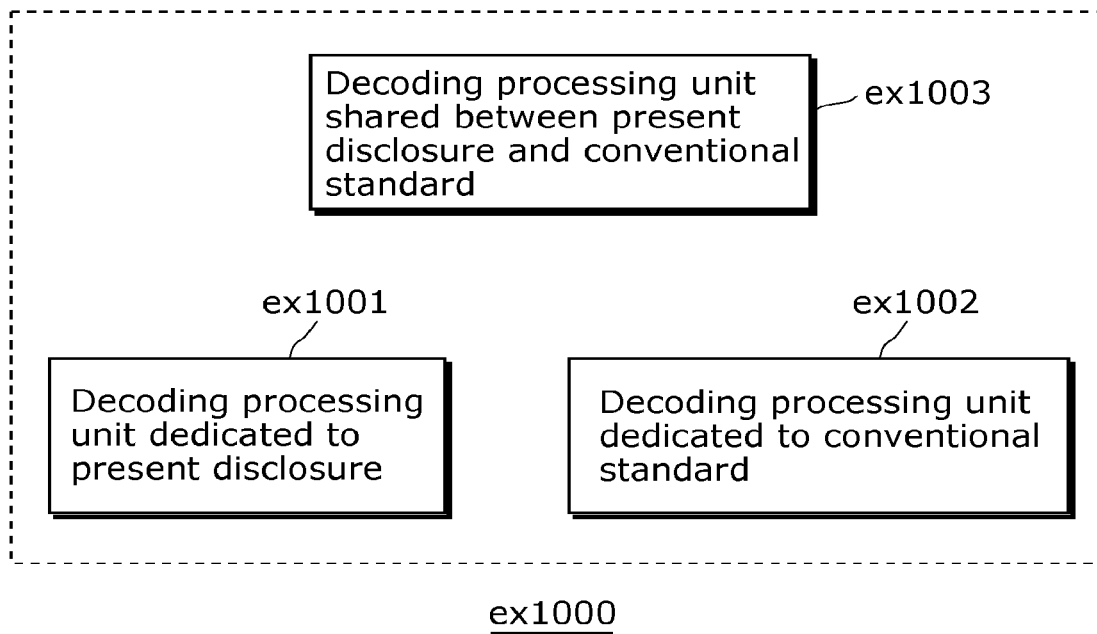
FIG. 44B is a diagram showing another example of a configuration for sharing a module of the signal processing unit.

Furthermore, ex1000 in FIG. 44B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The present disclosure is used for the moving picture coding apparatus and the moving picture decoding apparatus. For example, the present disclosure is applicable to information display device and imaging device such as television, digital video recorder, car navigation system, mobile phone, digital still camera, digital video camera, and others.

The invention claimed is:

1. A moving picture decoding apparatus for decoding a current block to be decoded included in a current picture to be decoded by inter predictive decoding using a motion vector, the moving picture decoding apparatus comprising:
a processor; and
a memory having a computer program stored thereon, the computer program causing the processor to execute operations including:
decoding a first flag indicating whether or not temporal motion vector prediction using a temporal motion vector predictor which is a motion vector of a block included in a decoded picture different from the current picture is used;
assigning one or more reference picture indexes to a reference picture list;
when the first flag indicates that the temporal motion vector prediction is used,
decoding a collocated reference picture index for specifying the decoded picture among a plurality of pictures indicated by the one or more reference picture indexes,
deriving a plurality of first motion vector predictor candidates including (i) a spatial motion vector predictor which is a motion vector of a block adjacent to the current block in the current picture and (ii) the temporal motion vector predictor, the temporal motion vector predictor being calculated based on a motion vector of the coded picture which is specified by the collocated reference picture index, and
decoding a motion vector used for performing inter predictive decoding on the current block using one of the first motion vector predictor candidates; and
when the first flag indicates that the temporal motion vector prediction is not used,
deriving a plurality of second motion vector predictor candidates that do not include the temporal motion vector predictor, the second motion vector candidates including (i) the spatial motion vector predictor and (ii) a replacement vector, as a replacement for the temporal motion vector predictor, and decoding a motion vector used for performing inter predictive decoding on the current block, using one of the second motion vector predictor candidates,
wherein when the first flag indicates that the temporal motion vector prediction is not used, the collocated reference picture index is not decoded.

2. A moving picture coding apparatus for coding a current block to be coded included in a current picture to be coded by inter predictive coding using a motion vector, the A moving picture coding apparatus comprising:
a processor; and
a memory having a computer program stored thereon, the computer program causing the processor to execute operations including:
assigning one or more reference picture indexes to a reference picture list;
coding a first flag indicating whether or not temporal motion vector prediction using a temporal motion vector predictor which is a motion vector of a block included in a coded picture different from the current picture is used;
when the first flag indicates that the temporal motion vector prediction is used,
coding a collocated reference picture index for specifying the coded picture among a plurality of pictures indicated by the one or more reference picture indexes,
deriving a plurality of first motion vector predictor candidates including (i) a spatial motion vector predictor which is a motion vector of a block adjacent to the current block in the current picture and (ii) the temporal motion vector predictor being calculated based on a motion vector of the coded picture which is specified by the collocated reference picture index,
coding a motion vector used for performing inter predictive coding on the current block, using one of the first motion vector predictor candidates, and
outputting the coded first flag, the coded collocated reference picture index, and the coded motion vector; and
when the first flag indicates that the temporal motion vector prediction is not used,
deriving a plurality of second motion vector predictor candidates that do not include the temporal motion vector predictor, the second motion vector candidates including (i) the spatial motion vector predictor and (ii) a replacement vector, as a replacement for the temporal motion vector predictor,
coding a motion vector used for performing inter predictive coding on the current block, using one of the motion vector predictor candidates, and
outputting the coded first flag and the coded motion vector,
wherein when the first flag indicates that the temporal motion vector prediction is not used, the collocated reference picture index is not coded.

3. A non-transitory computer-readable medium storing a bitstream, the bitstream comprising:
an encoded first flag corresponding to a first flag;
an encoded collocated reference picture index corresponding to a collocated reference picture index; and
an encoded motion vector corresponding to a motion vector,
the bitstream being generated by performing an encoding method for coding a current block to be coded included in a current picture to be coded by inter predictive coding using a motion vector, the method comprising:
assigning one or more reference picture indexes to a reference picture list;
coding a first flag indicating whether or not temporal motion vector prediction using a temporal motion vector predictor which is a motion vector of a block included in a coded picture different from the current picture is used;
when the first flag indicates that the temporal motion vector prediction is used,
coding a collocated reference picture index for specifying the coded picture among a plurality of pictures indicated by the one or more reference picture indexes,
deriving a plurality of first motion vector predictor candidates including (i) a spatial motion vector predictor which is a motion vector of a block adjacent to the current block in the current picture and (ii) the temporal motion vector predictor being calculated based on a motion vector of the coded picture which is specified by the collocated reference picture index, coding a motion vector used for performing inter predictive coding on the current block, using one of the first motion vector predictor candidates, and outputting the coded first flag, the coded collocated reference picture index, and the coded motion vector; and when the first flag indicates that the temporal motion vector prediction is not used, deriving a plurality of second motion vector predictor candidates that do not include the temporal motion vector predictor, the second motion vector candidates including (i) the spatial motion vector predictor and (ii) a replacement vector, as a replacement for the temporal motion vector predictor, coding a motion vector used for performing inter predictive coding on the current block, using one of the second motion vector predictor candidates, and outputting the coded first flag and the coded motion vector, wherein when the first flag indicates that the temporal motion vector prediction is not used, the collocated reference picture index is not coded.

* * * * *